US010883905B2

(12) United States Patent
Troive

(10) Patent No.: US 10,883,905 B2
(45) Date of Patent: Jan. 5, 2021

(54) METHOD AND COMPUTER PROGRAM PRODUCT FOR CHARACTERISING THE BENDING RESPONSE OF A MATERIAL

(71) Applicant: SSAB TECHNOLOGY AB, Stockholm (SE)

(72) Inventor: Lars Troive, Stockholm (SE)

(73) Assignee: SSAB TECHNOLOGY AB, Stockholm (SE)

( * ) Notice: Subject to any disclaimer, the term of this patent is extended or adjusted under 35 U.S.C. 154(b) by 236 days.

(21) Appl. No.: 15/763,672

(22) PCT Filed: Sep. 28, 2016

(86) PCT No.: PCT/EP2016/073145
§ 371 (c)(1),
(2) Date: Mar. 27, 2018

(87) PCT Pub. No.: WO2017/055367
PCT Pub. Date: Apr. 6, 2017

(65) Prior Publication Data
US 2018/0275033 A1  Sep. 27, 2018

(30) Foreign Application Priority Data

Sep. 28, 2015  (EP) .................................... 15187129

(51) Int. Cl.
*G01N 3/20* (2006.01)
*G01N 3/28* (2006.01)

(52) U.S. Cl.
CPC ................. *G01N 3/20* (2013.01); *G01N 3/28* (2013.01); *G01N 2203/0003* (2013.01); *G01N 2203/0023* (2013.01); *G01N 2203/0282* (2013.01)

(58) Field of Classification Search
CPC .... G01N 3/20; G01N 3/28; G01N 2203/0003; G01N 2203/0282; G01N 2203/0023
See application file for complete search history.

(56) References Cited

U.S. PATENT DOCUMENTS 4,408,471 A * 10/1983 Gossard ................. B21D 5/006
700/206
4,640,113 A * 2/1987 Dieperink .............. B21D 5/006
72/16.2

(Continued)

FOREIGN PATENT DOCUMENTS

CN  103801599 A  5/2014
DE  19939549     2/2001

(Continued)

OTHER PUBLICATIONS

Chamis, C. "Analysis of the three point bend test for materials with unequal tension and compression properties", NASA Technical Note D-7572, (35 pages) (1974).

(Continued)

*Primary Examiner* — Herbert K Roberts
*Assistant Examiner* — John M Royston
(74) *Attorney, Agent, or Firm* — Ballard Spahr LLP

(57) ABSTRACT

Method for characterizing a material (10), characterized in that it comprises the steps of carrying out a bending test and calculating a cross-section moment, M of said material (10) using the following equation:

$$M = \frac{F \cdot L_m(\beta_1)}{2 \cdot \cos^2(\beta_1)}$$

(Continued)

where F is the applied bending force, $L_m(\beta_1)$ is the moment arm, and $\beta_1$ is the bending angle. The expression for the moment, M, fulfils the condition for energy equilibrium:

$$\int F ds = \int 2M d\beta_2$$

when the true bending angle, $\beta_2$ is:

$$\beta_1 - \int \frac{t \cdot \sin(\beta_1)}{L_m} d\beta_1.$$

20 Claims, 27 Drawing Sheets

(56) References Cited

U.S. PATENT DOCUMENTS

| 5,174,597 | A | 12/1992 | Uttenthaler |
| 2008/0083288 | A1 | 4/2008 | Glaesemann |
| 2008/0216585 | A1 | 9/2008 | Cipra |

FOREIGN PATENT DOCUMENTS

| EP | 2485036 A1 | 8/2012 |
| FR | 2915580 | 10/2008 |
| JP | H08192230 A | 7/1996 |
| JP | H08323427 A | 12/1996 |
| JP | H10267813 A | 10/1998 |

OTHER PUBLICATIONS

Florando, et al., "A microbeam bending method for studying stress-strain relations for metal thin films on silicon substrates", Journal of the Mechanics and Physics of solids 53: 619-638 (2005).

Gardner, et al., "Experiments on stainless steel hollow sections—Part 2: Member behaviour of columns and beams", Journal of Constructional Steel Research 60: 1319-1332 (2004).

Marciniak, et al., "Mechanics of Sheet Metal Forming" Butterworth-Heinemann, an imprint of Elsevier Science, 2nd edition,(228 pages) (2002).

Nakamura et al. "Analysis of a dynamically loaded three-point-bend ductile fracture specimen", Engineering Fracture Mechanics, 25(3): 323-339 (1986).

International Search Report and Written Opinion dated Dec. 15, 2016 by the International Searching Authority for International Patent Application No. PCT/EP2016/073145, which was filed on Sep. 28, 2016 and published as WO 2017/055367 on Apr. 6, 2017 (Applicant—SSAB Technology AB) (11 pages).

Hu, et al., "Computer simulation of pipe-bending processes with small bending radius using local induction heating"; Journal of Materials Processing Technology Dec. 31, 1999; pp. 75-79.

Kim, et al., "Effect of bend angle on plastic loads of pipe bends under internal pressure and in-plane bending"; International Journal of Mechanical Sciences, Dec. 31, 2007, pp. 1413-1424.

* cited by examiner

PRIOR ART

Reference test, i.e. get "thumb-print" of the material.
Conduct VDA 238-100 standard test or another type of friction free bending, with small knife in relation to thickness and with a narrow die width.

Calculating the Moment curve, $M_1(\varepsilon_2)$, from reference-test.

Making a geometrical transformation in line with the case to be analyzed: $\varepsilon_{22} = \varepsilon_2 \cdot \frac{t_2}{t_1}$, $M_2 = M_1 \cdot \left(\frac{t_2}{t_1}\right)^2 \cdot \frac{B_2}{B_1}$ Calculate bending angle by: $\beta_{22} = \frac{\varepsilon_{22} \cdot L_m}{t_2}$ Calculate the contact angle $\beta_C$ and then the moment-arm $L_N$ Using the invented expression $M_L = M_2 \frac{L_m}{L_N}$ Estimate the springback based on reduced moment $M_L$ and contact angle $\beta_C$

Fig. 18

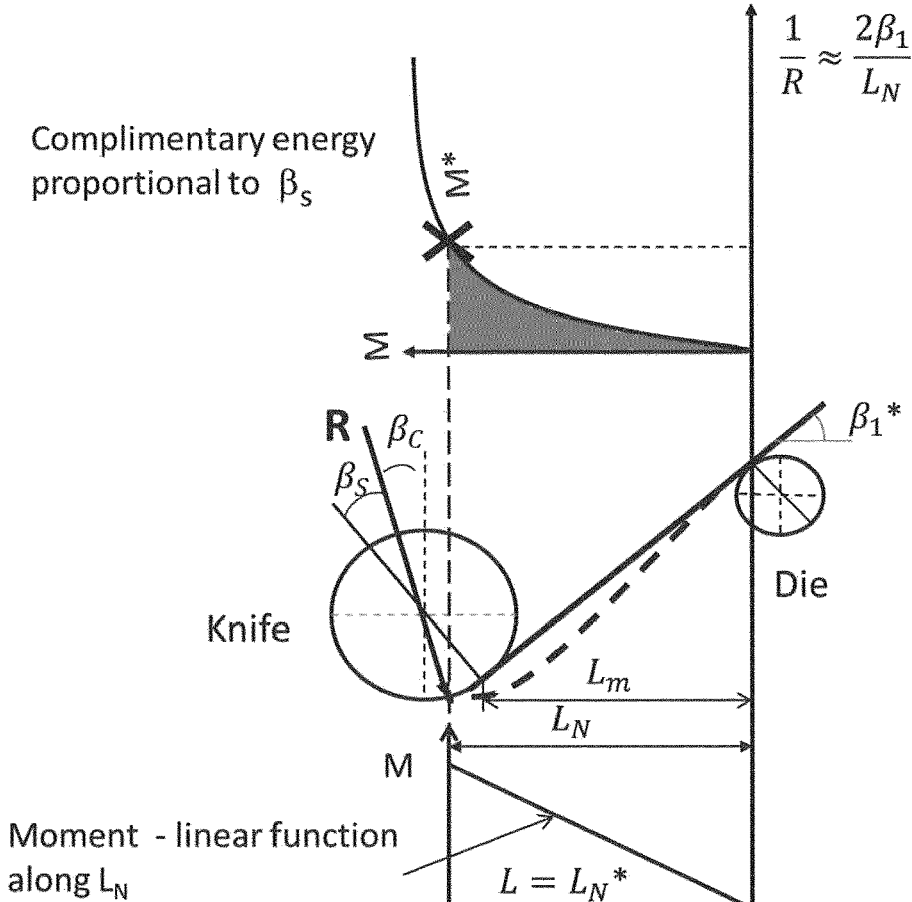

Fig. 19

METHOD AND COMPUTER PROGRAM PRODUCT FOR CHARACTERISING THE BENDING RESPONSE OF A MATERIAL

This application is a U.S. National Phase Application of International Application No. PCT/EP2016/073145, filed Sep. 28, 2016, which claims the benefit of European Patent Application No. 15187129.0, filed Sep. 28, 2015, each of which are incorporated herein by reference in their entirety.

TECHNICAL FIELD

The present disclosure concerns a method for characterizing a material, whereby said method may be used to determine the real response of the material during bending. The method of the disclosure may be used to calculate properties associated with bending, including the cross section moment, the flow stress, the Young's modulus, and the strain. The present disclosure also concerns a computer program product that comprises a computer program containing computer program code means arranged to cause a computer or a processor to execute the calculating step of a method according to the present disclosure.

BACKGROUND OF THE DISCLOSURE

The properties of a material during bending are of significant interest for a number of reasons. For instance, in recent years there has been an increasing interest to utilize ultra-high strength (UHS) steels, i.e. steels with yield strength ≥550 MPa or a tensile strength ≥780 MPa, in various industries, such as in the automotive, aerospace and construction industries. The use of such material results in considerable improvements in the performance of products comprising such material and a reduction in their weight. However, it is well known that as the strength of a steel increases, its bendability tends to decrease. There is therefore a need to investigate and improve the bendability of high strength steels in order to meet the increasing demands from the market.

The bendability of metallic materials is usually determined by performing conventional bending tests (typically three point bending tests) combined with tensile testing. However, a material's behaviour in a tensile test in which uniform tension is applied though the thickness of a test sample is different to the behaviour exhibited by that material when it is bent. It has namely been found that tensile test does not provide accurate information concerning a material's bending behaviour, i.e. the real response of a material during bending.

The Verband der Automobilindustrie (VDA) 238-100: 2010 Plate Bending Test for Metallic Materials (hereinafter referred to as the "VDA 238-100 standard") is the standard test procedure that is commonly used to determine the bendability of metallic materials, especially cold-rolled steel. Bending angles are determined using a three point bending device according to the procedure described in the VDA 238-100 standard, which specifies the test conditions, tooling, geometry and experimental settings as well as bendability limit assessment. The VDA 238-100 standard also specifies a method for calculating the bending angle. In order to allow a direct comparison between metals with different thickness, a thickness correction factor equal to the square root of the material's thickness is commonly used.

During the VDA 238-100 standard bending test, the force required to displace a knife that causes a metal sheet test sample to bend is monitored. This allows the maximum force and stroke-length achieved during the bending test to be determined. The stroke-length can then be transposed to a corresponding bending angle. Testing of metallic sheets may be carried out in two directions, namely parallel and perpendicular to a metallic sheet's rolling direction.

FIG. 1 shows typical data obtained using a VDA 238-100 standard test for measuring the knife position or "punch stroke", S (i.e. the distance through which the knife has been displaced) and the applied force, F. According to the VDA 238-100 standard, the knife position at maximum applied force, $F_{max}$, just after the applied force starts to drop, may be used to determine the bending angle when the test sample fails.

Elasto-plastic bending is usually a stable process in which the curvature of a test sample increases uniformly without kinking. It has been found that the VDA 238-100 standard test does not accurately predict the real response of a metallic material during bending since many metallic materials do not exhibit this perfect elasto-plastic behaviour (i.e. no work-hardening) during bending, and kinking may occur. For example, Z. Marciniak, J. L Duncan and S. J. Hu disclose the following in their book entitled "Mechanics of Sheet Metal Forming", ISBN 0 7506 5300: "It is very difficult to predict precisely the moment curvature characteristic [of a metallic material] [i.e. a cross-section moment, M] from tensile data. The moment characteristic is extremely sensitive to material properties at very small strain and these properties often are not determined accurately in a tension test".

Analysis of the response of materials to a three point bending test is also known from micro-engineering. For instance, in Florando et al., Journal of Mechanics and Physics of solids, 53, 2005, pp 619-638 discloses a microbeam bending method for studying the stress-strain relations for metal thin films on silicon substrates. The apparatus used involves a three-point bending method in which the vertical displacement is of the order of several μm (i.e. 1000-5000 nm).

Three-point bending on hollow members is also known, such as from L. Gardner et al., Journal of Constructional Steel Research, 60, 2004, pp 1319-1332. FR2915580 also discloses methods of investigating the moments that arise in hollow members, in this particular case pipes associated with nuclear power plants.

T. Nakamura et al., Engineering Fracture Mechanics, Vol 25, No. 3. Pp 323-339, 1986 discloses the use of a three point bending test to investigate fracture mechanics of a ductile specimen.

The use of a three point bending test to investigate the structural properties of materials having moduli and strengths that are different in tension and compression is disclosed in NASA Technical Note NASA TN D-7572, March 1974, by Christos Chamis. Typically, such materials are structural resins.

US2008/0216585 discloses a testing device that is capable of applying a constant moment to a material during bending.

SUMMARY OF THE DISCLOSURE

An object of the disclosure is to provide a method for characterizing a material, whereby the method may be used to determine a real response of a material during bending, i.e. to more accurately predict the response of a material during bending than predictions based on the data obtained using bending tests (such as the VDA 238-100 standard test) in which the maximum applied force is used to predict the real response of a material during bending.

This object is achieved by a method of characterising a material that comprises the steps of:
a. providing a sample of the material simply supported between two parallel die supports, said supports having the same edge shape;
b. bending the sample by providing an external force, F, via a bending knife, said force acting in a plane perpendicular to the plane formed by the centres of the die supports and which intersects the material at the centre line between the die supports, said bending knife extending at least the entire length of the sample;
c. the method comprising the step of calculating a cross-section moment, M, of the material using the following equation [1]:

$$M = \frac{F \cdot L_m(\beta_1)}{2 \cdot \cos^2(\beta_1)} \quad [1]$$

where F is the applied bending force,
$L_m(\beta_1)$ is the moment arm, and
$\beta_1$ is the bending angle.

The method is therefore a simple three-point bending method characterised by a step of using the bending angle to calculate the cross-section moment.

By "simply supported" is meant that each end of the sample can freely rotate (or move), and each end support has no bending moment. This is typically achieved by supporting the sample with parallel rollers, such that the moment created by the knife when the external force is applied is balanced by the moment created along the centre line where the bending takes place, and no additional bending or force dissipation takes place at the point of contact between the plate and the rollers.

However, alternative ways to achieve a simply supported sample include using lubricants to ensure an essentially friction free movement of the end of the sample over the die supports during bending. This implementation is particularly well suited for apparatus used to carry out microbending tests (i.e. bending tests where the die width is below 1 cm even down to several μm, where using rollers as the die supports may not even be possible).

By "die supports having the same edge shape" is meant that the die supports are effectively mirror images of one another, such that the bending moment applied between the first die support and the bending knife will exactly match the bending moment applied between the bending knife and the second die support when the bending knife moves during the test. Typically this is achieved by using identical die supports, such as rollers, although other support shapes such as a fulcrum (i.e. a pointed peak) or a shape rounded edges (such as shown in FIG. 45) could be used provided they have low enough friction.

The edge shape of the die support typically has a constant radius. This facilitates friction-free movement during bending, and simplifies the model as $R_d$ remains constant. An example of a non-roller support having a constant radius at the die edge is shown in the microbending apparatus in FIG. 45.

Preferably, the sample has a constant cross section across the width of the die opening.

Preferably, the sample has a constant thickness across the width of the die opening.

Hollow samples such as tubes can sometimes buckle during three-point bending tests, which will lead to discontinuities in the force/displacement profile. Typically, the sample will therefore have a solid cross-section (i.e. be non-hollow).

Typical sample types include those with a constant cross-section such as bars, beams and plates. Plates are particularly preferred.

Desirably, the disclosure therefore relates to a method of characterising a material that comprises the steps of:
a. providing a plate of material simply supported between two parallel rollers, said rollers having the same diameter;
b. bending the plate by providing an external force, F, via a bending knife, said force acting in a plane perpendicular to the plane formed by the centres of the rollers and which intersects the plate at the centre line between the rollers, said bending knife extending at least the entire length of plate;
c. the method comprising the step of calculating a cross-section moment, M, of the material using the following equation [1]:

$$M = \frac{F \cdot L_m(\beta_1)}{2 \cdot \cos^2(\beta_1)} \quad [1]$$

where F is the applied bending force,
$L_m(\beta_1)$ is the moment arm, and
$\beta_1$ is the bending angle.

The bending angle, $\beta_1$, is the angle moved by the surface normal of the sample (e.g. the plate) at the contact point with one of the die supports (e.g. the rollers) during bending by the external force (i.e. 90° (or π/2 radians) minus the acute angle between the normal vectors of the start and bent planes of the sample (e.g. the plate), the start plane corresponding to the plane formed by the centre lines of the two parallel die supports (e.g. the rollers), and the bent plane corresponding to the plane formed by the centre line of one die support (e.g. roller) and the line of contact between that die support (e.g. roller) and the sample (e.g. plate), which plane contains the normal of the sample (e.g. plate) at the point which contacts the die support (e.g. the roller)).

The angle $\beta_1$ can readily be calculated from the geometry of the bend setup using the standard equations from bend tests such as the VDA 238-100 standard, the ISO 7438:2016 and the like. For completeness, a suitable formula for calculating $\beta_1$ is provided below:

$$\beta_1 = \sin^{-1}\left(\frac{[L_0 \cdot Q + \sqrt{L_0^2 + (S-Q)^2 - Q^2} \cdot (S-Q)]}{[L_0^2 + (S-Q)^2]}\right) \cdot \frac{180}{\pi} \quad [0]$$

wherein
$L_0$ is the half die width,
$Q = R_k + R_d + t$
$R_k$ is the knife radius
$R_d$ is the radius of the die edge (roller radius)
t is the sample thickness, and
S is the vertical distance through which the bending knife has been displaced.

As would be evident to the skilled person, the final term (180/π) in formula [0] merely converts the result from the arcsin function from radians to degrees. This term is a scalar, and not decisive in calculating $\beta_1$.

A further way of calculating $\beta_1$ is using the following formula:

$$\beta_1 = \int \frac{d\beta_1}{dS} dS = \int \frac{\cos^2 \beta_1}{L_e} dS \quad [27']$$

where $$L_e = L_0 - (R_k + R_d + t) \cdot \sin\beta_1 \quad [28]$$

$L_m(\beta_1)$ is the moment arm at angle $\beta_1$. This corresponds to the horizontal distance between the points of intersection of angle $\beta_1$ with the surface of the knife and die respectively, assuming a straight flange (see FIGS. 3a and 31).

For a plate (or more generally a sample) which is initially horizontal, this is equivalent to the angle between the surface normal of the plate (or more generally the sample) at the contact point with one of the rollers and the vertical.

In a preferred embodiment, this object is achieved by a method that comprises the steps of carrying out a bending test according to the VDA 238-100 standard or a similar friction-free bending test, i.e. by carrying out a plate bending test as described in said standard using the test equipment described in said standard, preparing the samples in the way described in said standard, under the test conditions described in said standard, using the procedure described in said standard and determining a bending angle, $\beta_1$ (equal to half the bending angle $\alpha$ from the VDA 238-100 standard), from the punch stroke as described in the standard. The method also comprises the step of calculating a cross-section moment, M, of the material using the following equation [1]:

$$M = \frac{F \cdot L_m(\beta_1)}{2 \cdot \cos^2(\beta_1)} \quad [1]$$

where F is the applied bending force,
$L_m(\beta_1)$ is the moment arm, and
$\beta_1$ is the bending angle.

This calculated cross-section moment, M, may then be used to predict the real response of the material.

By calculating the cross-section moment of the material (rather than the applied force that is usually determined using tests such as the VDA 238-100 standard test), the flow stress, $\sigma_1$ (i.e. the approximate cross-section stress-profile profile in the bent material), may consequently be determined, using the following equation [2]:

$$\sigma_1 = \frac{2}{B \cdot t^2 \cdot \varepsilon_1} \cdot \frac{d}{d\varepsilon_1}(M \cdot \varepsilon_1^2) \quad [2]$$

where the main strain, $\varepsilon_1$ is calculated from [3]:

$$\varepsilon_1 = \beta_2 \cdot \frac{t}{L_m(\beta_1)} \quad [3]$$

where B is the length of bend (i.e. the length of the sample (e.g. the plate) in the dimension running parallel to the die supports), t is the sample thickness in mm, (see FIGS. 3a and 3b). $\beta_2$ is the true angle (in degrees) to which said material is bent.

As used herein,
the width, L, of the sample (e.g. the plate) is the dimension that runs across the die opening (i.e. between the pair of parallel die supports),
the length, B, of the sample (e.g. the plate) is the dimension that runs parallel to the die supports, while
the thickness, t, of the sample (e.g. the plate) is the dimension that runs in the direction travelled by the knife during bending.

Thus, by "bending knife extending at least the entire length of the sample" is meant that the bending knife is capable of exerting the force across the entire sample, such that an even bend is formed without any buckling.

By "die supports" is meant the edges of the die that are in contact with the sample (e.g. plate). In the present disclosure, the die supports are typically the outer edges of the roller (i.e. cylinders that rotate freely around an axis). The two die supports are parallel to ensure an even distance across the die opening.

The above formula [3] for main strain, $\varepsilon_1$, has been found to be accurate when the material being bent is being elastically deformed. However, in the event that the material is bent beyond its elastic limit, plastic deformation typically occurs. Formula [3] is not accurate under these conditions, and instead the following formula [4b] should be used:

$$\varepsilon_1 = \frac{t}{2 \cdot R} \quad [4a]$$

$$\varepsilon_1 = t \cdot \frac{U}{M \cdot L_N(\beta_1, \beta_C)} \cdot \cos(\beta_C) \quad [4b]$$

As used herein, where a formula is expressed as [Xa] or [Xb] or [Xc] etc., they are in fact equivalent and interchangeable, wherein the values are merely expressed using alternative parameters. Typically, formulas expressed as [Xa]/[Xb] etc. will be referred to as [X] in the general description.

Formula [4a] and [4b] are equivalent, but in practice formula [4b] is used since it is general and valid for large strains.

Formula [4b] is accurate for both elastic and plastic deformation, so may be used in all situations in place of formula [3] to give a more accurate value for the main strain $\varepsilon_1$. In these formulae, R is the radius of the shape of curvature at the contact point between the material and the knife;
$L_N(\beta_1, \beta_C)$ is the real moment arm, or the horizontal distance between the real contact points at the knife and die radius (i.e. the distance between where the knife and die contact the plate being bent);
$\beta_C$ is the contact angle between the knife and the material (i.e. the angle subtended by the material in contact with the surface of the bending knife); and
U is the energy, calculated using formula [5a/5b]:

$$U = \int F \cdot dS \quad [5a]$$

$$U = \int 2M \cdot d\beta_2 \quad [5b]$$

In formula [5],
S is the vertical distance through which the bending knife has been displaced,
$\beta_2$ is the true angle to which the sample is bent.

The energy, U, corresponds to the elastic and plastic energy absorbed by the material during bending. In practice, this is typically calculated using formula [5a], since the force applied during bending and displacement of the bending knife may be readily measured.

From formula [4b], the following relationship can also be seen:

$$\frac{1}{R} = 2 \cdot \frac{U}{M \cdot L_N(\beta_1, \beta_C)} \cdot \cos(\beta_C) \quad [55]$$

The method according to the present disclosure allows all parts of a material's response to bending to be determined throughout its entire thickness from its outer surface to its centre using just one simple bending test.

The method according to the present disclosure may also be used to indicate when a material exhibits plastic strain localizations. Kinking may also be predicted using the method according to the present disclosure.

The present disclosure is based on the insight that standard tests such as the VDA 238-100 standard do not accurately predict the real response of a material to bending. Experiments carried out using the VDA 238-100 standard test have included cases in which no failure of metallic materials has occurred even when the maximum bending force as determined by the VDA 238-100 standard test has been exceeded. It has been found that, for a ductile material, the bending force applied during bending (such as in the VDA 238-100 standard test) always reaches a maximum level and then decreases, due to a decreasing angular speed (this can be demonstrated theoretically). Determination of the cross-section moment, M, (and not the applied bending force, F) therefore provides a more accurate prediction of the real response of a material to bending.

Additionally, using the methodology of the disclosure, the angular position when the natural force-maximum occurs can be determined by finding its extreme value by the derivative.

$$\frac{dF}{d\beta_1} = 0 \quad [6]$$

Thus, assuming a constant moment, M, when the cross-section reaches its steady state level, then;

$$\beta_{Fmax} = \sin^{-1}\left[\frac{L_0 - \sqrt{L_0^2 - (R_d + R_k)^2}}{(R_d + R_k)}\right] \times \frac{180}{\pi} \quad [7]$$

where $L_0$=half die width (i.e. half the distance between the centres of the rollers), $R_d$=the die edge (roller) radius, $R_k$=the knife radius, and $\beta_{F\,max}$ is the bending angle at $F_{max}$. Then $F_{max}$ becomes;

$$F_{Max} = \frac{4 \cdot M_{max}}{(R_d + R_k)} \cdot \sin\beta_{Fmax} = \quad [8a]$$

$$= \frac{4 \cdot M_{max}}{(R_d + R_k)^2} \cdot \left(L_0 - \sqrt{L_0^2 - (R_d + R_k)^2}\right) \quad [8b]$$

The approximate maximum bending moment can be estimated as;

$$M_{Max} = \frac{B \cdot t^2 \cdot \left(R_m \cdot \frac{2}{\sqrt{3}}\right)}{4} \quad [9]$$

where; B=length of bend (i.e. length of the sample being bent, see FIG. 3b); t=thickness and $R_m$=ultimate strength.

Assuming a constant cross-section moment condition, it is shown herein that the angle position for the natural F-maximum only depends on the geometry of the test apparatus. However, if the material displays moment-hardening behaviour, the natural peak load will appear a bit later.

Using the methods of the disclosure, an operator can be informed when a material passes the natural force maximum during the bending test. In some cases, i.e. for mild steel up to the level of approximately 800 MPa (e.g. 800-1000 MPa) in strength depending on its ductility (or even higher for third-generation steels), this natural force maximum may be reached before an apparent failure of the material in the bending test (i.e. the applied force drops during the bending test), showing the utility of the methodology of the present disclosure in determining the bending properties of materials that are not otherwise derivable using standard methodologies. The failure of standard methodologies such as the VDA 238-100 test in determining the maximum force arises due to the non-linearity of the applied force and bending angle, which is compensated for using the methodology of the present disclosure (see the examples below).

It should be noted that the method according to the present disclosure is not intended to replace standard tests such as VDA 238-100, but to complement them. Also there is still a need for conventional air-bending tests to determine the recommended bendability limit of a material in terms of the ratio of knife radius to thickness of the material, i.e. the R/t-ratio. There is however also a need for a complementary method, such as the method according to the present disclosure, which enables a material's behaviour during bending to be investigated in connection with its microstructure. The method according to the present disclosure namely allows kinking tendencies or inhomogeneity within a material (particularly a metallic material) to be detected and analysed.

According to an embodiment of the disclosure, the method comprises the step of estimating the Young's modulus, E, of a material by plotting a graph of $\beta_2$ and the calculated cross-section moment, M and determining the gradient of the elastic part of the moment curve, whereby the gradient is:

$$\frac{2 \cdot E' \cdot I}{L_m} \quad [10]$$

where I is the moment of inertia and where E' is the Young's modulus in plain strain and is given by:

$$E' = \frac{E}{(1 - v^2)} \quad [11]$$

where v Poisson's ratio. For steel, this can be expressed as:

$$E' \approx \frac{E}{(1 - 0.3^2)} \quad [12]$$

More generally, it has been found that the Young's modulus may be expressed using formula [13] (based on formula [55]), see FIG. 16b:

$$E' = \text{Max}\left(\frac{M^2 L_m}{2 \cdot I \cdot U}\right) \quad [13]$$

This can then be converted to the effective Young's modulus for effective strain (E) by using formula [11].

According to an embodiment of the disclosure, the calculated cross-section moment, M, or the calculated flow stress, $\sigma_1$, or the estimated Young's modulus, E', or the ratio $M/M_e$, or the calculated plain strain, $\varepsilon_1$, is used to optimize a product comprising the material, i.e. the calculated cross-section moment, M, or the calculated flow stress, $\sigma_1$, or the estimated Young's modulus, E', or the ratio $M/M_e$, or the calculated plain strain, $\varepsilon_1$, is used to determine how a product utilizing the material should be dimensioned, constructed and/or designed in order to withstand a particular bending force, whereby its suitability for a particular application may be ascertained.

The methodology of the present disclosure is in principle applicable to a wide range of materials, and although the disclosure is presented in relation to the VDA 238-100 standard there is no reason that the disclosure should be viewed as being limited to metallic materials. As would be evident to the skilled person, the methodologies disclosed herein allow the structural properties of materials to be investigated under both elastic (i.e. reversible) and plastic (i.e. irreversible) deformation. Therefore, in principle any type of structural material could be investigated using the methodologies disclosed herein. The only real limitation is that the material would be strong enough to withstand any significant deformation under its own weight when simply supported in the test apparatus, such that the deformation induced in the material arises due to the deflection caused by the bending knife. In most cases, this is merely a matter of the skilled person selecting a sample of suitable thickness and width, which would be well within the capabilities of the skilled person.

Suitable materials therefore include metallic materials, plastic materials, biological materials, or composite materials.

Suitable plastic materials include thermoplastics such as sheet polyolefins, polyesters, polyamides, polyimides, polyacrylates, polyvinyl chlorides, polycarbonates, polyphenylene oxides/sulphides, polystyrenes, polyether sulphones, polyetherether ketones (PEEK), polyethylene oxides and the like.

By "biological materials" is meant materials that derive from plants or animals, including wood and bones.

Suitable composite materials include laminates (e.g. metal laminates, plastic laminates), and reinforced plastic resins (e.g. carbon fibre, uniweave resins and the like). Composite materials also includes composite wood products such as plywood, MDF and the like.

Suitable metallic materials include metals, alloys and composite (i.e. multilayer) metal products (e.g bi (or multi) layer metal laminates, galvanised or other 'metal coated' metals).

Particularly preferably, the material is a metallic material.

The metallic material may be steel (such as a high strength steel or ultra-high strength steel), an aluminium or magnesium alloy, or comprise any other metal or metal alloy.

According to an embodiment of the disclosure, the material may be a cold-rolled or hot-rolled metallic material, such as cold-rolled steel or hot-rolled steel.

As used herein, "high strength steel" has a yield strength of from 250 up to 550 MPa, while "ultra high strength steel" has a yield strength of $\geq 550$ MPa.

As used herein, the tensile strength is measured using ISO 6892-1 or EN 10002-1, preferably ISO 6892-1.

The moment characteristics obtained for different materials, using the disclosed formula, may also be superpositioned, simulating cross-section behaviour of multi-layer type of materials. This allows the bending properties of multilayer materials to be predicted based on the bending properties of the individual layers, as characterised by the methods disclosed herein.

According to an embodiment of the disclosure, the method comprises the step of obtaining the moment-characteristic of the material, i.e. the cross-section moment, M, of the material, and using it to estimate the spring-back of the material for a free choice of set up in bending, using the following equations:

$$\Delta\beta_{tot} = \beta_{Cel} + \beta_{Sel} + \Delta\beta_{12} \quad [14]$$

$$\beta_{Cel} = \frac{M_L \cdot W_C}{E'I} = \frac{M_L \cdot \left(R_k + \frac{t}{2}\right) \cdot \beta_C}{E'I} \quad [15]$$

$$\beta_{Sel} = \frac{M_L \cdot W_m}{2E'I} = \frac{M_L}{2E'I} \cdot \frac{L_N}{\cos(\beta_1)} \quad [16]$$

$$\beta_C = \beta_2 - \frac{2}{M}\int \beta_2 dM \quad [17]$$

Or, alternatively:

$$\beta_C = \frac{U}{M} - \beta_2 \quad [46]$$

$$\Delta\beta_{12} = \beta_1 - \beta_2 = \int_0^{\beta_1} \frac{t \cdot \sin\beta_1}{L_m(\beta_1)} \quad [18]$$

$$M_L = M\frac{L_m}{L_N} \quad [19]$$

the approximate length of the flange, $W_m$, at the state for unloading is:

$$W_m \approx \frac{L_N}{\cos(\beta_1)} \quad [20]$$

and the half length of material in contact with the knife is:

$$W_C \approx \left(R_k + \frac{t}{2}\right) \cdot \beta_C \quad [21]$$

where:
$\Delta\beta_{tot}$ is the total amount of spring-back,
$\beta_{Sel}$ is spring-back of the flange,
$\beta_{Cel}$ is the spring-back related to material in contact with the knife,
$M_L$ is the reduced moment due to the limitation of curvature due to the knife radius, $L_N$ is the moment arm (horizontal distance between the tangential contact points considering a curved flange), $W_m$ is the estimated length of the flange (i.e. the length of the neutral layer extending from the die to where angle $\beta_C$ intersects the neutral layer), $W_C$ is the length of the neutral layer of the material shaped by the knife (i.e. the length of the neutral layer that wraps the knife, equivalent to the length of the neutral layer that is subtended by angle $\beta_C$), $R_k$ is the knife radius, $\beta_C$ is the contact angle between material and the knife (i.e. the angle subtended by the radius of the knife by the surface of the knife that is in contact with the sample being bent) and $\beta_1$ is the bending angle.

The "neutral layer" would be a familiar concept to the skilled person, and represents the surface of the sample being bent that does not undergo any compression or tension during the bend. Thus, hypothetically a substance being subjected to three point bending could be viewed as consisting of a plurality of fibres. When the bending knife applies the bending force from above, those fibres at the top of the sample are subjected to a compression force, while those at the bottom are subjected to an extension force, both forces being induced by the shape of the bend (the outside surface of the bend is stretched, while the inner surface is contracted). The neutral layer is the layer where the tension and compression balance, to there would be no change of length in the nominal fibres during bending. This representation of the neutral layer is shown schematically in FIG. 44.

A graphical representation of inter alia $L_N$, $\beta_C$, $W_C$ and $W_m$ is shown in FIG. 32

According to another embodiment of the disclosure the method comprises the step of obtaining the cross-section moment, M of the material and using it to estimate a friction coefficient $\mu$, of the material using the equation:

$$\mu = \left[\frac{M - M_{mtrl}}{M_{mtrl}}\right] \cdot \frac{1}{\tan\beta_1} \quad [22]$$

where $M_{mtrl}$ is the cross-section moment characteristics obtained for a material, using friction free bending test equipment.

The present disclosure also concerns a computer program product that comprises a computer program containing computer program code means arranged to cause a computer or at least one processor to execute the calculating step of a method according to an embodiment of the present disclosure, stored on a computer-readable medium or a carrier wave, i.e. whereby the computer program product may be used to calculate the cross-section moment, M, and/or any of the other properties of the material described herein.

BRIEF DESCRIPTION OF THE DRAWINGS

The present disclosure will hereinafter be further explained by means of non-limiting examples with reference to the appended figures where;

FIG. 18 shows the steps of the method for estimating spring back for a free choice of geometrical setup, FIG. 19 shows the principal for estimation of the shape of curvature of a material.

DETAILED DESCRIPTION OF EMBODIMENTS

Figure 31:
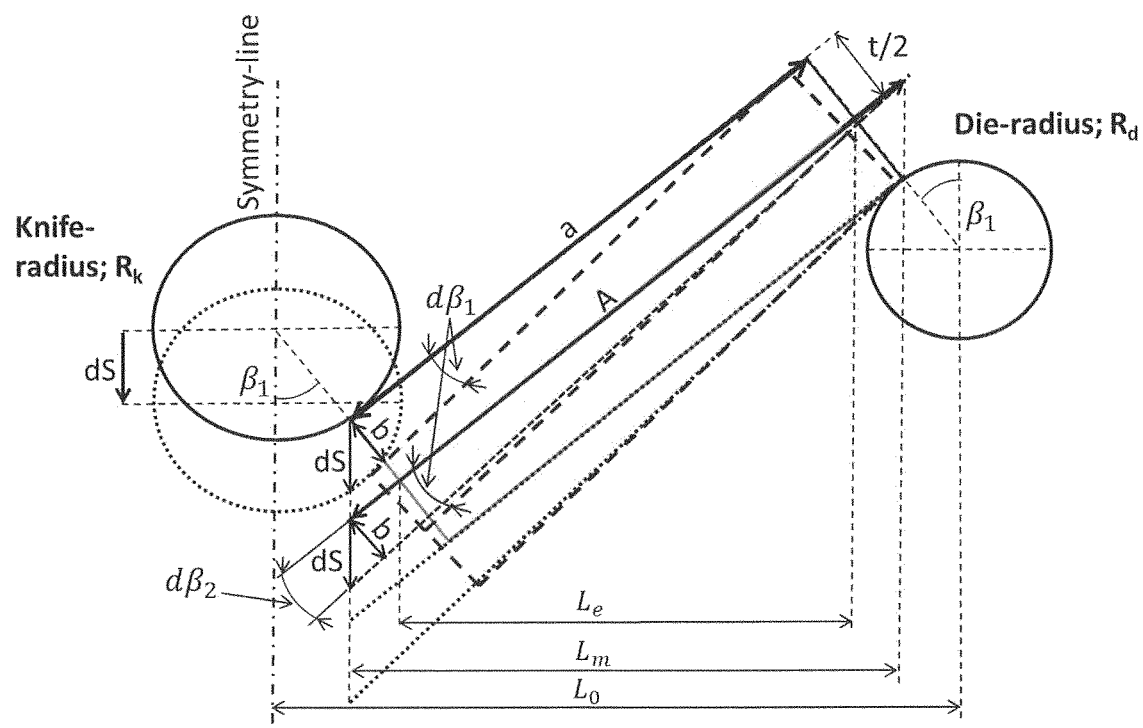
FIG. 31 shows a representation of the difference between angles $\beta_1$ and $\beta_2$ with the same incremental increase in S.

The following abbreviations are used herein:
M=Cross-section (bending) moment
$M_{Max}$=Maximum bending moment
$M_L$=Reduced moment due to the limitation of curvature due to the knife radius
$M_{mtri}$=Cross-section moment characteristics obtained using friction free bending test equipment
$M_1$=Component of cross-section moment M
$M_2$=Component of cross-section moment M
$M_{tot}=M_1+M_2$
$M_e$=Elastic cross-section moment
F=Applied force
$F_{max}$=Maximum applied force
$F_{theor}$=Theoretical force
S=Vertical distance through which the bending knife has been displaced
$S_x$=Horizontal movement of the contact point at the knife
$S_y$=Total vertical movement of the contact point, taking account that it moves upwards along the knife surface
B=Sample length (length of the bend, or the length of the sample in the dimension parallel to the rollers)
t=Sample thickness
$\beta_1$=Bend angle
$\beta_2$=True angle to which the sample (e.g. plate) is bent
$\Delta\beta_{12}$=Difference between $\beta_1$ and $\beta_2$
$\beta_C$=Contact angle between the material and the knife
$\beta_S$=Shape angle (shape of curvature of the flanges)
$\Delta\beta_{tot}$=Total amount of spring-back
$\beta_{Sel}$=Spring-back of the flange
$\beta_{Cel}$=Spring-back related to the material in contact with the knife
$\beta_{F\ max}$=Bend angle at $F_{max}$
$\beta^*$=Selected bending angle, fixed when calculating other parameters
$L_0$=Half die width (i.e. half the distance between the centre points of the rollers
$L_m(\beta_1)$=Moment arm at angle $\beta_1$ (horizontal distance between the tangential contact points)
$L_N(\beta_1,\beta_C)$=Real moment arm (horizontal distance between the real contact points at the knife and die radius, i.e. the distance between where the knife and die contact the sample (e.g. plate) being bent)
$L_e$=Moment arm of the horizontal distance of the neutral layer (i.e. the horizontal distance of the neutral layer between the points of intersection of angle $\beta_1$ with the neutral layer)
$W_m$=Length of the neutral layer in the plate between the die and point of contact with the knife, corresponding to the length starting from the point of intersection of $\beta_1$ at the die with the neutral layer to the point of intersection of $\beta_C$ at the knife with the neutral layer (i.e. the estimated length of the neutral layer of the flange between the contact with the knife and die—see FIG. 32)
$W_C$=Length of the neutral layer of the material shaped by the knife (see FIG. 32)
$dW_m$=The increment in the length of the curved material along the neutral layer
a=Length of the mid-layer based on moment arm $L_e$
A=Length of the mid-layer based on moment arm $L_m$
X=Coordinate along bending arm $L_N$
b=Peripheral distance on incremental move, as shown in FIG. 31
R=Radius of curvature of the material which is bent
$R_d$=Radius of the die edge (i.e. the radius of the curved edge portion of the die which the sample pivots round during bending). When the dies are rollers, this corresponds to the roller radius
$R_k$=Knife radius
$R_m$=Ultimate strength
$\sigma_1$=Flow stress (plain strain)
$\bar{\sigma}$=Effective stress
$\varepsilon_1$=Main strain (plain strain)
$\bar{\varepsilon}$=Effective strain
E=Young's modulus
E'=Young's modulus in plain strain
U=Elastic and plastic energy absorbed by the material during bending $U_{el}$=Elastic energy at bending
I=Moment of inertia
μ=Friction coefficient of the material
$μ_d$=Friction between the material and the die edge (roller) radius
ν=Poisson's ratio By "simply supported" is meant that each end of the sample (e.g. plate) can freely rotate, and each end support has no bending moment. This is typically achieved by supporting the sample (e.g. plate) with parallel rollers, such that the moment created by the knife when the external force is applied is balanced by the moment created along the centre line where the bending takes place, and no additional bending or force dissipation takes place at the point of contact between the plate and the rollers.

Typically, the sample (e.g. plate) is substantially horizontal when provided on the rollers (or more generally die edges). By "substantially horizontal" is meant that the sample (e.g. plate) does not move due to gravity when balanced on the rollers prior to bending. In practice, the sample (e.g. plate) will typically be horizontal, though the skilled person would understand that very small variations from horizontal can also be used, providing the force applied by the bending knife is in a plane perpendicular to the plane formed by the centres of the rollers and which intersects the sample (e.g. plate) along the entire length of the centre line between the rollers. In other words, if the sample (e.g. plate) is e.g. 2 degrees from horizontal when the test begins, the bending knife moves (and consequently applies the force) in a direction the same amount (2 degrees) from vertical during the test, such that the bending force is applied perpendicular to the sample's starting position.

The bending force is applied across the entire length of the sample (e.g. plate). This ensures that the sample (e.g. plate) is bent evenly during the test and the force resisting the knife corresponds to the bending moment of the material, rather than internal forces arising due to deformation of the sample (e.g. plate) from incomplete bending. To ensure the bending force is applied across the entire length of the sample (e.g. plate), the length of the bending knife typically is greater than the sample (e.g. plate) length. Typically, the bending knife extends beyond the edge of the sample (e.g. plate) during bending. Due to the end-effects, i.e. not plain-strain condition, the knife will however not be in contact with the material close to the edges. Therefore, the length of the sample should preferably be at least 10 times the thickness, to ensure the main response of plain strain condition.

The sample (e.g. plate) is typically positioned such that cutting burs or fracture surface portions, possibly existing at the edges, are located on the knife side (i.e. on the sample side which will be under compression during bending).

Figure 1:
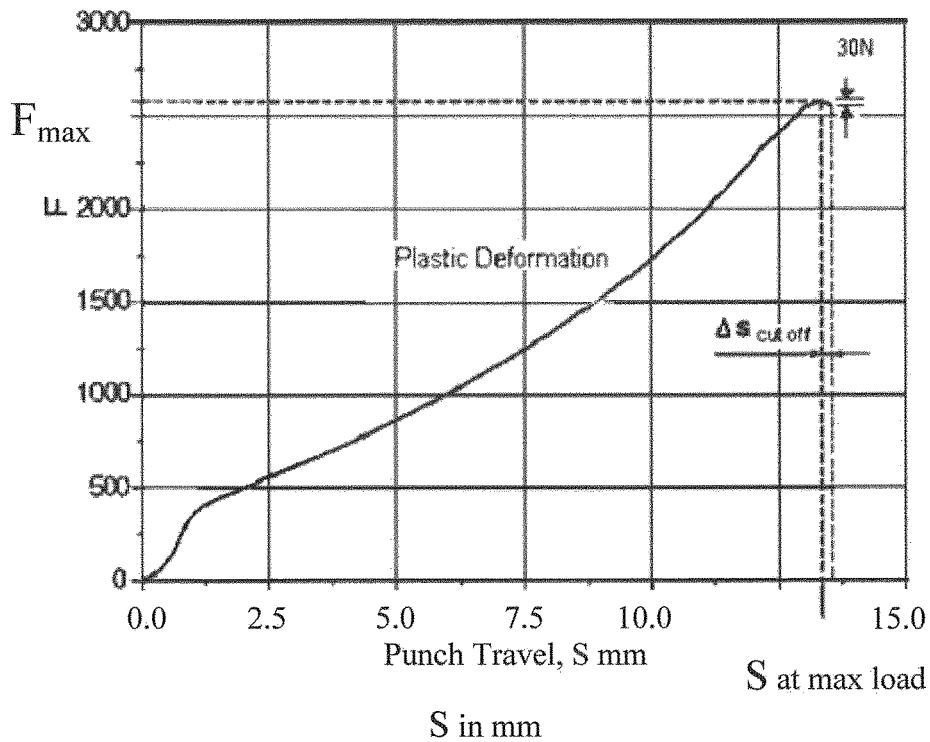
FIG. 1 shows a diagram used to determine the bendability of a metallic material using the VDA 238-100 standard test according to the prior art.

FIG. 1 shows a diagram used to determine the bendability of a metallic material using the VDA 238-100 standard test according to the prior art in which the bendability of the metallic material is determined by measuring the knife position, S at the maximum applied bending force, $F_{max}$.

Figure 2:
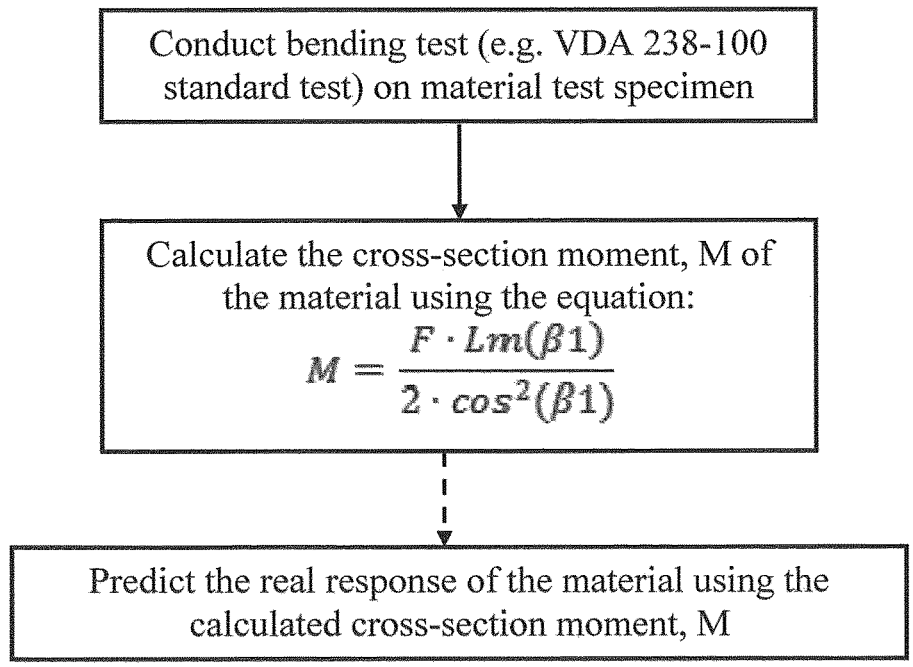
FIG. 2 shows the steps of a method according to an embodiment of the present disclosure, FIG. 3a schematically shows the forces and moment acting on a material during bending in a method according to an embodiment of the disclosure, FIG. 3b schematically shows the positioning of the sample, rollers and bending knife, and the variables used to describe the various dimensions referred to herein.

FIG. 2 shows the steps of an exemplary method according to an embodiment of the present disclosure. The method comprises the steps of carrying out a plate bending test according to the VDA 238-100 standard (or a similar friction-free bending), and calculating a cross-section moment, M, of said material using the following equation:

$$M = \frac{F \cdot L_m(\beta_1)}{2 \cdot \cos^2(\beta_1)} \quad [1]$$

where F is the applied bending force, $L_m(\beta_1)$ is the moment arm, and $\beta_1$ is the bending angle. The calculated cross-section moment, M, may be used to predict a real response of the material during bending.

This improved method for characterizing a material was found by studying the energy balance expression:

$$\int F ds = \int 2M d\beta_2 \quad [5a/5b]$$

Where F is the applied force, S is the knife position, M is the moment of the material test sample and $\beta_2$ is the true bending angle.

This expression indicates that there has to be a balance between the energy input during air bending and the energy absorbed by the test sample. Friction between the material and the die edge (roller) radius, $μ_d$, is assumed to be negligible.

Figure 3A:
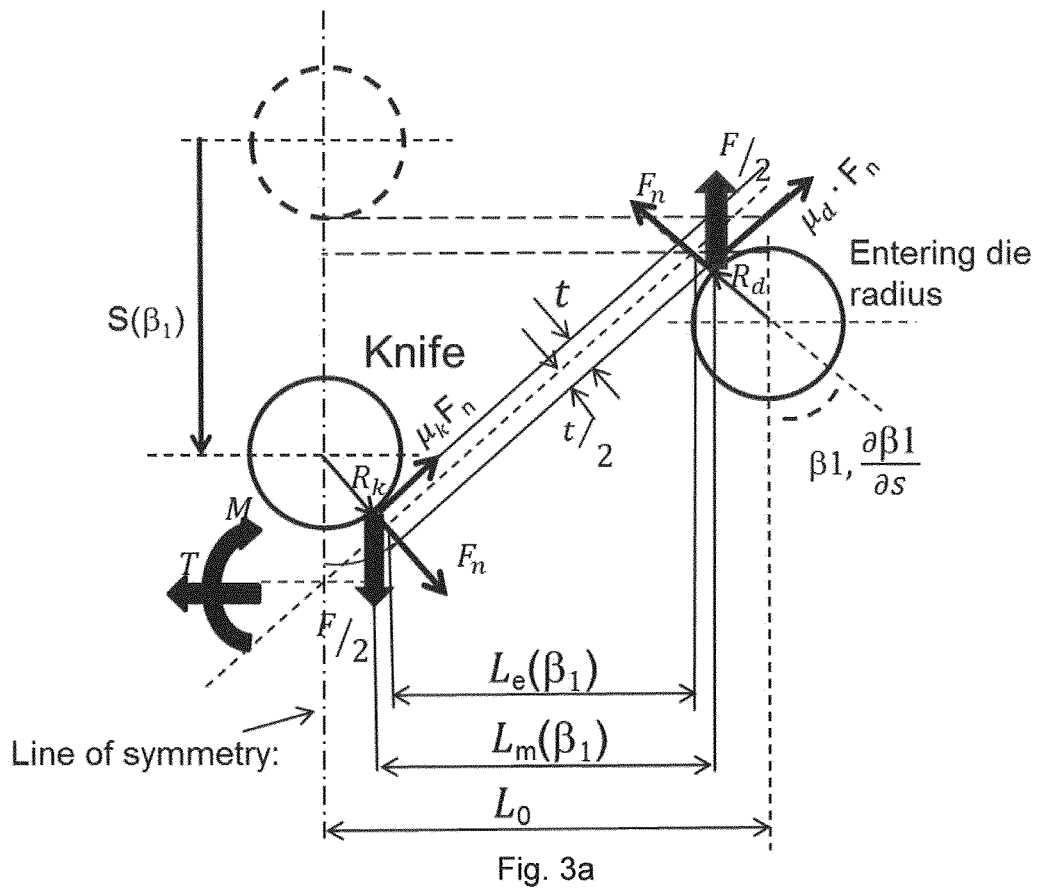
Figure 3B:
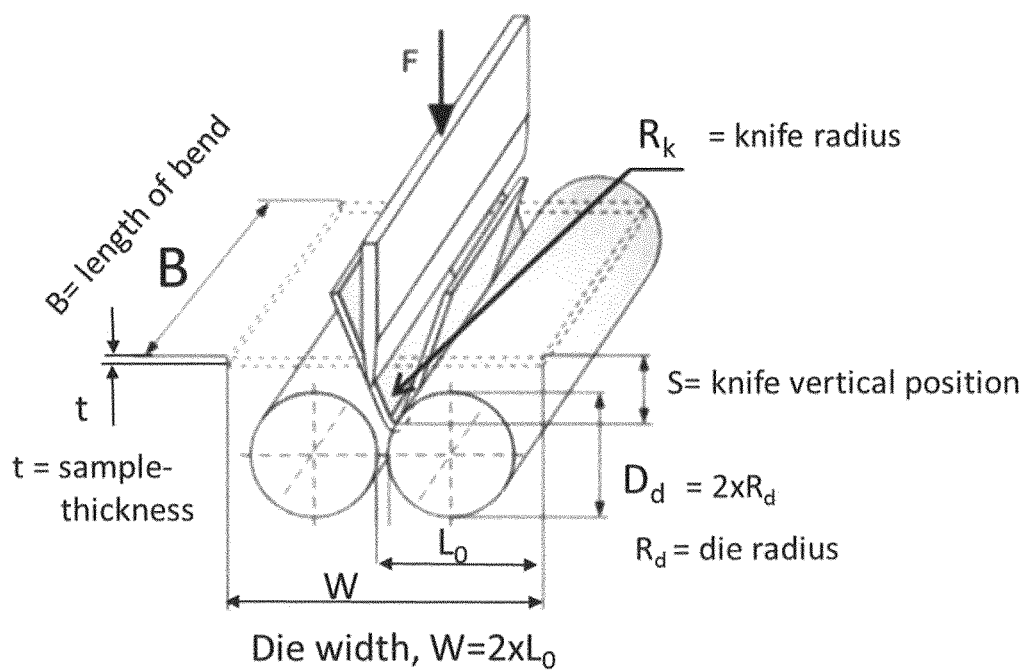

FIG. 3a shows the forces and moment acting on the material test sample during bending. $L_m(\beta_1)$ is the moment arm that will start with the initial value of $L_0$ (which is half of the die width) and will decrease during the stroke. The bending angle, $\beta_1$, is half of the total bending angle (as per VDA test).

Figure 4:
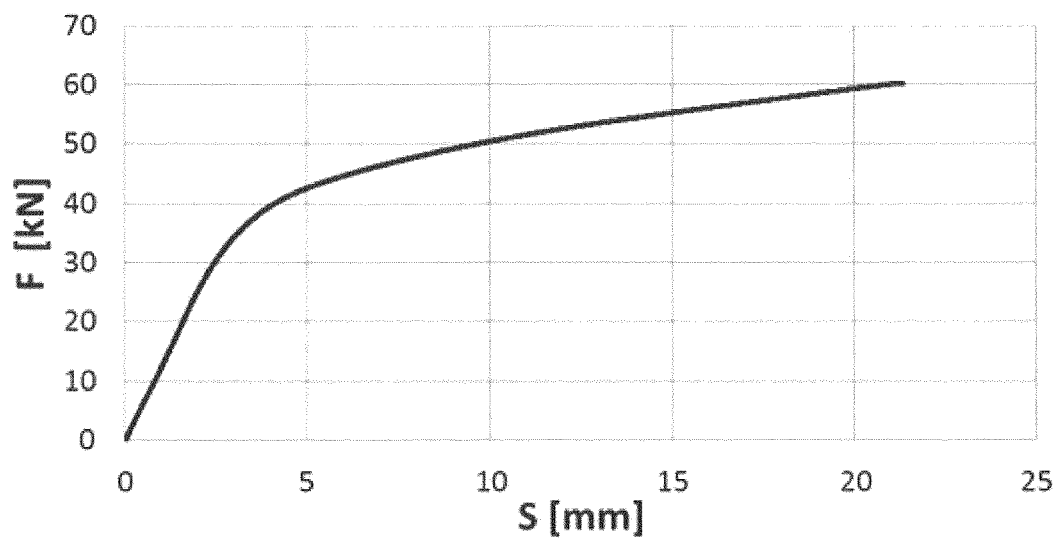
FIG. 4 shows a conventional force-curve from VDA 238-100 standard test.

FIG. 4 shows a typical force diagram from a VDA 238-100 standard test showing the applied force, F and the vertical displacement of the knife, S.

The vertical displacement of the knife, S can be expressed geometrically as a function of the bending angle $\beta_1$ as:

$$S(\beta_1) = L_0 \cdot \tan(\beta_1) + (R_d + R_k + t) \cdot \left(1 - \frac{1}{\cos(\beta_1)}\right) \quad [23]$$

Figure 5:
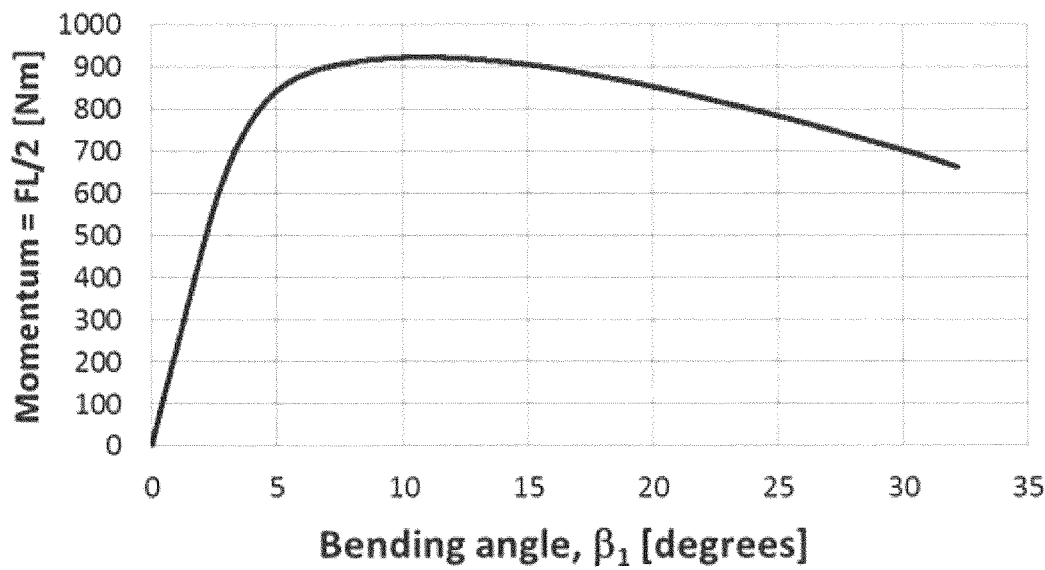
FIG. 5 shows a conventional moment curve calculated using the conventional formula for the moment.

By applying the conventional expression from the literature to calculate the cross-section moment, $$\text{i.e.} = \frac{F \cdot L_m(\beta_1)}{2}, \quad [24]$$

and also converting the distance S to the corresponding bending angle $\beta_1$, then the plot of cross-section moment, M, versus the bending angle, $\beta_1$, will have the form shown in FIG. 5.

It was observed that there is a mismatch between the energy input, ∫F ds [5a], during bending and the internal momentum and its energy, ∫2Md$\beta_1$ [5b], i.e. if applying the common expression for the momentum, $$M = \frac{F \cdot L_m(\beta_1)}{2} \quad [24]$$

is used (as shown in FIG. 5). The cross-section moment in bending, referring to the literature, should rather be constant after complete plastification.

It was thereby found that:

$$\int F ds \neq \int \frac{F \cdot L_m(\beta_1)}{2} 2 d\beta_1 \quad [26]$$

Reasonably, it must be a relationship between the travel distance of the knife, S, and the bending angle, $\beta_1$, that gives the correct expression and thereby achieves an energy-balance. By investigating the non-linearity between S and $\beta_1$, the true relationship between the applied force, F, and the cross-section, M, was derived, as follows.

Taking the first derivative of the geometrical function, equation [23] gives:

$$\frac{dS}{d\beta 1} = \frac{L_0 - (R_k + R_d + t) \cdot \text{Sin}(\beta 1)}{\text{Cos}(\beta 1)^2} = \frac{L_e}{\text{Cos}(\beta 1)^2} \quad [27]$$

The following function:

$$L_e = L_0 - (R_k + R_d + t) \cdot \sin(\beta_1) \quad [28]$$

$L_e$ is almost equal to the moment-arm, $L_m$, in bending, except for the material thickness, t.

Geometrically, the real moment-arm is (see FIG. 3a):

$$L_m(\beta_1) = L_0 - (R_k + R_d) \cdot \sin(\beta_1) \quad [29]$$

The energy balance expression, equation[5a/5b], can then be expressed as follows using the derivative, equation [27]:

$$\int F \cdot ds = \int M \cdot 2\frac{d\beta_2}{d\beta_1} \cdot d\beta_1 = \int M \cdot 2\frac{d\beta_2}{d\beta_1} \cdot \frac{d\beta_1}{dS} dS \Rightarrow F = \quad [30]$$

$$M \cdot 2\frac{d\beta_2}{d\beta_1} \cdot \frac{d\beta_1}{dS} = M \cdot 2\frac{d\beta_2}{d\beta_1} \cdot \frac{\text{Cos}(\beta 1)^2}{L_e}$$

Here a new angle, $\beta_2$, has been introduced, i.e. the real angle that will be at the bend due to the energy balance, and which is different from the geometrical bending angle, $\beta_1$, applied, see FIG. 3a. For small bending angles, $\beta_1$, it is true that the cross-section moment, M, is equal to $$\frac{F \cdot L_m(\beta_1)}{2}; \quad [24]$$

called $M_1$ herein.

Assuming that for large bending angles, the total moment, $M_{tot}$, is a sum of $M_1$ and $M_2$ where $M_2$ is an unknown function but is assumed to be a multiple of function $M_1$, $M_{tot}$ can be expressed as follows:

$$M_{tot} = \quad [31]$$

$$M_1 + M_1 \times f(\beta_1) = M_1 \times (1 + f(\beta_1)) = \frac{F \cdot Lm(\beta 1)}{2} \times (1 + f(\beta_1))$$

In order to balance the energy balance expression, the ratio:

$$\frac{d\beta_2}{d\beta_1} \quad [32]$$

is assumed to be equal to:

$$\frac{L_e}{L_m} \quad [33]$$

which gives:

$$F = \frac{F \cdot Lm(\beta 1)}{2} \times (1 + f(\beta_1)) \cdot 2\frac{L_e(\beta 1)}{L_m(\beta 1)} \cdot \frac{\text{Cos}(\beta 1)^2}{L_e(\beta 1)} \quad [34]$$

Hence;

$$F = F \cdot \text{Cos}(\beta_1)^2 \times (1 + f(\beta_1)) \quad [35]$$

It follows that:

$$f(\beta_1) = \text{Tan}(\beta_1)^2, \quad [36]$$

$$\left(\text{i.e. } \frac{1}{\text{Cos}^2(\beta)} = 1 + \text{Tan}^2(\beta)\right)$$

Finally, the expression for the cross-section moment, M, will then become:

$$M = \frac{F \cdot L_m(\beta_1)}{2 \cdot \cos^2(\beta_2)} \quad [1]$$

This correct formulation of the cross-section moment, M, which more accurately predicts the bending behaviour of materials, is even valid for large bending angles (i.e. typically angles greater than typically 6°).

Figure 7:
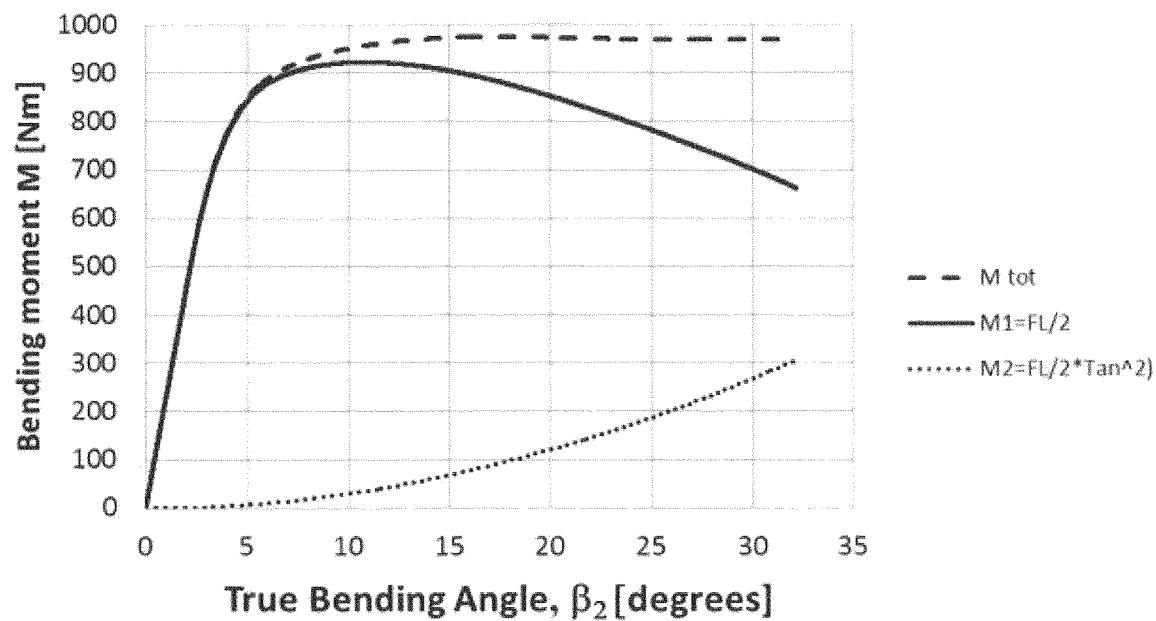
FIG. 7 shows the moment curve, $M_{tot}$, calculated using the calculated cross-section moment according to the present disclosure.

FIG. 7 shows the total moment, $M_{tot}$ as a sum of $M_1$ and $M_2$. The common expression, $M_1$ is valid only for small bending angles (i.e. angles up to about 6°). The angle $\beta_2$ is the true angle that the material is bent to, not the same as the bending angle, $\beta_1$ applied.

It can be theoretically confirmed that this solution is valid even if the flange becomes curved, i.e. the contact point will occur at the angle of $\beta_C$ instead of $\beta_1$ (see FIGS. 6a, 6b and 32), as is usually the case during bending.

Figure 6A:
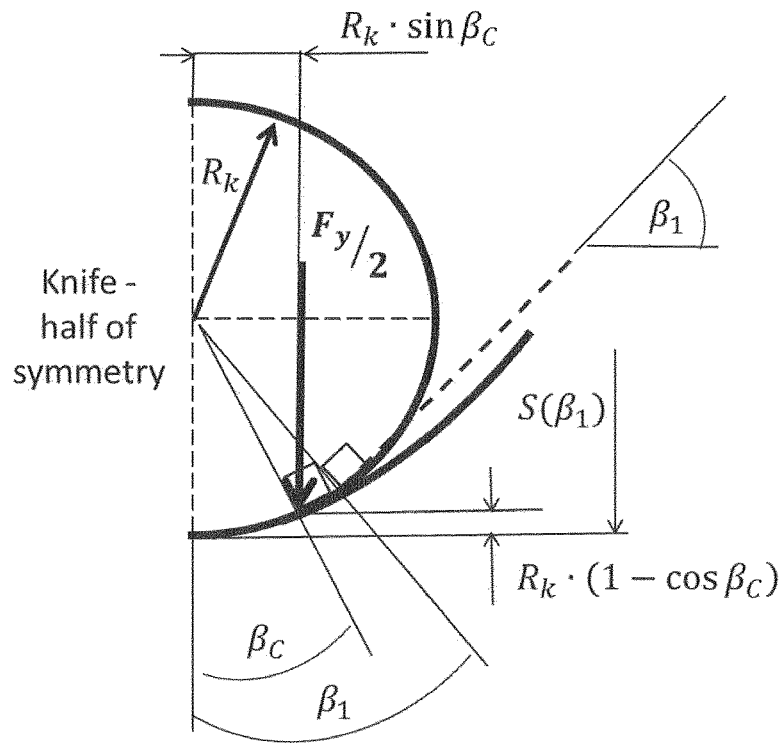
FIG. 6a shows the contact angle $\beta_C$ at the knife that arises when the flange becomes curved during the bending test.
Figure 6B:
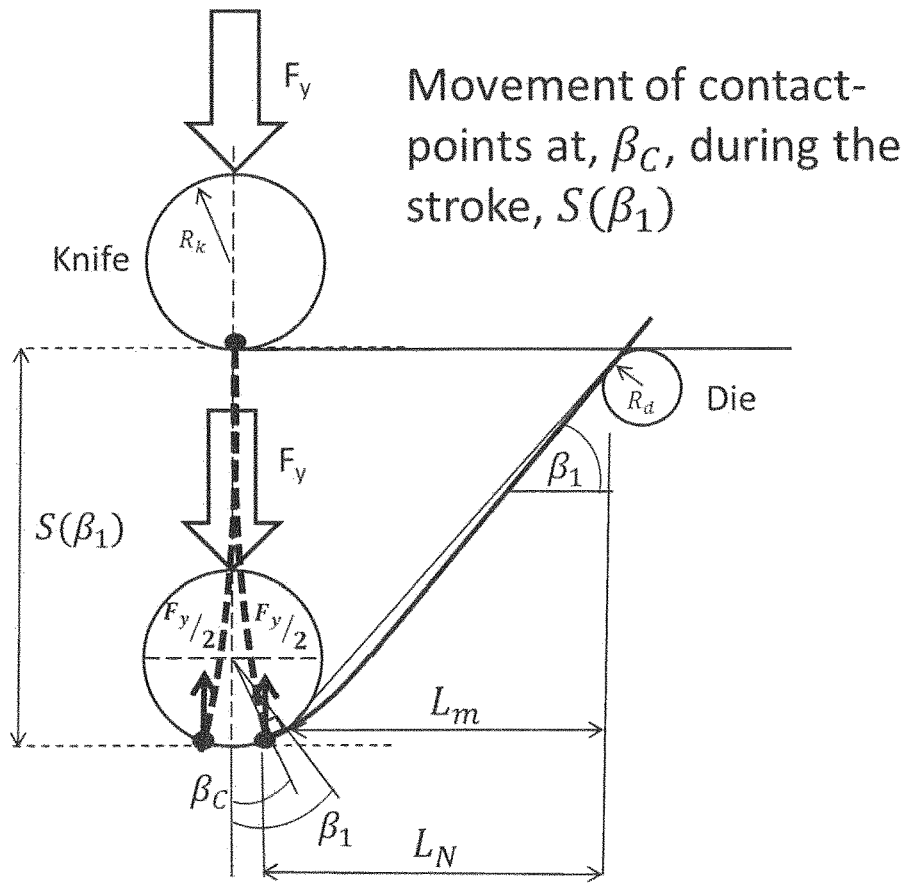
FIG. 6b shows how the contact angle $\beta_C$ develops as the knife moves down and the bend is induced.
Figure 32:
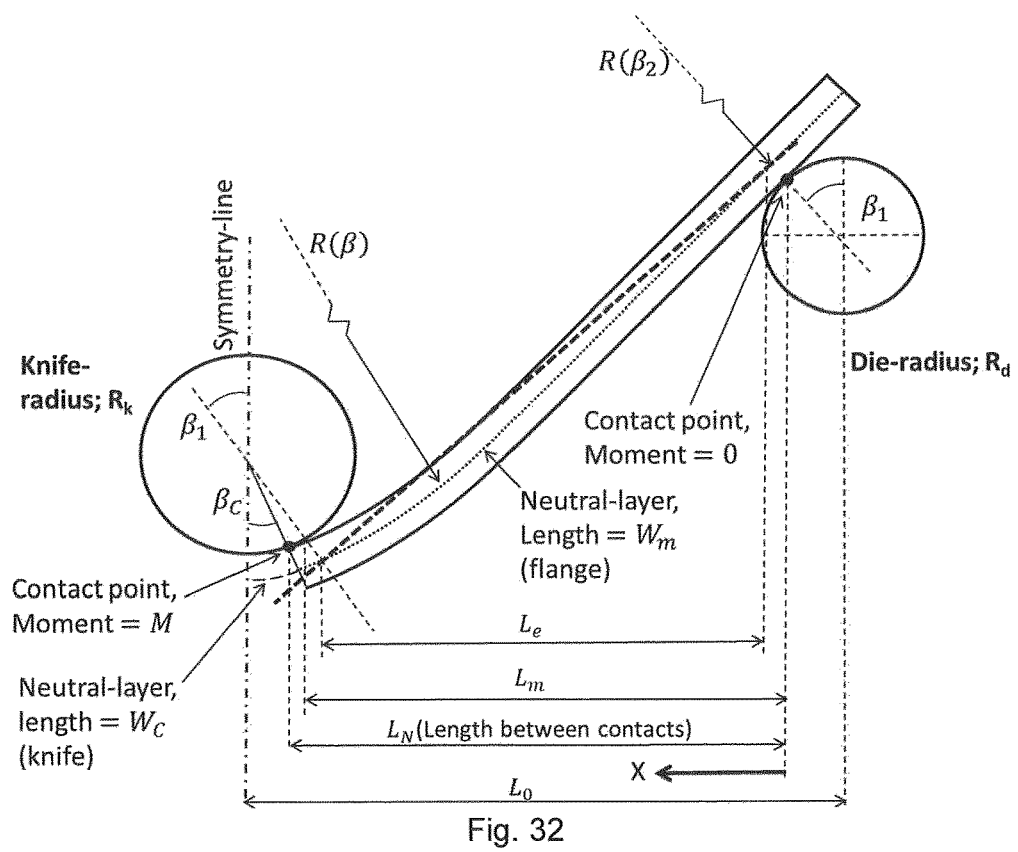
FIG. 32 shows a representation of the coordinate X which traverses the bending arm $L_N$ in the curvature vs position plot.

In more detail, FIG. 6a shows how the contact angle between the material and the bending knife, $\beta_C$, differs from the bending angle moved by the surface normal of the sample (e.g. plate) at the rollers, $\beta_1$, due to the curvature of the sample (e.g. plate) at the knife, and due to the radius of the knife itself. FIG. 6b shows how this contact point diverges outwards from the centre point of the bend as the knife moves down (i.e. the vertical displacement dS increases). FIG. 32 shows a clearer representation of how $\beta_C$ relates to the curvature of the sample (e.g. plate).

Thus:

$$M = \frac{d}{d\beta_2}\left[\frac{U}{2}\right] = \frac{d}{d\beta_1}\left[\int \frac{F_y}{2} \cdot \frac{dS_y}{d\beta_1} d\beta_1 + \int \frac{F_x}{2} \cdot \frac{dS_x}{d\beta_1} d\beta_1\right] \cdot \frac{d\beta_1}{d\beta_2} = \quad [37a]$$

$$= \frac{d}{d\beta_1}\left[\int \frac{F_y}{2} \cdot \frac{dS_y}{d\beta_1} d\beta_1 + \int \frac{F_y}{2} \tan\beta_C \cdot \frac{dS_x}{d\beta_1} d\beta_1\right] \cdot \frac{L_m}{L_e} = \quad [37b]$$

$$= \frac{F_y}{2} \cdot \left[\frac{dS_y}{d\beta_1} + \tan\beta_C \cdot \frac{dS_x}{d\beta_1}\right] \cdot \frac{L_m}{L_e} \quad [37c]$$

Where the movements of the contact-point is described by;

$$\frac{dS_y}{d\beta_1} = \frac{d}{d\beta_1}[S - R_k \cdot (1 - \cos\beta_C)] = \frac{L_e}{\cos^2\beta_1} - R_k \sin\beta_C \cdot \frac{d\beta_C}{d\beta_1} \quad [38]$$

$$\frac{dS_x}{d\beta_1} = \frac{d}{d\beta_1}[R_k \cdot \sin\beta_C] = R_k \cos\beta_C \cdot \frac{d\beta_C}{d\beta_1} \quad [39]$$

S, is the vertical knife-movement, $S_x$ is the horizontal movement of the contact point at the knife, and $S_y$ is the total vertical movement of the contact-point, taking into account that it moves upwards along the knife surface (see FIGS. 6a, 6b and 32).

Hence;

$$M = \frac{F_y}{2} \cdot \frac{L_e}{\cos^2 \beta_1} \cdot \frac{L_m}{L_e} = \frac{F_y}{2} \cdot \frac{L_m}{\cos^2 \beta_1} \quad [40]$$

The above calculations refer to the bending angles $\beta_1$ and $\beta_2$, and it is worthwhile clarifying the distinction between these two parameters.

The bending angle, $\beta_1$, is the conventional angle used in bending that can be geometrically calculated assuming a strictly straight flange. Using such an assumption, the contact angle at both the knife and die is the same and equal to $\beta_1$.

The true angle, $\beta_2$, takes account right length of the moment arm, i.e. $L_m$, (still considering a straight flange) based on the energy-equilibrium, Fds=2Mdβ. The combination of the true angle, $\beta_2$, and the correct formulation of the moment arm, $L_m$, allows a more accurate calculation especially for thicker materials and for large bending angles.

The moment-arm, $L_m$, is the horizontal distance between the tangential contact-points (knife and die-radius), while the moment arm $L_N$ is the horizontal distance between the actual contact points. The moment arm associated with the neutral layer is referred to as $L_e$, and is defined in relation to the actual bending angle $\beta_2$.

These parameters are shown in FIGS. 31 and 32. In FIG. 31, both measures, a, and, A, represent the length of the mid-layer, based on the moment-arms, $L_e$ and $L_m$, according to following expressions:

$$a = \frac{L_e}{\cos\beta_1} < A = \frac{L_m}{\cos\beta_1} \quad [41]$$

The difference between, A, and, a, are the end-points of the lines. Thus, a is defined relative to the distance between the points at which the tangential lines intersect a surface of the sample. In contrast, A is defined relative to the vertical line that runs from the tangential point on the die and knife, thus representing the mid-layer and its angular-change, $d\beta_2$.

However, the vertical displacement, dS, relates directly to the peripheral distance, b via the bending angle $\beta_1$. The peripheral distance, b, can be expressed both via the distances, a, and, A, but as a function of the different increments in angles $d\beta_1$ and $d\beta_2$ respectively, as A>a. In both cases, the vertical displacement, dS, has to be the same.

$$dS = \frac{b}{\cos\beta_1} = \frac{a \cdot d\beta_1}{\cos\beta_1} = \frac{L_e}{\cos^2\beta_1} \cdot d\beta_1 = \frac{A \cdot d\beta_2}{\cos\beta_1} = \frac{L_m}{\cos^2\beta_1} \cdot d\beta_2 \quad [42]$$

As the length, A, is larger than, a, the bending angle $d\beta_2$ will be less than $d\beta_1$ Hence:

$$d\beta_2 = \frac{L_e}{L_m} \cdot d\beta_1 \quad [43]$$

The plain strain (or main strain), $\varepsilon_1$, can also derived from the amount of energy input in bending, as set out below.

The following expression is well known regarding the relation between the shape radius and the total length of the middle-layer of the curved material.

$$\int 2d\beta = \frac{1}{R} \cdot dW_m \quad [44]$$

Where;

dβ, is the increment in the angle-acting in the interval between current status of bending angle, $\beta_2$, and the contact angle, $\beta_C$ $dW_m$, is the increment in length of the material, along the neutral-layer R, is the radius of curvature of the material.

The horizontal component, $dL_N$, of the length of curvature increment, $dS_m$, can be expressed as;

$$dL_N = dW_m \cdot \cos \beta_C \quad [45]$$

The contact-angle;

$$\beta_C = \frac{U}{M} - \beta_2 \quad [46]$$

(in line with the expression for, $\beta_C$, as earlier demonstrated—see particularly eq. [17])

Hence;

$$\int_{\beta_C}^{\beta} 2d\beta = 2(\beta_2 - \beta_c) = \int \frac{1}{R} \cdot dW_m = \int \frac{1}{R} \cdot \frac{dL_N}{\cos\beta_C} \quad [47]$$

It also follows that;

$$\frac{1}{R} = 2 \cdot \frac{d\beta_S}{dM} \cdot \frac{dM}{dL_N} \cdot \cos\beta_C = 2 \cdot \frac{d\beta_S}{dL_N} \cdot \cos\beta_C \quad [48]$$

Equation [48] can be derived as follows:

$$\int_{\beta_C}^{\beta_2} 2d\beta = 2(\beta_2 - \beta_c) = \quad [49]$$

$$\int \frac{1}{R} \cdot dW_m = \int 2 \cdot \frac{d\beta_S}{dL_N} \cdot \cos\beta_C \cdot \frac{dL_N}{\cos\beta_C} = \int 2 \cdot d\beta_S = 2\beta_S$$

hence $\beta_2 - \beta_c = \beta_S$, (i.e. $\beta_2 = \beta_c + \beta_S$) [50]

Where: $\dfrac{d\beta_S}{dM} = \dfrac{1}{M} \cdot (2\beta_2 - \beta_S) = \dfrac{U}{M^2}$ [51]

is the derivative expression, of the shape-angle with respect to the moment, M.

These formulae can be derived starting from the formula for the moment, M, equal to;

$$M = \frac{F \cdot L_m(\beta_1)}{2 \cdot \cos^2(\beta_1)} \quad [1]$$

As follows:

$$\frac{d\beta_S}{dM} = \frac{d}{dM}\left[\frac{1}{M} \cdot \int 2\beta_2 dM\right] = \frac{1}{M} \cdot (2\beta_2 - \beta_S) \quad [52]$$

$$U = \int FdS = \int 2 \cdot Md\beta_2 = M \cdot (2\beta_2 - \beta_S) \quad [53]$$

Hence, $$\frac{d\beta_S}{dM} = \frac{U}{M^2} \quad [54]$$

$$\frac{dM}{dL_N},$$

is the linear distribution of the moment, M, between the contact points of the knife and the die radius, simply equal to;

$$\frac{M}{L_N}.$$

It makes the expression to;

$$\frac{1}{R} = 2 \cdot \frac{U}{M \cdot L_N} \cdot \cos\beta_C \quad [55]$$

The expression [55] can be verified as follows:
Elastic energy at bending;

$$U_{el} = \frac{M^2 \cdot L}{2 \cdot E' \cdot I} \quad [56]$$

Where I, is the moment of inertia, E', The young-modulus for plain-strain

At small bending angles and at elastic state, $\beta_C=0$ and $\beta_2 \ll 1$, $L_N \approx L_m$ It makes;

$$\frac{1}{R} = 2 \cdot \frac{U}{M \cdot L_N} = 2 \cdot \frac{\left(\frac{M^2 \cdot L_m}{2 \cdot E' \cdot I}\right)}{(M \cdot L_N)} = \frac{M}{E' \cdot I} \quad [57]$$

This is in agreement with the formula known from the literature for elastic bending, $$M = E' \cdot I \cdot \frac{1}{R} \quad [58]$$

At elastic deformation, $$\beta_S = \beta_2 \text{ and } \beta_2 \ll 1, L_N \approx L_m \quad [59]$$

$$U_{el} = M(2\beta_2 - \beta_S) \approx \beta_2 M \quad [60]$$

-continued $$\frac{1}{R} = 2 \cdot \frac{U}{M \cdot L_N} = 2 \cdot \frac{\beta_2 M}{M \cdot L_N} \approx \frac{2\beta_2}{L_m} \quad [61]$$

By the expression for the shape of curvature; 1/R, the strains can be calculated, assuming the neutral-layer, i.e. where strain is zero, located at the middle of the cross-section of the material (at t/2).

$$\varepsilon_1 = \frac{t}{2 \cdot R} = t \cdot \frac{U}{M \cdot L_N} \cdot \cos\beta_C \quad [62]$$

As has been demonstrated before that;

$$\frac{dM}{dL_N} = \frac{M}{L_N} \quad [63]$$

This allows the curvature vs position at a coordinate X along the bending arm $L_N$ to be displayed at a given bending angle $\beta_2^*$:

$$X = \int_0^{M(\beta_2^*)} \frac{L_N(\beta_2^*)}{M(\beta_2^*)} dM \quad [64]$$

By the expression for 1/R, the Young-modulus can also be estimated, as shown below.

$$\frac{1}{R_{el}} = \frac{M}{E' \cdot I} \quad [65]$$

$$\frac{1}{R} = 2 \cdot \frac{U}{M \cdot L_N} \cdot \cos\beta_C \quad [66]$$

At elastic state, $$\beta_C=0 \text{ and } \beta_2 \ll 1, L_N \approx L_m \quad [67]$$

Which gives;

$$2 \cdot \frac{U}{M \cdot L_m} \leftrightarrow \frac{M}{E' \cdot I} \quad [68]$$

Then for plain strain:

$$E' = \text{Max}\left(\frac{M^2 L_m}{2 \cdot I \cdot U}\right) \quad [69]$$

Or for effective strain:

$$E = \text{Max}\left(\frac{M^2 L_m}{2 \cdot I \cdot U}\right) \cdot (1 - v^2) \quad [70]$$

The present disclosure also comprises a carrier containing a computer program code means that, when executed a computer or on at least one processor, causes the computer or at least one processor to carry out the method according to an embodiment of the present disclosure (i.e. whereby the computer program code means may be used to calculate the cross-section moment, M, and/or any of the other properties of the material described herein), wherein the carrier is one of an electronic signal, optical signal, radio signal or computer readable storage medium.

Typical computer readable storage media include electronic memory such as RAM, ROM, flash memory, magnetic tape, CD-ROM, DVD, Blueray disc etc.

The present disclosure further comprises a computer program product comprising software instructions that, when executed in a processor, performs the calculating step of a method according to an embodiment of the present disclosure.

The present disclosure further comprises an apparatus comprising a first module configured to perform the calculating step of a method according to an embodiment of the present disclosure, and optionally a second module configured to perform the calculating step of a method according to a further embodiment of the present disclosure.

For example, the first module may be configured to perform a calculating step to calculate the cross-section moment M, with the optional second module configured to perform a calculating step to calculate a further property of the material, such as the flow stress, main strain etc.

The disclosure further relates to a method in which said calculated cross-section moment, M, or the calculated flow stress, $\sigma_1$, or the estimated Young's modulus, E, or the ratio $M/M_e$, or the calculated plain strain, $\varepsilon_1$, or other property calculated using the methods disclosed herein, is used to optimize a product comprising said material.

The dimensionless ratio $M/M_e$ described further in Example 2 is particularly useful, as it shows the point at which a material becomes unstable during bending. Specifically, when $M/M_e$ is below 1.5, the material shows deformation hardening behaviour and is stable during bending. When $M/M_e$ reaches the level of 1.5, the material becomes unstable and by that close to failure.

The disclosure therefore relates to a method for determining the conditions under which $M/M_e$ remains below 1.5 for a given material. With knowledge of these conditions, the skilled person is able to ascertain the suitability of a particular material to a given application. For instance, the skilled person can easily ascertain whether a material is capable of being bent into a desired configuration without (or with minimal risk of) failure, allowing the suitability of the material to be predicted without extensive testing. This method may therefore comprise a further step of utilizing the material as a structural element in a composite product, characterized in that the material is bent under conditions wherein the ratio of $M/M_e$ is below 1.5 during the manufacture of the composite product.

The disclosure also relates to a method for determining the point at which a material becomes unstable during bending, said method comprising determining the point at which the ratio $M/M_e$ becomes 1.5.

The method may also be used to evaluate different materials to determine which materials have bending properties that meet predetermined values necessary for a certain use.

Advantageously, the moment characteristics obtained for different materials may also be super-positioned, allowing the cross-section behaviour of multi-layer materials to be predicted. In this way, the skilled person is able to use the methodology of the disclosure to design new composite materials, and to predict the bending properties of multi-layer materials based on knowledge of the individual layers.

For instance, high strength metallic materials such as high strength steel often have poor bending properties. Adding a layer of more ductile, lower strength material can provide composite materials with improved bending properties. Using the methodology of the disclosure, the skilled person can, without undue experimentation, determine what type of material is required in order to provide the desired bending properties to the high strength material.

Further details of how the moment characteristics for different materials may be super-positioned are provided in Example 5.

The method may also be used to evaluate sample (e.g. plate)s of the same material having different thicknesses, e.g. by studying the ratio of $M/M_e$.

The following examples implement the methodology of the disclosure to investigate and characterise the properties of various steels during bending.

Example 1

To confirm the correctness of the new expression for the cross-section moment, M, the bending force, F, was calculated using tensile-stress data. The material investigated was: a high strength hot-rolled steel having a tensile strength of >700 MPa a thickness of 2.1 mm. Bending data: Die width $L_o$=70.5 mm, knife radius $R_k$=16 mm and roller-radius Rd=25 mm.

The tensile-data is:

$$\bar{\sigma}(\bar{\varepsilon}) \qquad [71]$$

Converting tensile data to flow stress and plain strain, as:

$$\sigma_1 = \frac{2}{\sqrt{3}} \cdot \bar{\sigma} \text{ and } \varepsilon_1 = \bar{\varepsilon} \cdot \frac{\sqrt{3}}{2} \qquad [72]$$

assuming that $$\beta_2 \approx \beta_1 \left( \text{as } \beta_2 = \beta_1 - \int \frac{t \cdot \sin\beta_1}{L} \text{ and } L >> t \right) \qquad [73]$$

And furthermore by making the approximation that the relationship between bending angle and strain is:

$$\beta_2 \approx \varepsilon_1 \cdot \frac{L_m}{t} \qquad [74]$$

then;

$$L_m(\beta_{2(i=0)} = 0) = L_0 \text{ and } \beta_{2(i+1)} = \varepsilon_{1(i+1)} \cdot \frac{L_m(\beta_{2(i)})}{t} \qquad [75]$$

The expression for the total moment, M, can then be written as:

$$M = 2 \cdot B \cdot R^2 \int \sigma_1 \cdot \varepsilon_1 \cdot d\varepsilon \qquad [76]$$
$$= \frac{B \cdot t^2}{2 \cdot \varepsilon_1^2} \int \sigma_1 \cdot \varepsilon_1 \cdot d\varepsilon$$
$$= \frac{B \cdot t^2}{2 \cdot \varepsilon_1^2} \int \frac{2}{\sqrt{3}} \bar{\sigma} \cdot \varepsilon_1 \cdot d\varepsilon_1$$

Combining it with the expression:

$$M = \frac{F \cdot L_m(\beta_1)}{2 \cdot \cos^2(\beta_1)} \text{ and set } \beta_2 = \beta_1 \qquad [1]$$

then the force, F, becomes;

$$F = \frac{2 \cdot \cos^2(\beta_2)}{L_m(\beta_2)} \cdot \frac{B \cdot t^2}{2 \cdot \varepsilon_1^2} \int \frac{2}{\sqrt{3}} \sigma \cdot \varepsilon_1 \cdot d\varepsilon_1 \qquad [77]$$

The relationship between bending angle, $\beta_2$, and the knife position, S, is given by:

$$\frac{dS}{d\beta_2} = \frac{dS}{d\beta_1} \cdot \frac{d\beta_1}{d\beta_2} \approx \frac{L_e}{\cos^2(\beta_2)} \cdot \frac{L_m}{L_e} = \frac{L_m}{\cos^2(\beta_2)} \qquad [78]$$

Hence:

$$S \approx \int \frac{L_m(\beta_2)}{\cos^2(\beta_2)} \cdot d\beta_2 \qquad [79]$$

Figure 8:
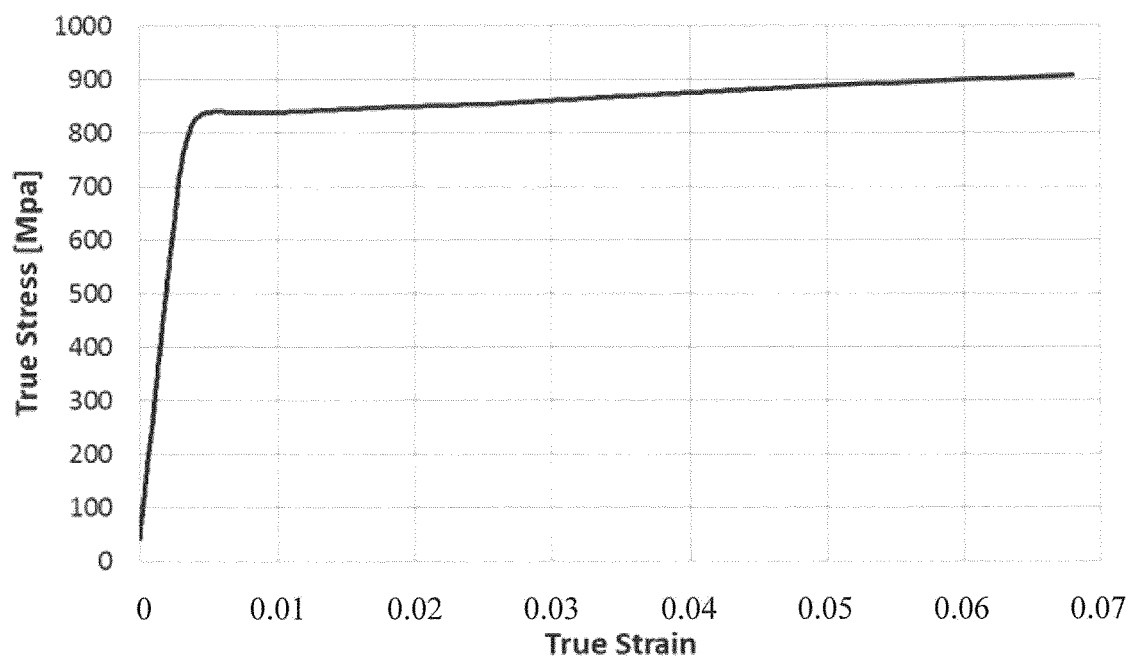
FIG. 8 shows tensile test data obtained from tests on a 700 MPa steel.

By using the tensile data, shown in FIG. 8, an estimation of the bending force can then be obtained (see FIG. 8), which confirms the correctness of the expression for the cross-section moment, M.

Figure 9:
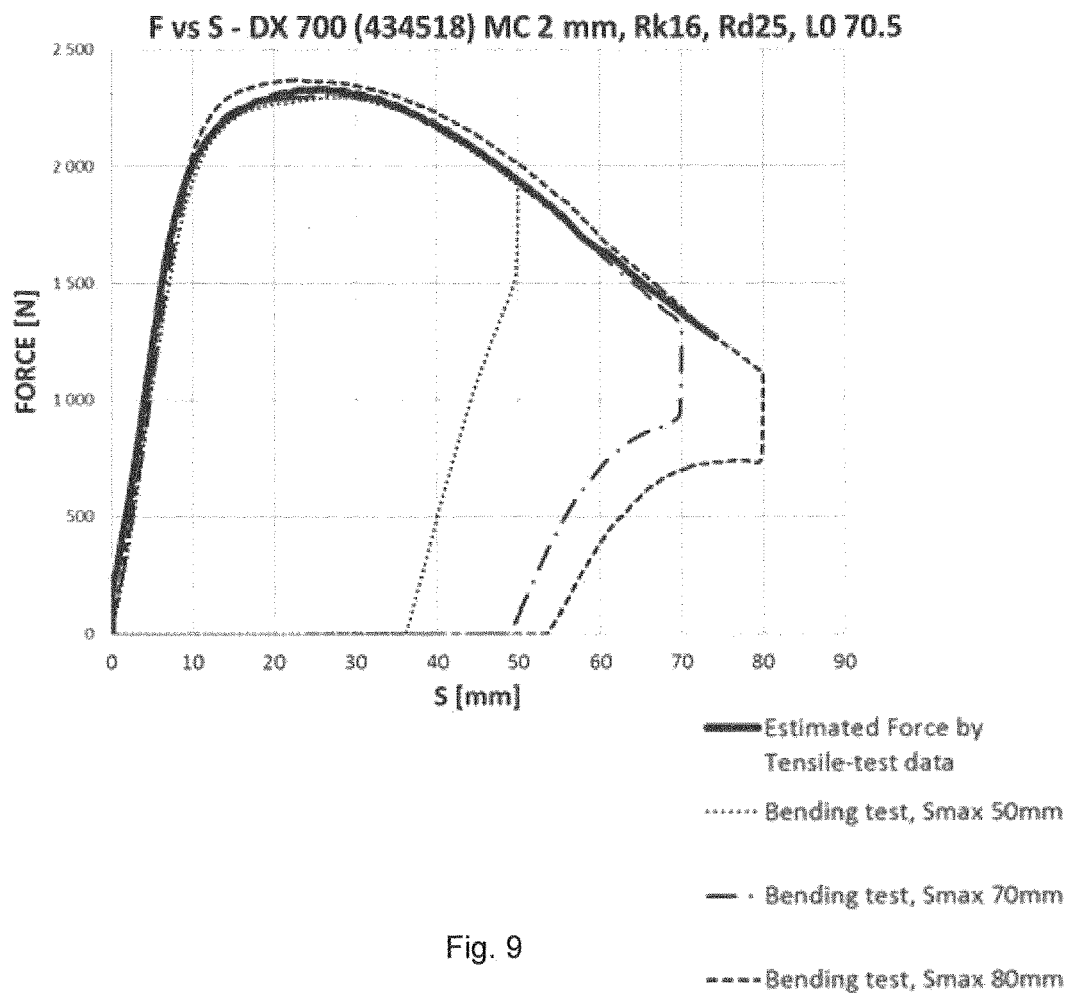
FIG. 9 shows a comparison between the calculated bending force based on 700 MPa steel tensile test data and three bending tests performed on the same material with different stroke lengths, FIG. 10 schematically illustrates a coil of metallic material.

FIG. 9 shows a comparison between the calculated bending force (solid line) based on tensile test data and three individual bending tests performed on the same material but with different stroke length, S. The right-hand sides of the three bending test curves represent the unloading. The bending line was placed along the rolling direction (RD) and the tensile test data was performed perpendicular to the rolling direction (TD).

Figure 10:
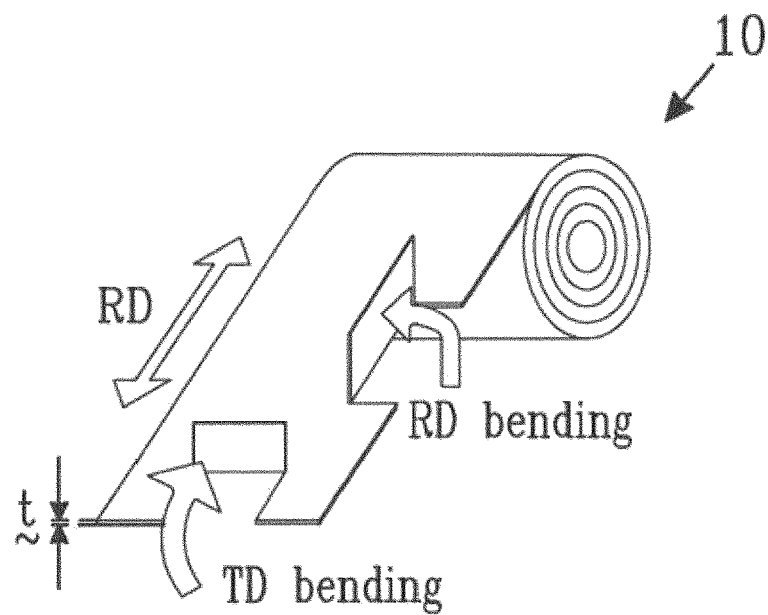

FIG. 10 schematically illustrates a coil of hot-rolled steel product 10 from which samples may be cut for a bending test. Bending tests may be performed in both the rolling (RD) direction and in a direction transverse to rolling (TD). Additionally, tests can also preferably be performed by turning the samples with rolling-mill side up and down verifying the symmetry of the textures. FIG. 10 shows the bend orientation with respect to a coil of hot-rolled steel product 10.

This example showed that the metallic material 10 has a similar behaviour during a bending test and a tensile test. As a tensile test is an average value of the cross-section properties, compared to bending where the properties are "scanned" from outer surface and inwards, this case shows that the metallic material 10 behaved uniformly throughout its thickness. Furthermore, FIG. 9 shows that the force drops naturally, and not because of any failures in this case, which illustrates the shortcomings in the VDA 238-100 standard test.

Example 2

Figure 11:
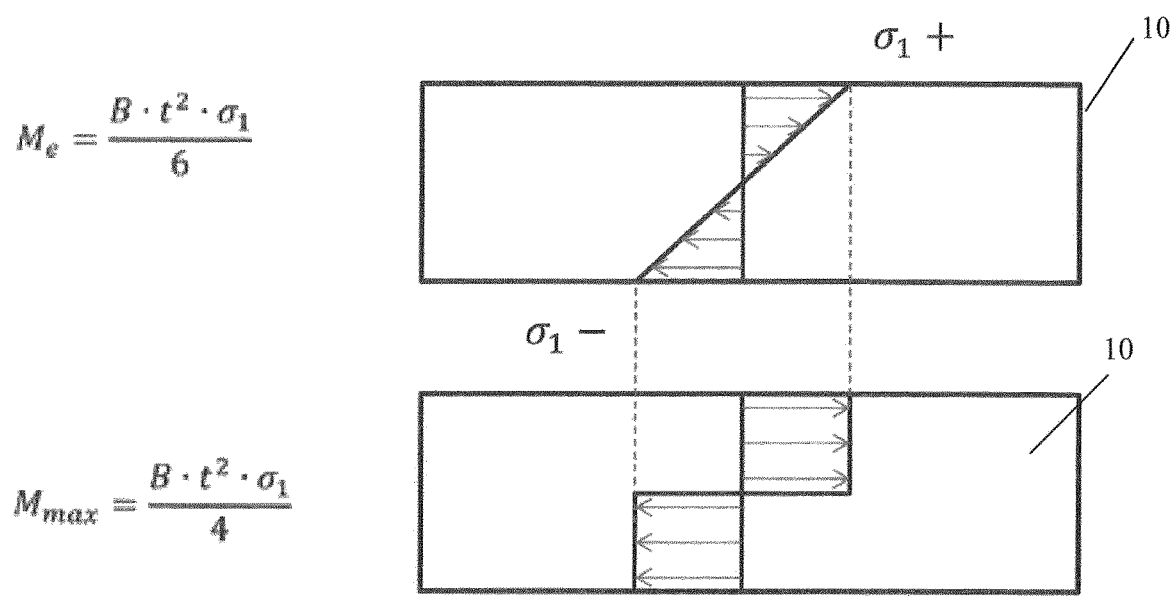
FIG. 11 shows the theoretical elastic cross-section moment and the maximum cross-section moment at bending.

In this example a non-dimensional moment (as described in the publication entitled "Plastic Bending—Theory and Application" by T. X. You and L. C. Zhang, ISBN 981022267X) will be exemplified. The non-dimensional moment may be derived by the ratio between the maximum cross-section moment, $M_{max}$, and the elastic cross-section moment; $M_e$. This ratio has two limits; a lower limit that is equal to 1.0 and an upper limit equal to 1.5. The first case is when the material is deformed elastically; the latter case is the state that the material reaches at its absolute maximum moment. Previously, it has not been possible to obtain the material plastification characteristics in between these limits. FIG. 11 shows the equations representing these two limits, i.e. the theoretical elastic cross-section moment, $M_e$ and the maximum cross-section moment, $M_{max}$, at bending, and also schematic drawings of the stress distributions in the both cases.

The lower and upper limits of the ratio are as follows, using the two equations shown in FIG. 11:

$$\frac{M_e}{M_e} = 1.0 \qquad [80]$$

$$\frac{M_{max}}{M_e} = \frac{6}{4} = 1.5 \qquad [81]$$

However, to get the entire material response in the whole interval from the elastic state up to the maximum load-carrying capacity, the expression is written as:

$$1 \leq \frac{M(\beta_2)}{M_e(\beta_2)} \leq 1.5 \qquad [82]$$

where $M(\beta_2)$ is the newly disclosed function.

The metallic material 10 that was investigated in this example was a high strength cold-reduced dual phase grade steel having a thickness of 1.43 mm and a tensile strength of >1180 MPa.

Figure 12:
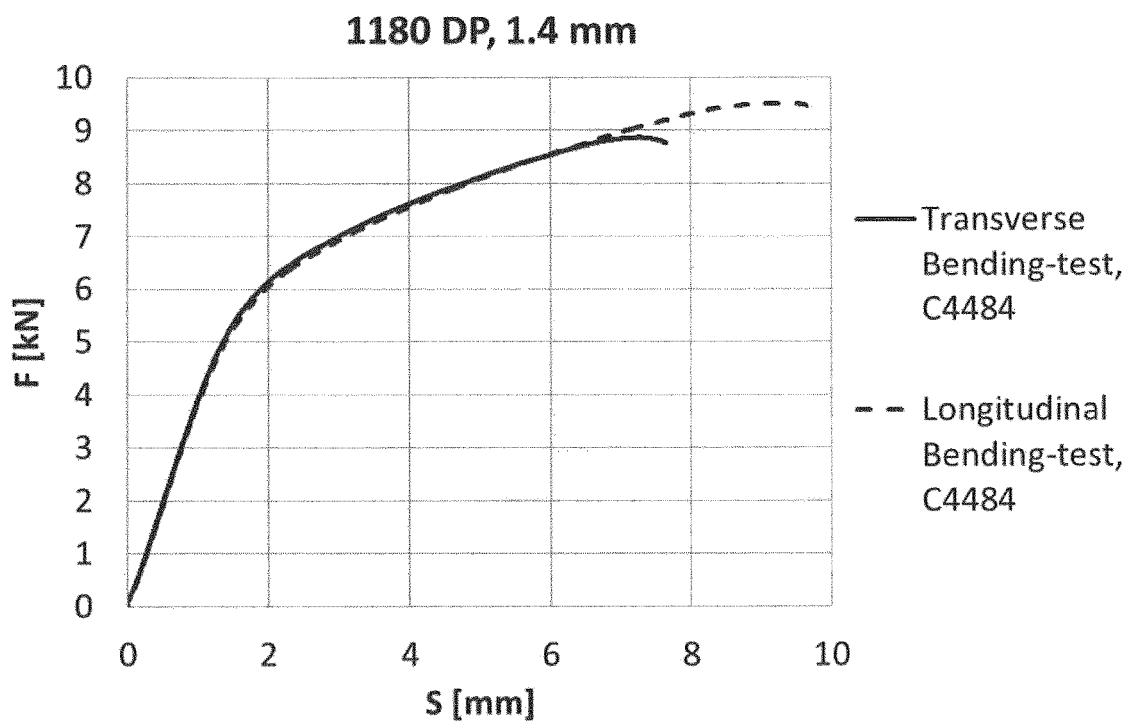
FIG. 12 shows the force versus knife position measured at bending.

FIG. 12 shows the applied force versus the knife position S during bending in a VDA 238-100 standard test. From the bending test, the responses were obtained by measuring the force applied and the position of the knife. The material was tested in both transverse (TD) direction and along the rolling direction (RD). Then the force was transformed to the calculated cross-section moment, M, using the newly disclosed expression, see FIG. 13. The angle $\beta_2$, was obtained by subtracting the fault angle, $\Delta\beta_2$, (which is important to take into account when calculating the spring back, i.e. over-bending angle) from the $\beta_1$, bending angle applied, calculated as indicated below:

Using the relationship based on the condition for energy equilibrium:

$$\frac{d\beta_2}{d\beta_1} = \frac{L_e}{L_m} \qquad [83]$$

Then $\beta_2$, can be obtained from the integral:

$$\beta_2 = \int \frac{L_e}{L_m} d\beta_1 = \beta_1 - \int \frac{t \cdot \sin(\beta_1)}{L_m(\beta_1)} d\beta_1 = \beta_1 - \Delta\beta_2 \qquad [84]$$

where $\beta_1$ is calculated using equation [23].

The ratio $M/M_e$ was derived herein as:

$$\frac{M}{M_e} = \frac{3}{\left(\left(\frac{dM}{d\beta_2} \middle/ \frac{M}{\beta_2}\right) + 2\right)} \qquad [85a]$$

Formula [85a] was derived by taking a derivative of the strain as expressed using formula [4a]. As a result, it is less accurate when the material undergoes plastic deformation. An alternative expression for this ratio is as follows:

$$\frac{M}{M_e} = \frac{3}{\left(\left(\frac{dM}{d\varepsilon_1} \Big/ \frac{M}{\varepsilon_1}\right) + 2\right)} \quad [85b]$$

This expression may be solved numerically using [4b] for the strain to give a more accurate result under all bending conditions. A further methodology for calculating the ratio $M/M_e$ is to use the tensile strength, as shown in formula [92].

The expression can easily be verified for the elastic part of deformation, as the derivative $$\frac{dM}{d\beta_2}, \text{ is equal to the ratio } \frac{M}{\beta_2}, \text{ i.e.} \left(\frac{2E'I}{L_m}\right)$$

making the ratio equal to 1.0.

When the derivative $$\frac{dM}{d\beta_2} = 0 \quad [86]$$

then the ratio will become equal to 1.5. This means that when the moment M drops, the material is failing or strain is localized.

The flow stress can also be obtained from the moment derived from equation [76]:

$$\sigma_1 = \frac{2}{B \cdot t^2 \cdot \varepsilon_1} \cdot \frac{d}{d\varepsilon_1}(M \cdot \varepsilon_1^2) \quad [87]$$

Where the main strain, $\varepsilon_1$ is calculated from:

$$\varepsilon_1 = \beta_2 \cdot \frac{t}{L_m(\beta_1)} \quad [3]$$

or alternatively:

$$\varepsilon_1 = t \cdot \frac{U}{M \cdot L_N(\beta_1, \beta_C)} \cdot \cos(\beta_C) \quad [4b]$$

Figure 14A:
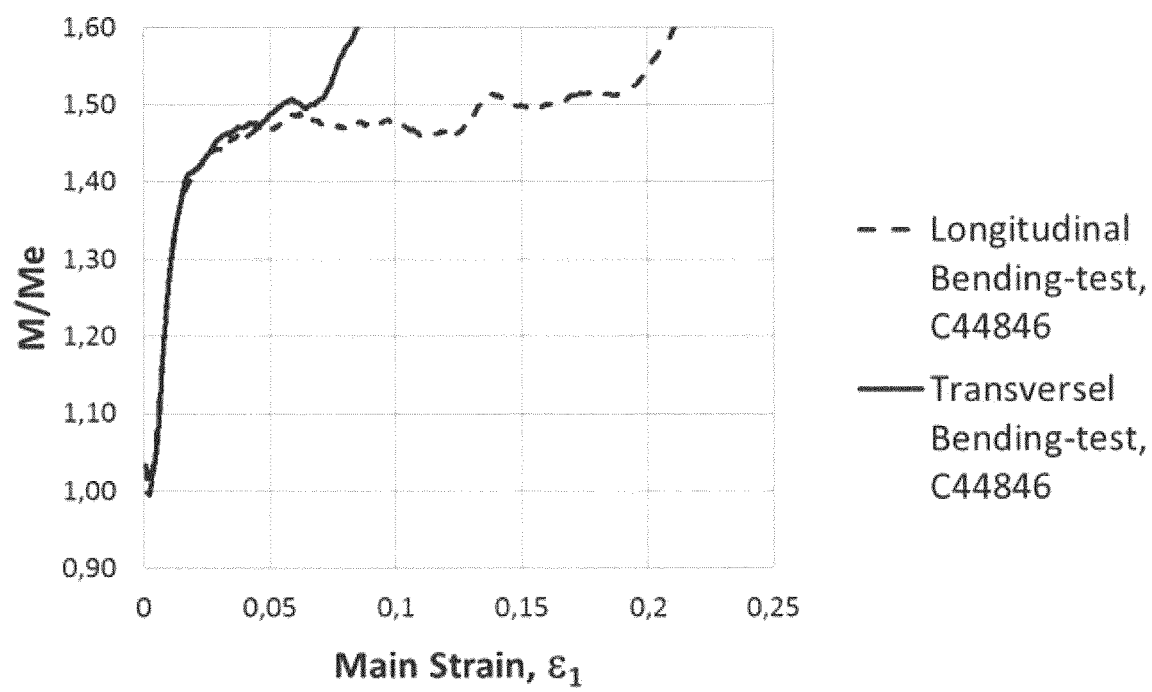
FIG. 14a shows the calculated non-dimensional moment $M/M_e$, plotted against strain calculated using formula [3]
Figure 14B:
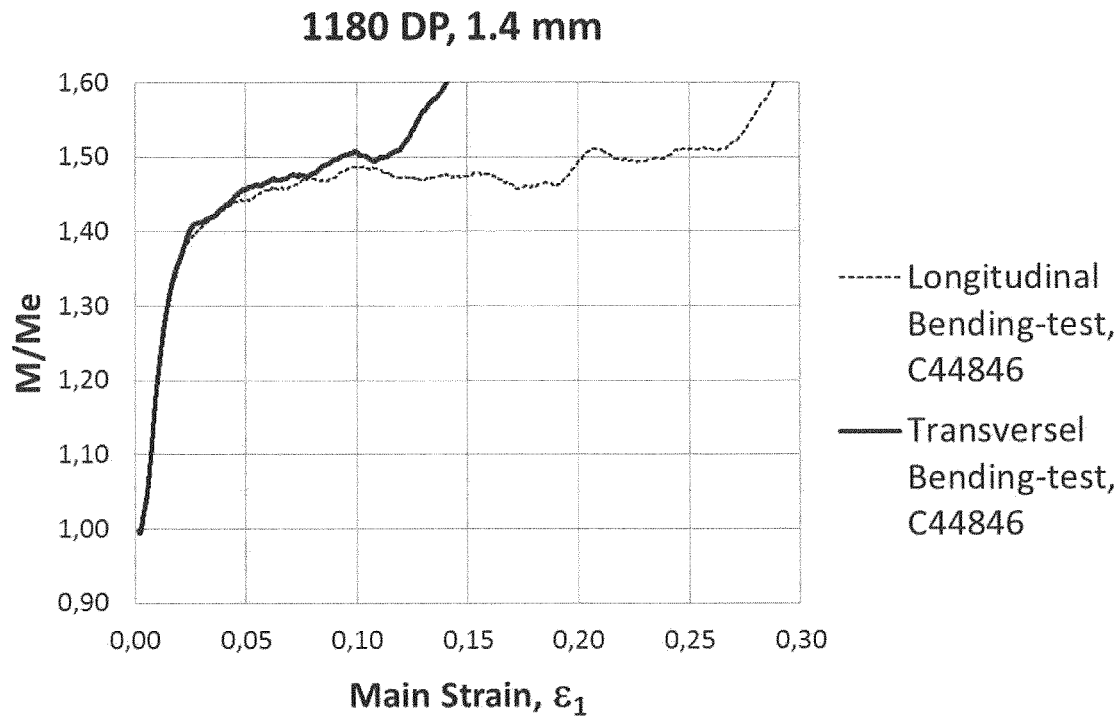
FIG. 14b shows the calculated non-dimensional moment $M/M_e$, plotted against strain calculated using formula [4b]

By applying equation [86] in this example, the calculated non-dimensional moment diagram, $M/M_e$, plotted against main strain will be as shown in FIGS. 14a and 14b (using formula [3] and [4b] respectively).

Figure 15A:
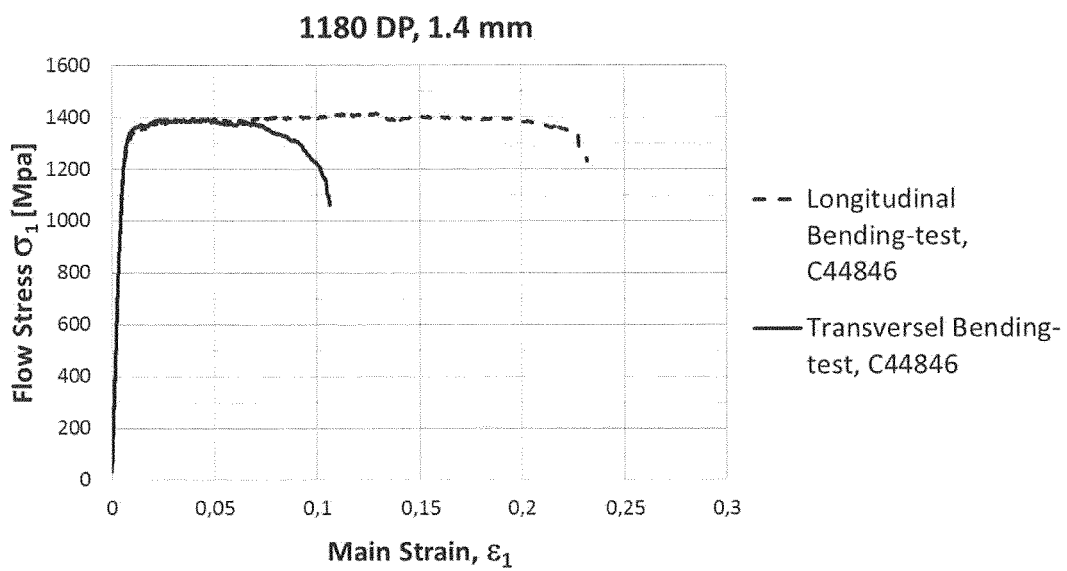
FIG. 15a shows the flow stress obtained using the calculated cross-section moment according to the present disclosure, using formula [3] to calculate strain.
Figure 15B:
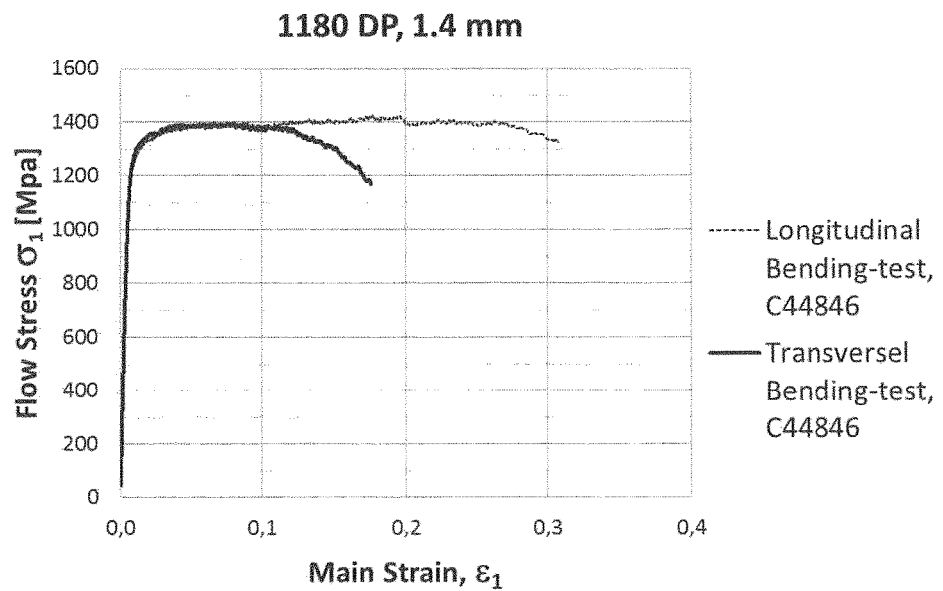
FIG. 15b shows the flow stress obtained using the calculated cross-section moment according to the present disclosure, using formula [4b] to calculate strain.

FIGS. 15a and 15b shows a plot of the flow stresses versus main strain, $\varepsilon_1$, again calculated using formula [3] and [4b] respectively.

Using the method according to the present disclosure makes it possible to use a material's bending behaviour to estimate the material's Young's modulus, E.

Young's modulus in plain strain, E', is given by:

$$E' = \frac{E}{(1 - v^2)} \quad [11]$$

For steel, this can be expressed as:

$$E' \approx \frac{E}{(1 - 0.3^2)} \quad [12]$$

In this example, Young's modulus was given by:

$$2.18 \cdot 10^5 \text{ MPa}$$

Figure 16A:
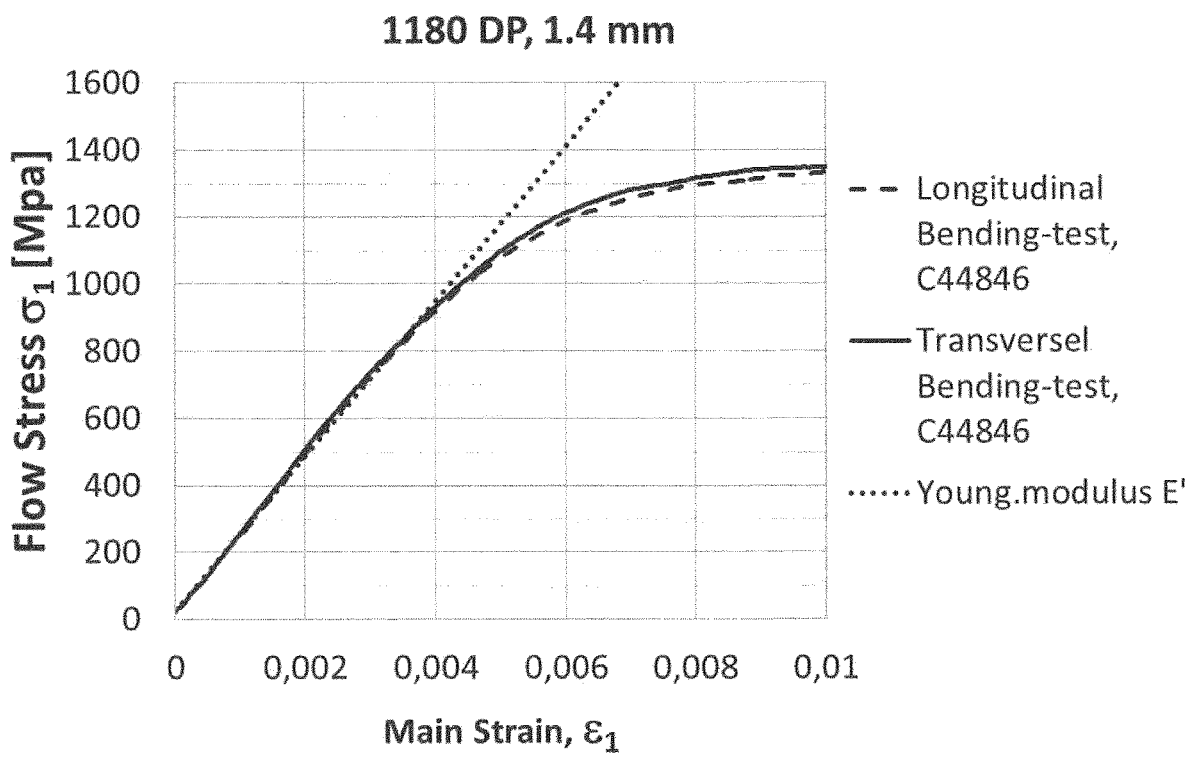
FIG. 16a shows an estimation of Young's modulus obtained using a method according to the present disclosure.

FIG. 16a shows a graph of main strain, ac versus flow stress, $\sigma_1$, with the Young's modulus being extrapolated therefrom.

Another way of obtaining Young's modulus, E is by determining the gradient of the elastic part of the moment curve (such as that shown in FIG. 13), whereby the gradient is:

$$\left(\frac{2 \cdot E \cdot I}{L_m}\right) \quad [10]$$

Preferably, the Young's modulus may be estimated numerically using formula [13]:

$$E' = \text{Max}\left(\frac{M^2 L_m}{2 \cdot I \cdot U}\right) \quad [13]$$

Figure 16B:
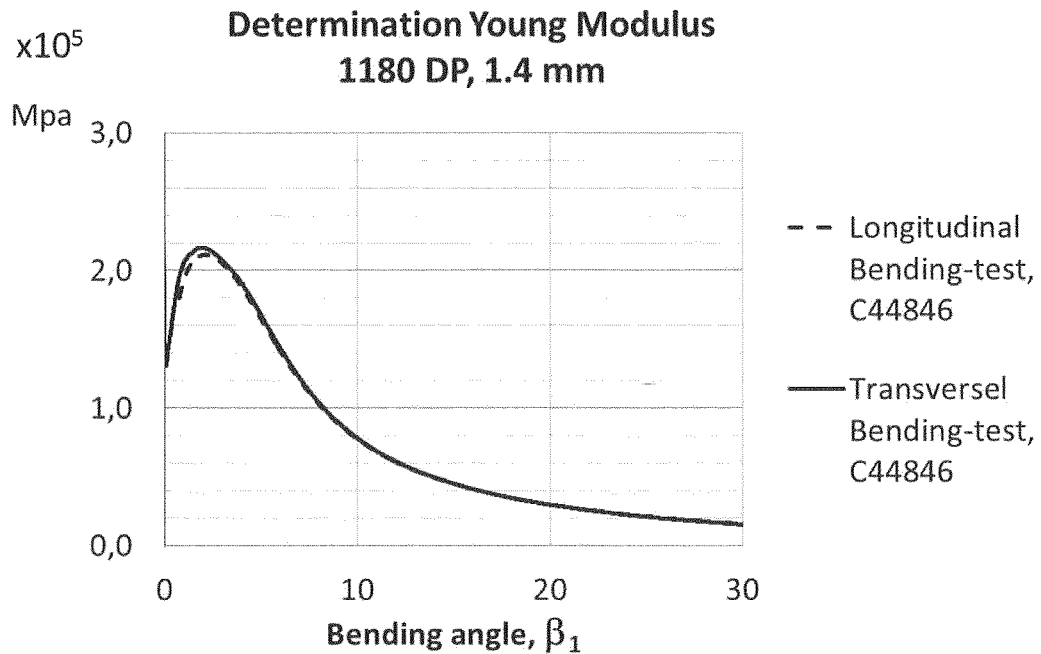
FIG. 16b shows an estimation of Young's modulus obtained using an alternative methodology.

An example of this methodology is shown in FIG. 16b, which again gives a value of $2.18 \times 10^5$ MPa.

The relationship between effective stress and strain, flow stress, $\sigma_1$ can be converted using the following expressions, assuming plain strain conditions:

$$\bar{\sigma} = \frac{\sqrt{3}}{2} \cdot \sigma_1 \quad [88]$$

and $$\bar{\varepsilon} = \frac{2}{\sqrt{3}} \cdot \varepsilon_1 \quad [89]$$

and converting to true values using:

$$\sigma_{tr} = \bar{\sigma} \cdot (1 + \bar{\varepsilon}) \quad [90]$$

and $$\varepsilon_{tr} = \bar{\varepsilon} \cdot \ln(1 + \bar{\varepsilon}) \quad [91]$$

It is even possible to plot and compare the graph with tensile test data. This will indicate how the hardening behaviour should act if the material's properties are the same from its surface to its centre. If the results of the deformation mechanisms in bending and during pure tension are similar, this is evidence that the material is homogeneous throughout its thickness.

To define the $M/M_e$ ratio from tensile data, the following derived expression is used:

$$\frac{M}{M_e} = \frac{\frac{B \cdot t^2}{2 \cdot \varepsilon_1^2} \int \sigma_1 \cdot \varepsilon_1 \cdot d\varepsilon_1}{\frac{B \cdot t^2 \cdot \sigma_1}{6}} = \frac{3}{\sigma_1 \cdot \varepsilon_1^2} \int \sigma_1 \cdot \varepsilon_1 \cdot d\varepsilon_1 = \frac{3}{\overline{\sigma} \cdot \overline{\varepsilon}^2} \int \overline{\sigma} \cdot \overline{\varepsilon} \cdot d\overline{\varepsilon} \qquad [92]$$

Figure 17:
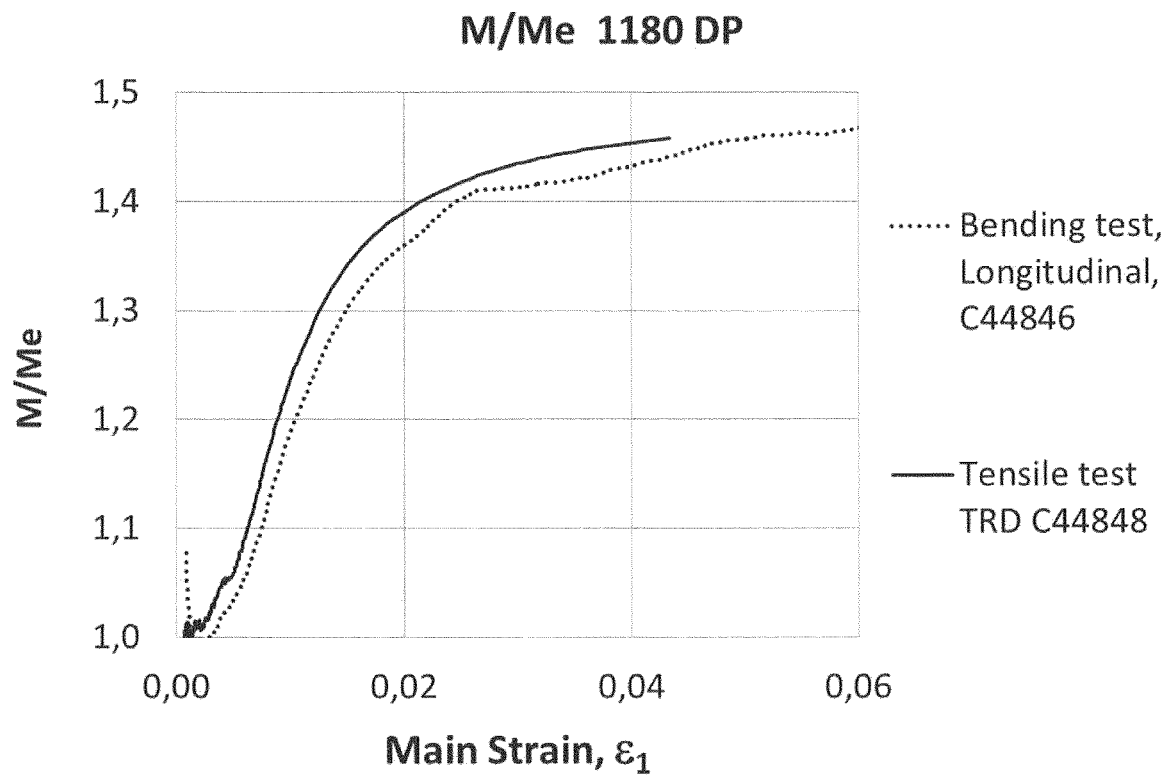
FIG. 17 shows a comparison of the ratio of $M/M_e$ values obtained from tensile tests and bending tests.

FIG. 17 shows a comparison between a tensile test and bending tests. In the illustrated case the metallic material seems to harden approximately in similar way, comparing bending and uniform stretching.

According to an embodiment of the disclosure, the method comprises the step of obtaining a cross-section moment, M, of a material and using it to estimate the spring-back for a free choice of set up in bending.

When bending, spring-back is always compensated for by making a certain number of degrees of "over-bending" to get the final degree of bend. It is difficult to estimate the amount of degrees of "over-bending" to finally get the desired bend. When handling a material such as high strength steel, it is even more complicated as the spring-back behaviour is higher compared to a material such as mild steel. A thin (3.2 mm) Ultra High Strength Steel was used to investigate the spring-back-effect in four cases of setup for bending. The ultimate strength was approximately 1400-1450 MPa.

The method comprises three steps, see FIG. 18: In the first step the material is tested to determine the material-characteristics in bending, e.g. by performing a VDA 238-100 standard test type of bending, i.e. friction-free bending, obtaining a fully plastified cross-section. In the second step, the moment curve is transformed regarding geometry of a free choice of geometrical setup for a certain case in bending. In the third step these data are used to calculate the spring-back. Even thickness can be converted from the material that has been investigated in the first step. The most accurate result is obtained when using same batch of material in the first and second steps, due to differences in material characteristics.

Material characteristics are obtained by performing the VDA 238-100 standard test, or another type of friction free bending equipment, giving a "thumb-print" of a current material, by obtaining a moment-curve vs angle diagram. When testing the material characteristics, a narrow die-width is used and a small radius of the knife, approximately 0.7*t for thicker hot-rolled material. The roller radii are friction free, i.e. able to rotate. The maximal bending angle (half bending angle, $\beta_1$) should not be more than 30-35°, eliminating every kind of friction adding a fault energy not connected to the material behaviour.

Figure 13:
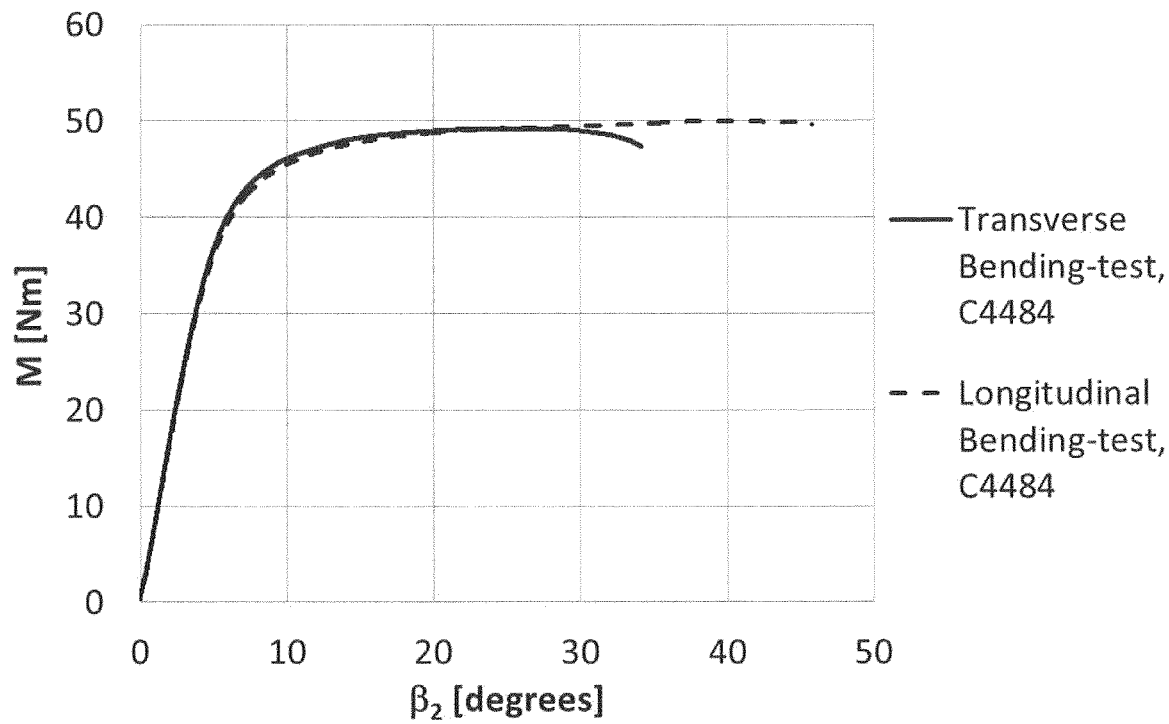
FIG. 13 shows the calculated cross-section moment according to the present disclosure.

By using a method according to the present disclosure, a moment-diagram, such as the moment-diagram shown in FIG. 13, can be obtained, based on the measured force vs knife-position, such as the diagram shown in FIG. 4, and the geometry for the trial-setup.

$R_d$ representing the roller radius may for example be 40.0 mm, the knife radius may be 2.0 mm, t (the material thickness) may be 3.2 mm, $L_0$ the half die-width may be 46 mm and finally, B, the length of the material (i.e. bending length) may be 75 mm.

Figure 20:
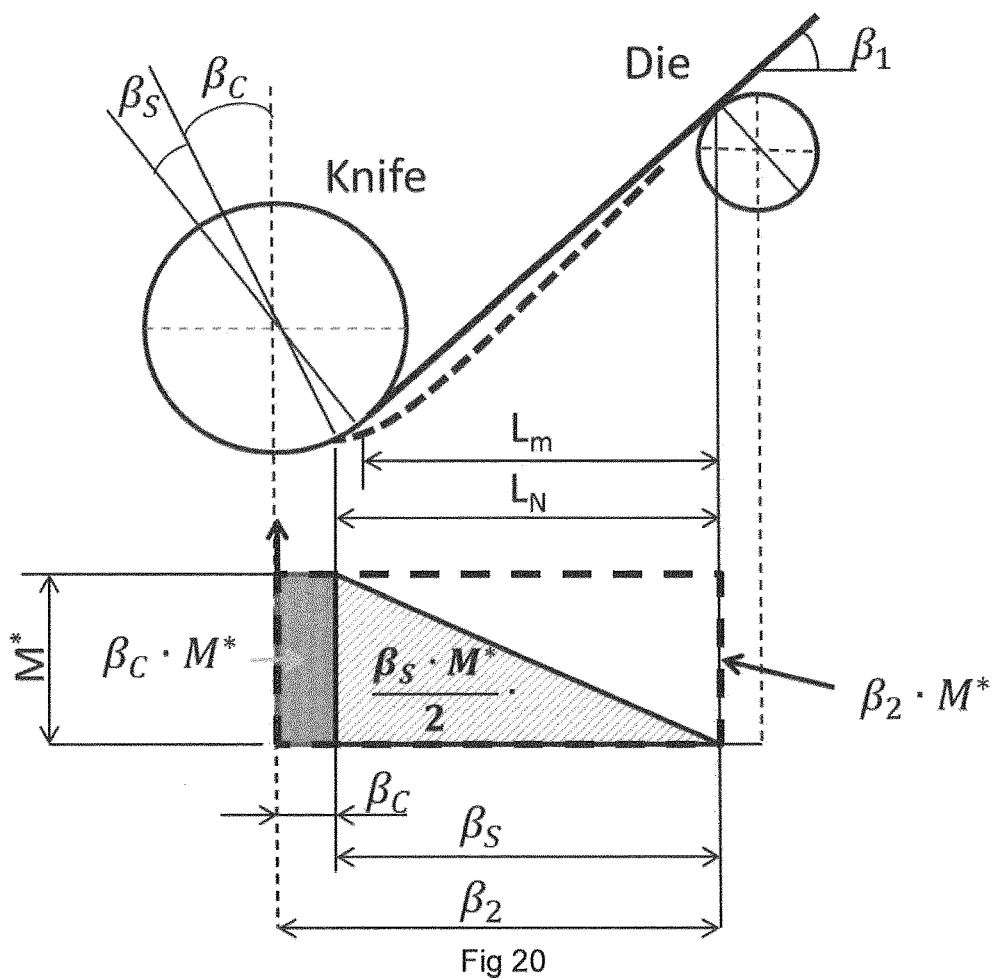
FIG. 20 shows the distribution of energy within a bend.

It was found that if the knife-radius is larger in relation to material thickness and if an increased die-width (compared to the VDA 238-100 standard test) is used, the material between the supports, i.e. the knife and rollers, will be subjected to a curvature, see dashed curve in FIGS. 19 and 20. This means the contact between the knife and the material will not be at the tangent point of a straight line, instead at angle, $\beta c$, rather than at $\beta_1$, resulting in a moment arm, $L_N$, that is longer compared to $L_m$ (see FIG. 19). To be able to estimate the reduced cross-section moment, $M_L$, the real point of contact has to be defined. Then, the curvature must be obtained. In this Figure, the shape angle, $\beta_S$, is shown. This angle represents the difference between the contact angle, $\beta_C$, and the hypothetical contact point of the moment arm at angle $\beta_2$ (see also FIG. 32). $\beta_S$ therefore represents the difference between the hypothetical contact angle assuming no curvature at the knife, and the observed contact angle at the knife, $\beta_C$. It is noticed from literature that the shape or curvature of the material (between the contact-points, knife and rollers) is proportional to the complimentary energy, see the shaded area of FIG. 19.

It has been found that by studying the entire distribution of energy within a bend (which is illustrated in FIG. 20), the following expression for the contact-angle, $\beta c$, can be obtained:

$$\beta_C = \beta_2 - \frac{2}{M} \int \beta_2 dM \qquad [93]$$

Figure 21:
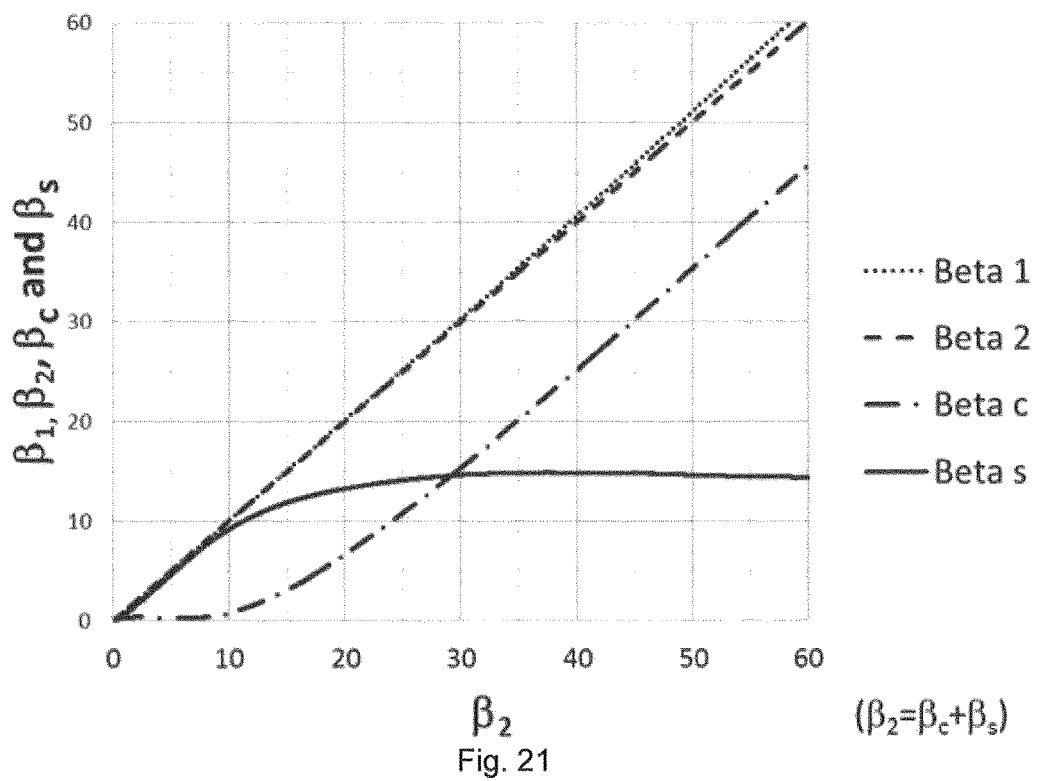
FIG. 21 shows the changes in contact and shape angles $\beta_C$ and $\beta_S$ respectively during bending from a particular material being tested.

The contact angle, $\beta c$, is approximately equal to 0 during elastic deformation, see FIG. 21. This can be shown and confirmed using the integral for the curvature angle, $\beta c$, putting in the expression for the elastic moment. The contact angle, $\beta c$, therefore starts to increase at the moment when the bend gets plastified. In FIG. 21, the dotted curve represents the bending angle, the dashed curve represents the true bending angle, the dash-dot curve represents the contact angle between knife and material and finally the solid curve represents the shape angle of the flange.

The expression [29] for the real moment-arm, $L_m$, may be used when the knife radius is small, i.e. typically 0.7 times the material thickness or less (i.e. $R_k \leq 0.7t$). However, when considering a large knife radius, it is evident that the material will not make contact with the knife at the tangent for a straight line, but at angle, $\beta c$, shown in FIG. 19. In such a case, the moment arm, $L_N$, will be:

$$L_N(\beta_1, \beta_C) = L_0 - R_d \cdot \sin \beta_1 - R_k \cdot \sin \beta_C \qquad [94]$$

It is evident that for large knife-radii, the strain will stop increasing when the material starts to follow the curvature of the knife. At that moment the strain becomes constant and will be limited by the knife-radius, even though the bending angle is increasing. It was found that this level of strain is possible to calculate by applying the contact angle, $\beta c$, earlier obtained.

For free bending where the knife radius is small compared to material thickness, the bend radius will become free to decrease without any limitation. The cross-section of moment, M, will thereby finally reach its maximum, i.e. fully plastified. If a large knife radius is used, the bending radius will become limited by the knife's geometry, thus the cross-section of moment, M, will be reduced to a certain level, $M_L$.

It has been assumed that, as the moment is a linearly dependent with respect to the horizontal axis, L (again with reference to FIGS. 19 and 20);

$$\frac{L_m}{L_N} = \frac{M_L}{M} \Rightarrow M_L = M \cdot \frac{L_m}{L_N} \quad [95]$$

Where M is the fully, maximal moment that the material can achieve (transformed geometrically from the reference friction free test). $M_L$ is the moment, limited by the knife radius, representing the case to be simulated.

If a small knife radius is used, then the contact point movement is negligible, in relation to the length of the moment arm, resulting in; $M_L \approx M$. However, if a large knife-radius is used then there will be a difference between the full moment and $M_L$ as they are positioned at two different cross-sections, along the L-axis, hence a difference between $L_N$ and Lm.

The expression for calculating the bending force, F was derived to be:

$$F = \frac{2M \cos^2(\beta_1)}{L_N} \quad [96a]$$

$$= \frac{2M \cos^2(\beta_1)}{[L_0 - R_d \cdot \sin(\beta_1) - R_k \cdot \sin \beta_C]} \quad [96b]$$

$$= \frac{2M \cos^2(\beta_1)}{\left[L_0 - R_d \cdot \sin(\beta_1) - R_k \cdot \sin\left[\beta_2 - \frac{1}{M}\int 2\beta_2 dM\right]\right]}$$

where $L_0$=the half die-width, $R_k$=knife radius, $R_d$=roller radius, $\beta_1$=bending angle [rad], $\beta_2$=true bending angle [rad] transformed geometrically from the reference test, M=the full-moment, obtained from the reference test and transformed geometrically.

It is possible to estimate the spring back, $\Delta\beta_{tot}$, in a very accurate manner using the following equations:

$$\Delta\beta_{tot} = \beta_{C\,el} + \beta_{S\,el} + \Delta\beta_{12} \quad [14]$$

$$\beta_{C\,el} = \frac{M_L \cdot W_C}{E'I} = \frac{M_L \cdot \left(R_k + \frac{t}{2}\right) \cdot \beta_C}{E'I} \quad [15]$$

$$\beta_{S\,el} = \frac{M_L \cdot W_m}{2E'I} = \frac{M_L}{2E'I} \cdot \frac{L_N}{\cos(\beta_1)} \quad [16]$$

Where $$E' = \frac{E}{(1-v^2)} \quad [11]$$

where v is Poisson's ratio and E, is the Young's-modulus
For steel, this can be expressed as:

$$E' \approx \frac{E}{(1-0.3^2)} \quad [12]$$

Furthermore, $$\Delta\beta_{12} = \beta_1 - \beta_2 = \int_0^{\beta_1} \frac{t \cdot \sin \beta_1}{L_m} \quad [18]$$

$$M_L = M \frac{L_m}{L_N} \quad [19]$$

The approximate length of the flange being tested is:

$$\frac{L_N}{\cos(\beta_1)} \quad [20]$$

and the length (along the neutral layer) of the material in contact with the knife is:

$$W_C = \left(R_k + \frac{t}{2}\right) \cdot \beta_C \quad [21]$$

Figure 22:
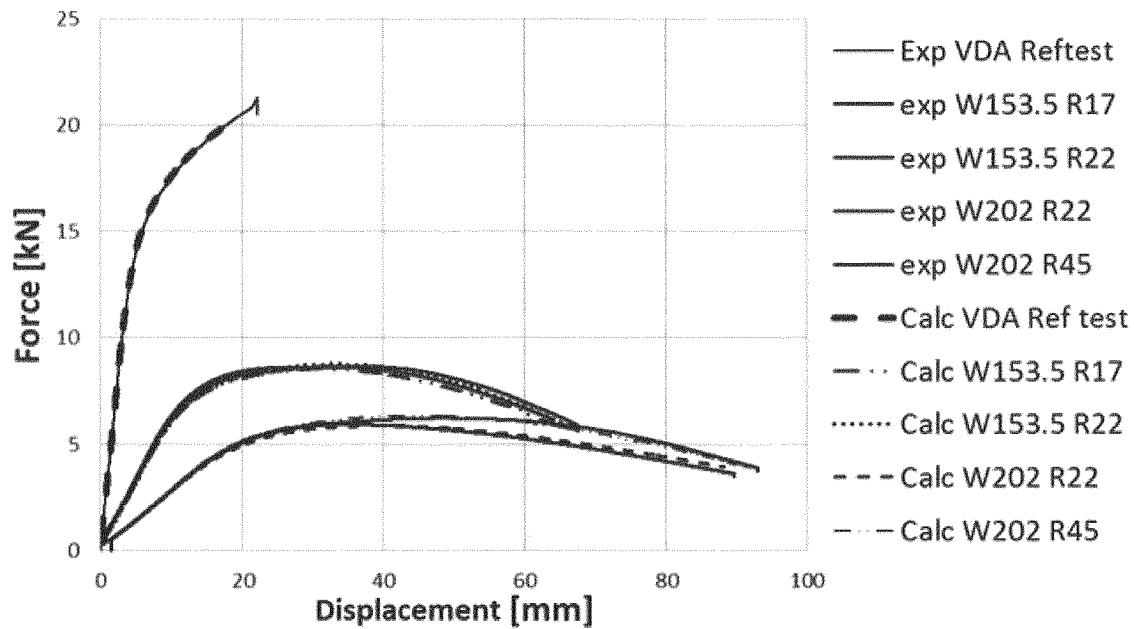
FIG. 22 shows the force versus the displacement calculated (based on a single reference test) using a method according to the present disclosure, and comparisons with tests performed.

FIG. 22 shows the measured force versus displacement plus the curve obtained from a friction free bending. The dotted and dashed lines in FIG. 22 represent forces calculated using a method according to the present disclosure and using data from the reference bending test performed similar to the VDA 238-100 standard (i.e. the high load curve in FIG. 22). The solid lines represent actual measured values. It can be seen that using a method according to the present disclosure, substantially the exact bending force can be obtained using data from a reference-test as input. It was found that results obtained from the calculation of spring-back using a method according to the present disclosure were in very good agreement with performed tests.

According to an embodiment of the disclosure the method comprises the step of obtaining a cross-section moment, M of the material by carrying out a friction-free bending test according to the VDA 238-100 standard, or a similar friction free bending-test, and using the cross-section moment, M to estimate a friction coefficient of the material, whereby a friction coefficient can be determined during production.

The bending force and knife position must be measured during the entire bending cycle. If the bending force increases more than what the material is able to absorb in the form of energy (plastic and elastic energy), this has to be due to friction. By studying the cross-section moment behaviour of a material it is thereby possible to isolate the energy-loss related to friction. It is therefore also possible to estimate the friction coefficient of the material. Such a method can thereby be used not only to estimate the friction of coefficient of a material in production, but also to determine coefficients of friction in general, using a dummy material with well-known behaviour as a base for bending, and adding layers of materials whose friction properties are to be investigated.

Figure 23:
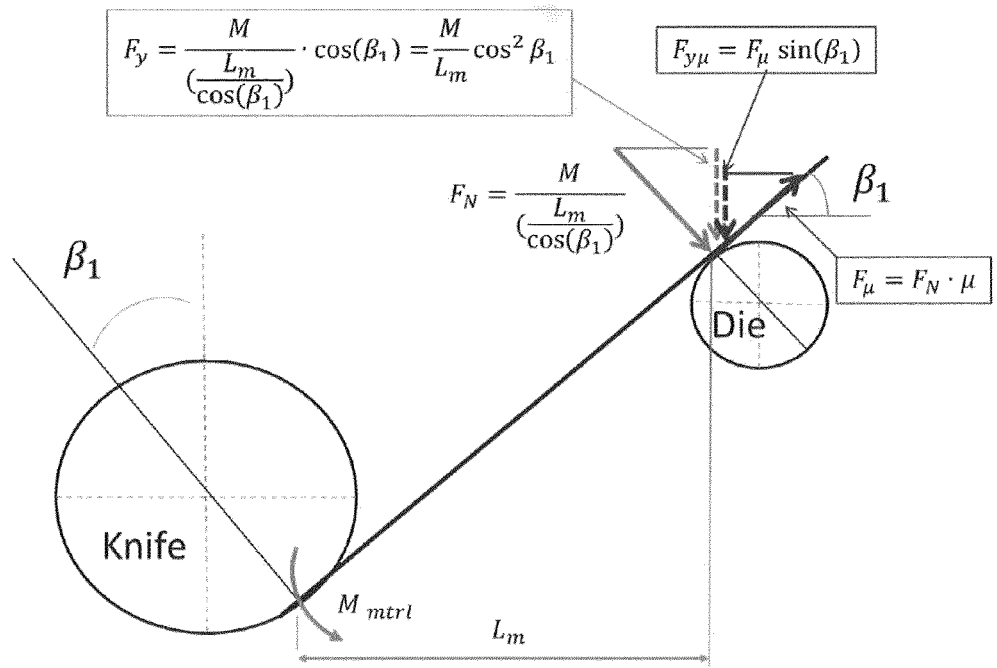
FIG. 23 shows the force vectors representing the bending load and friction force during a bending test.

FIG. 23 shows the force vectors representing the bending load during a bending test. The cross-section moment, M, will make a normal force, $F_N$ against the roller radius, hence a friction force will be developed. The vertical force vector $F_y$ acting and measured during bending is shown in FIG. 23 and corresponds to the bending force.

Figure 24:
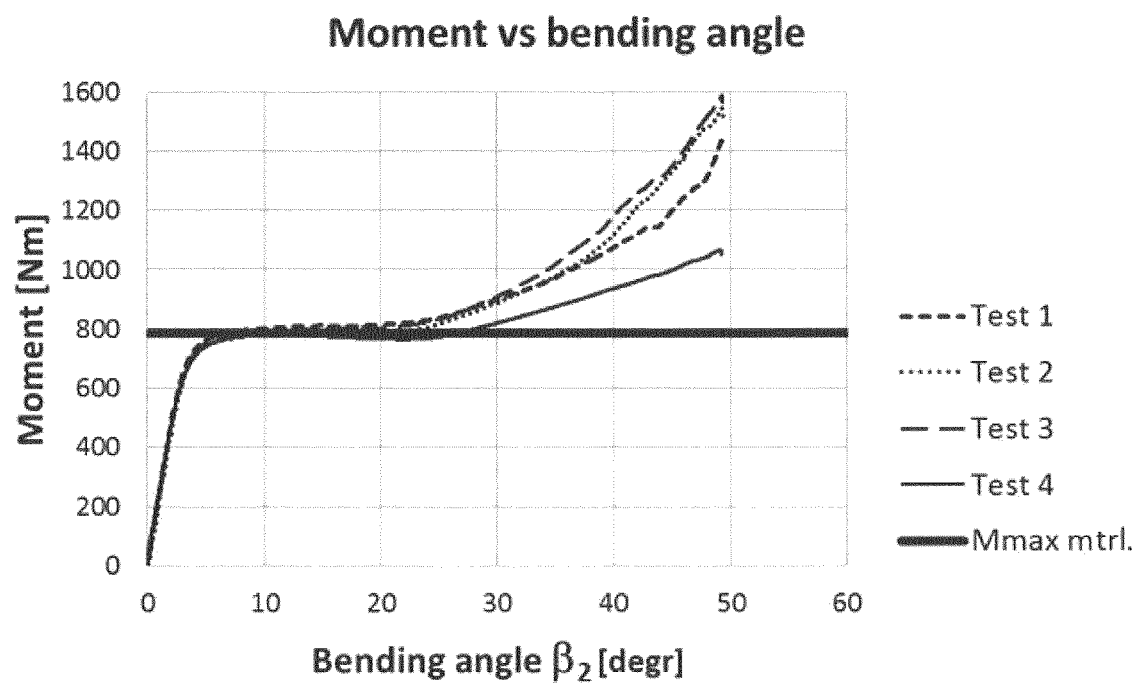
FIG. 24 shows the moment versus the bending angle for a range of 6 mm thick high strength steels subjected to bending with different levels of friction involved.

The friction coefficient, μ, is calculated using the following equation:

$$\mu = \left[\frac{M - M_{mtrl}}{M_{mtrl}}\right] \cdot \frac{1}{\tan \beta_1} \quad [22]$$

where $$M_{Measured} = \frac{F_{yTOT} \cdot L_m}{2} \frac{1}{\cos^2 \beta_1} \quad [97]$$

and the total force acting vertically is:

$$F_{y\,TOT} = \frac{M_{mtrl}}{L_m}\cos^2\beta_1 + \frac{M_{mtrl}}{L_m}\cos\beta_1 \cdot \mu \cdot \sin\beta_1 \quad [98]$$

hence;

$$\mu = \left[\frac{M_{Measured} - M_{mtrl}}{M_{mtrl}}\right] \cdot \frac{1}{\tan\beta_1} \quad [22]$$

Where the parameter, $M_{Measured}$, is the moment-characteristics obtained from a test where friction is involved. $M_{mtrl}$ is the reference characteristics of the material, obtained from a friction-free test. However, as the moment characteristics is almost constant after full plastification, this parameter can be set to constant, see thick solid line in FIG. 24.

Example 3

Figure 25:
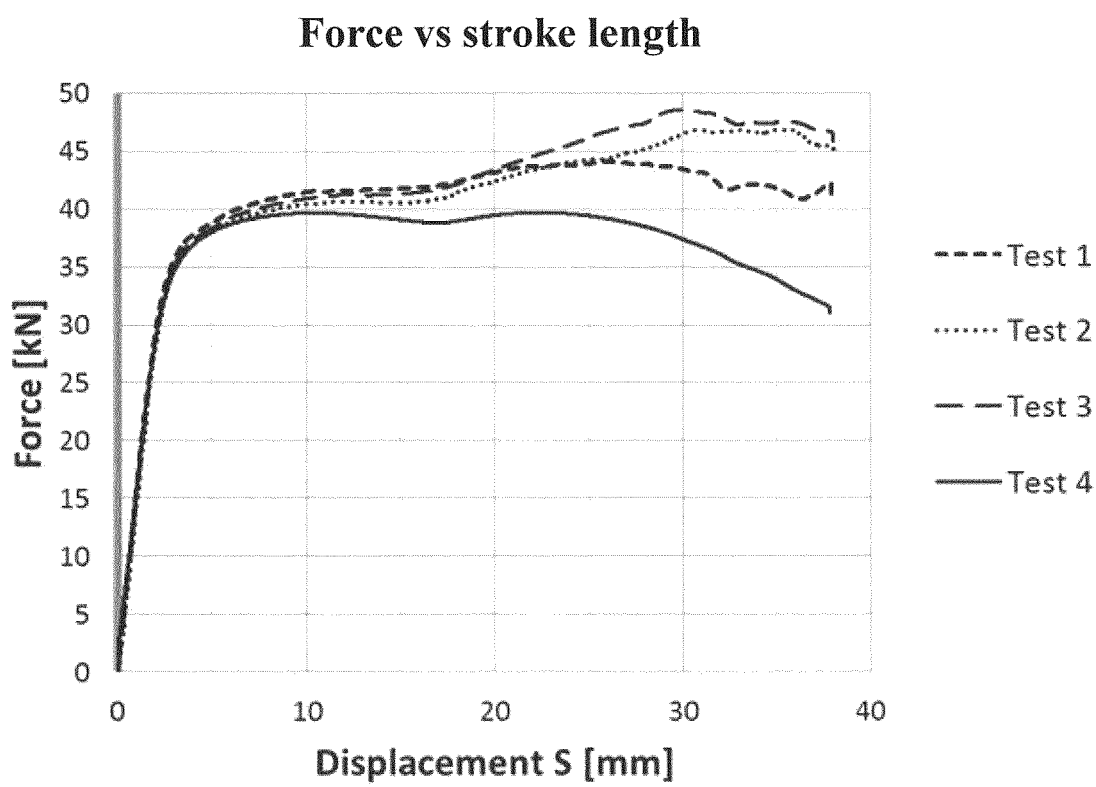
FIG. 25 shows the force versus displacement for a range of 6 mm thick high strength steels subjected to bending with different levels of friction involved.

A number of bending tests were performed on hot-rolled high strength steel, 6 mm, with different conditions, i.e. low friction and extremely high, playing without or with different lubricants using same type of material in all cases. In FIG. 25, the force curves are shown. By converting the forces to the cross-section moment, by using the disclosed expression, the influence of friction becomes more obvious, see FIG. 24 and possible to evaluate by the disclosed expression for estimation of the friction coefficient.

Example 4

Comparison has been done between bending tests verifying the disclosed formula.

Figure 26:
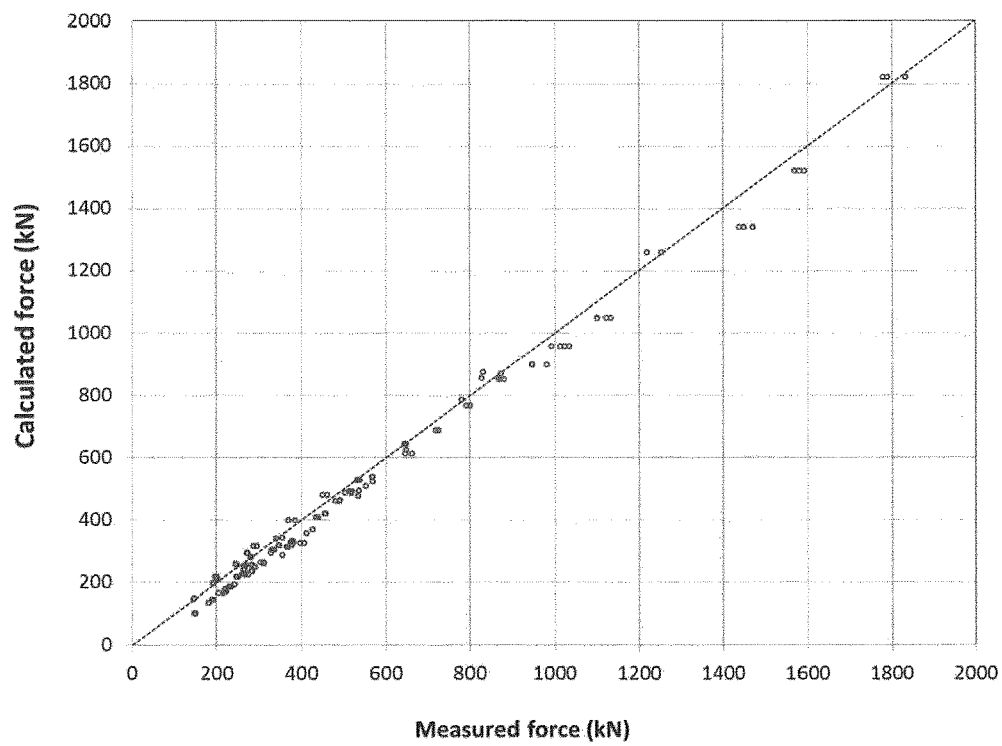
FIG. 26 shows a comparison between measured force achieved from real production in steel bending and force calculated using the methods of the disclosure.
Figure 27:
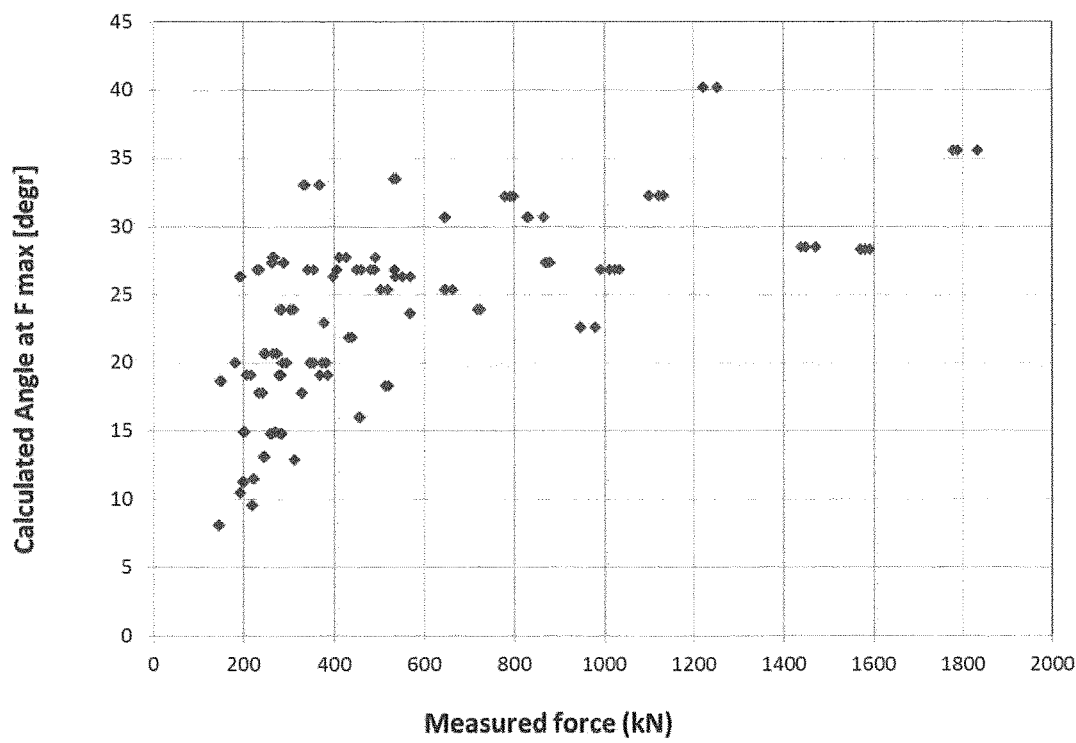
FIG. 27 shows a comparison between the experimentally measured force and calculated angle at $F_{max}$, depending on the geometry of the bending setup.

Within the test-series, different materials, thicknesses and geometrical tooling-setups are used and with ormal conditions for production in bending. In FIG. 26, a good correlation between tests and disclosed formula can be seen. FIG. 27 shows the comparison between the experimentally measured force ($F_{max}$) and the calculated angle at $F_{max}$. In these data, B/t are between 12 and 67.

Regarding scattering, no friction is assumed in the model. The ultimate strength of the materials bent is not verified.

Example 5—Composite Materials

This Example provides a demonstration of how the moment characteristics of composite materials may be calculated based on the characteristics of its component materials. Thus, the properties of a material formed from 5 mm of DX960 (i.e. base layer or the substrate material) and 1 mm skin-layer material made of DX355 (both forms of steel) can be predicted based on the moment characteristics of the individual materials.

Both strain and moment can be transformed, using the following equations:

$$\varepsilon_{Base\,material} = \varepsilon_{Measured} \cdot \frac{t_{Base\,material}}{t_{Measured}} \quad [99]$$

The moment per length unit:

$$M/B = \frac{M_{Measured}}{B} \cdot \frac{(t_{Base\,Material})^2}{(t_{Measured})^2} \quad [100]$$

Figure 28:
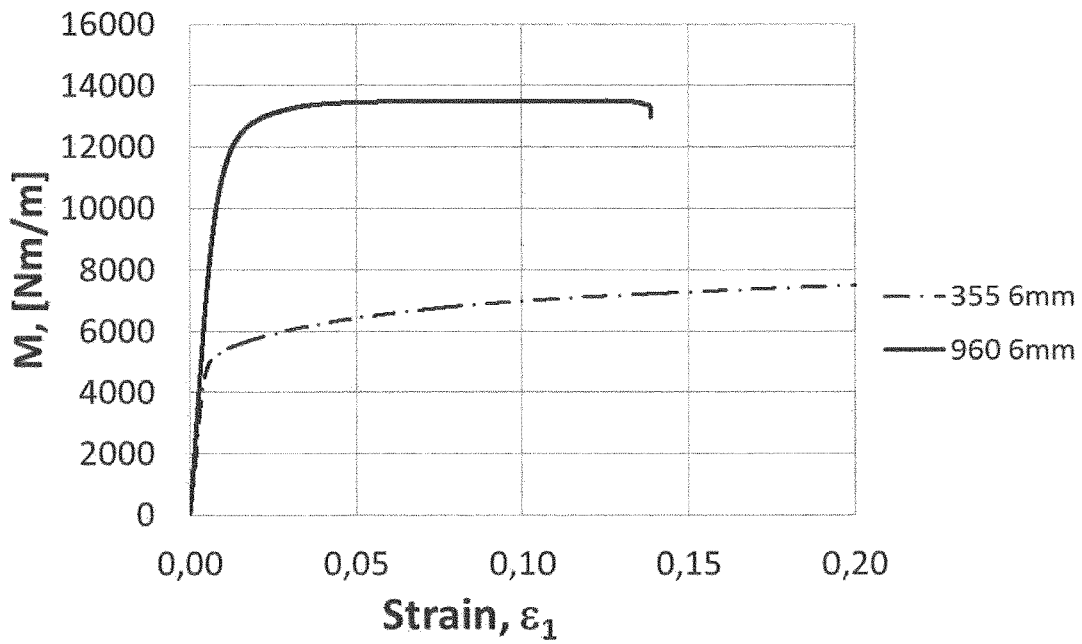
FIG. 28 shows the moment characteristics of the base materials used to form the composite in Example 5.

FIG. 28 shows a plot of the moment characteristics of the base materials, with DX355 being measured at t=4 mm and scaled up to t=6 mm. From FIG. 28, it can be seen that DX355 has much larger deformation-hardening behaviour, which is preferable from a bendability performance point of view.

To calculate the moment contribution from a 1 mm skin layer of DX355 together with 5 mm DX960 (i.e. two skin layers of 0.5 mm DX355 either side of a 5 mm core of DX960 the following calculations are used:

$$M/B_{Layer} = \left[M/B_{Layer\,6mm} - M/B_{Layer\,6mm} \cdot \frac{(t_{measured} - t_{Layer})^2}{(t_{measured})^2}\right] == \left[M/B_{Layer\,6mm} \cdot \left(1 - \frac{(6.0-1.0)^2}{(6.0)^2}\right)\right] \quad [101]$$

Thus, the moment-characteristics of the full thickness material, $t_{full}$, minus the moment-characteristics for the reduced thickness, $t_{full}-t_{layer}$, provides the moment-impact (or contribution) of the skin layers.

The thickness of the substrate (or base material) will in this case be:

$$t_{full} - t_{layer} = 6.0 - 1.0 = 5.0 \text{ mm}$$

Using the above expressions, this gives:

$$\frac{M}{B_{Substrate}} = \frac{M}{B_{Substrate\,6\,mm}} \cdot \frac{(t_{measured} - t_{layer})^2}{(t_{measured})^2} = \frac{M}{B_{Substrate\,6\,mm}} \cdot \frac{(6.0-1.0)^2}{(6.0)^2}$$

Figure 29:
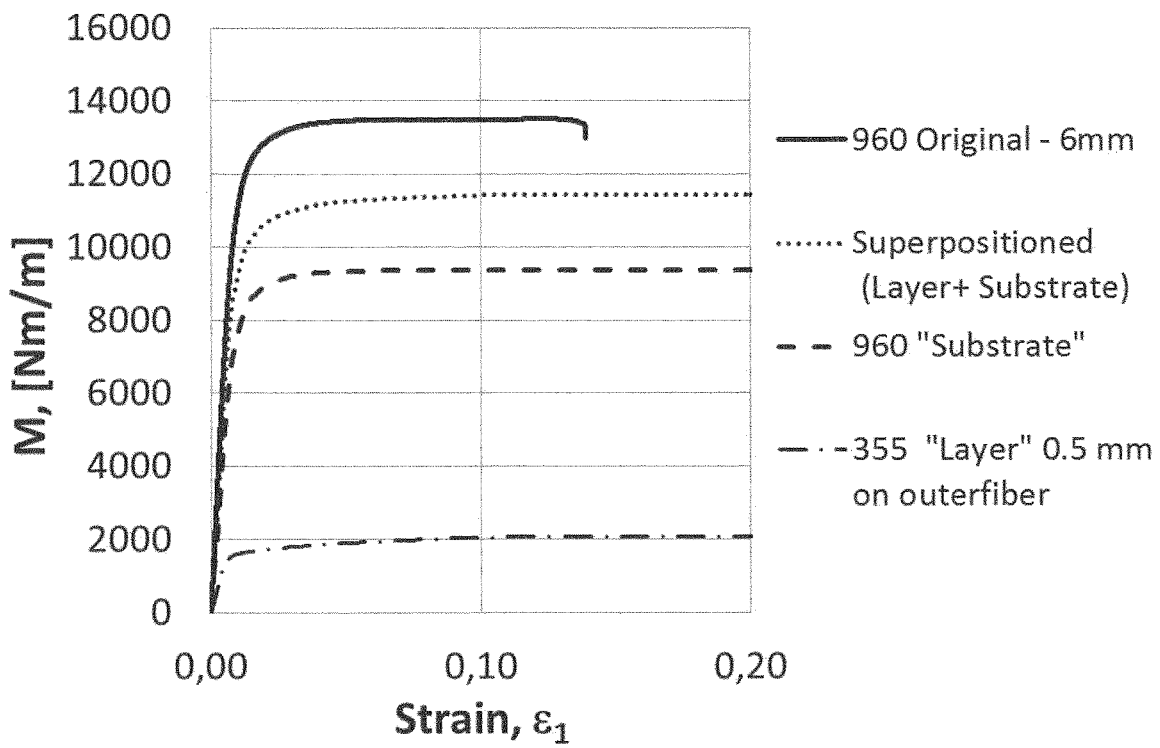
FIG. 29 shows the moment curves for the various layers in the composite structure of Example 5.

The moment-characteristics for the for the skin layer, base layer and composite are shown in FIG. 29.

Figure 30:
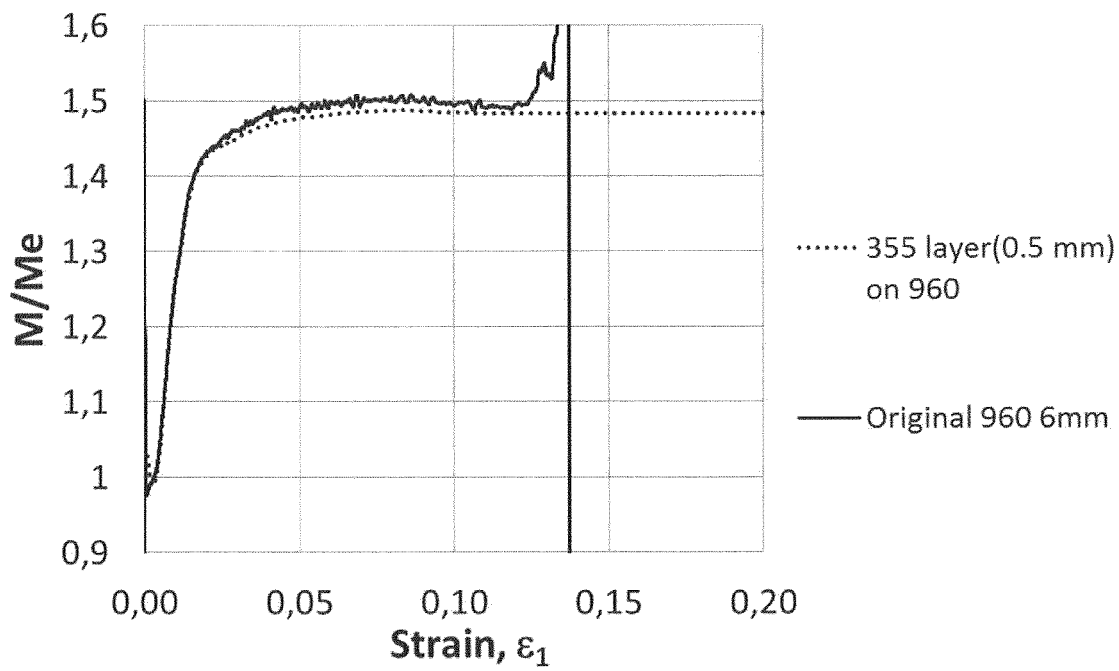
FIG. 30 shows the predicted unit-free moment curve of the composite structure of example 5, in comparison to the actual curve of an equivalent thickness of DX960 base material.

FIG. 30 shows the unit-free moment curves for the original DX960 material and the predicted properties of the composite material having 5 mm DX960 and two 0.5 mm skin layers of DX355. As can be seen, the composite material is predicted to have unit-free moment of below 1.5 for higher strains, which means that the materials is predicted to be more stable during bending, with less risk of failure.

Example 6—Properties of the Material Along the Bend

A rolled 960 Mpa, thickness t=8 mm was bent using a knife radius $R_k$=4 mm in accordance with a protocol similar to the VDA 238-100 standard. The moment curve is shown in FIG. 35.

Figure 33:
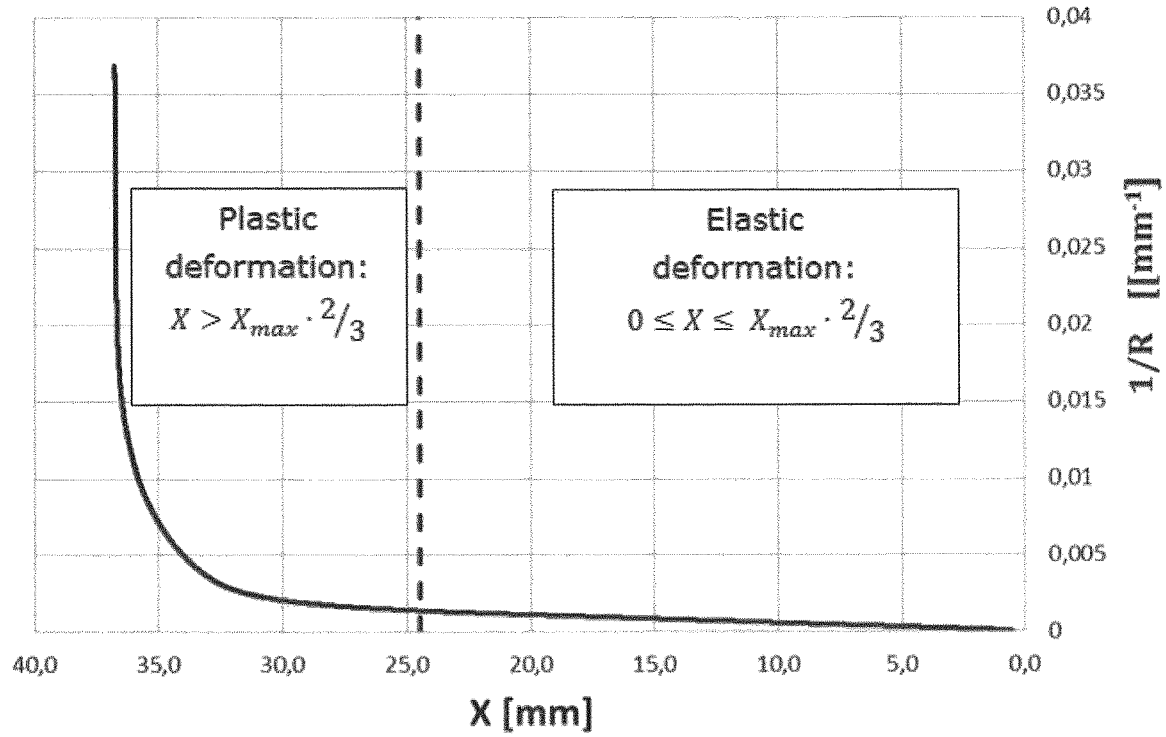
FIG. 33 shows a plot of 1/R vs. X for the steel bent to 30° from Example 6.

FIG. 33 shows a plot of 1/R (i.e. the reciprocal of the radius of the bend) for each point X along the bending length $L_N$ when the true bend angle $\beta_2$ is 30°. The plot shows that at low values of X, i.e. those parts of the plate close to the die, the bending radius is large and approaching infinite at the limit. This means that closer to the contact points with the bending die, the material itself is acting more like a rigid plate (i.e. no bending of the plate is occurring so the plate does not have any curvature). Any deformation is elastic. However, closer to the knife, the bend radius decreases (and 1/R increases). Furthermore, plastic deformation is occurring in this region close to the knife.

Figure 35:
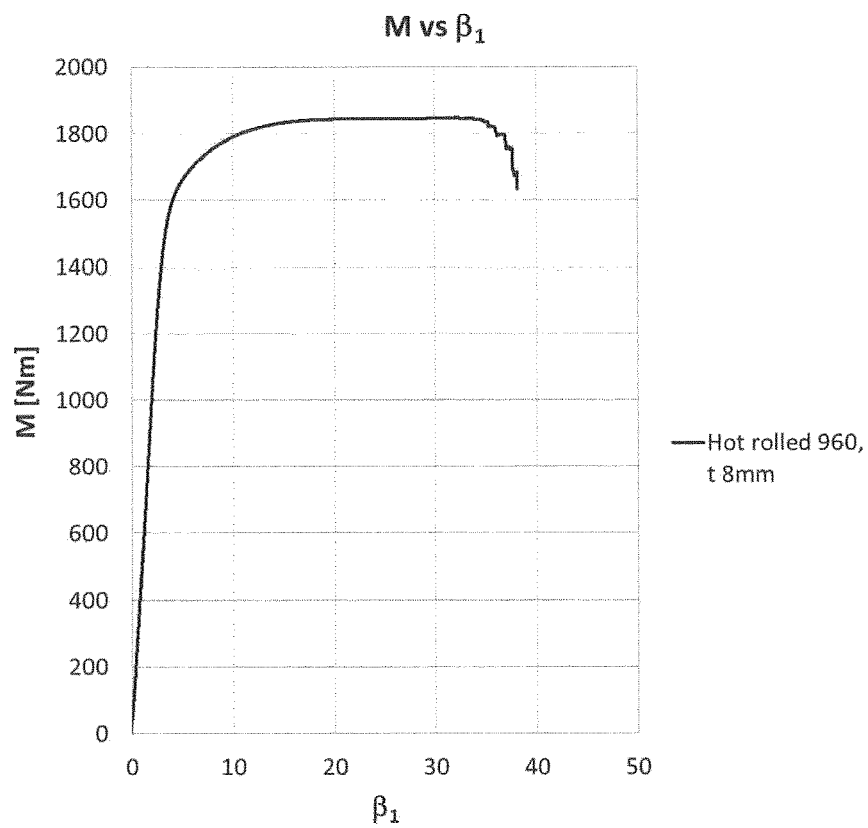
FIG. 35 shows the plot of bending moment vs bending angle from Example 6.

The moment vs. bending angle plot is shown in FIG. 35. The Figure shows that the bending moment, M, becomes constant when the material plastifies.

Figure 34:
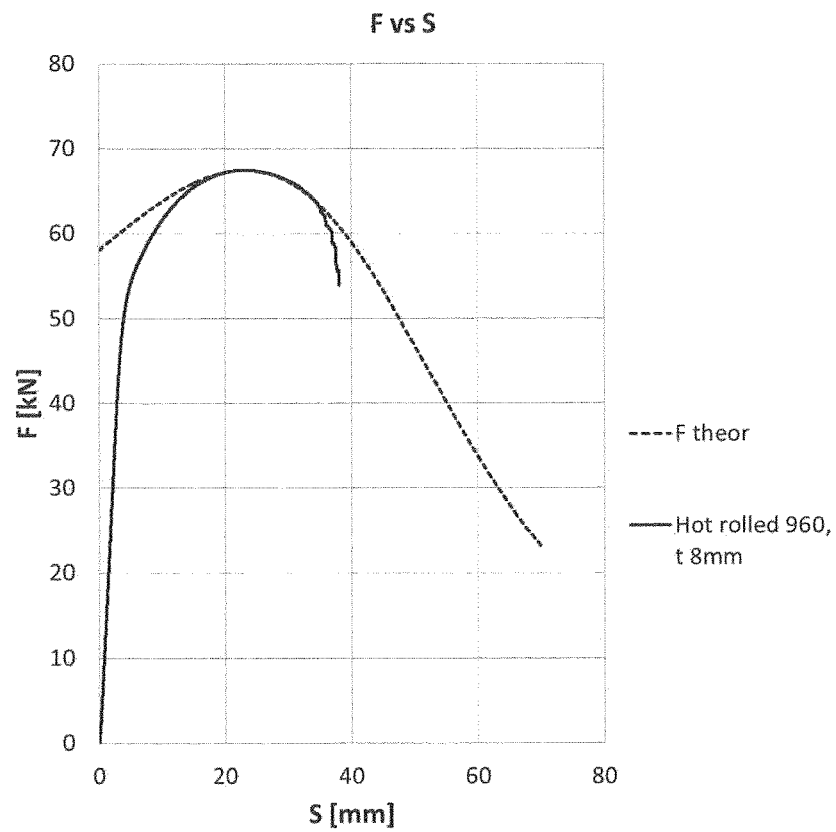
FIG. 34 shows the plot of theoretical and measured bending force vs bending angle from Example 6.

By applying a constant moment, M, using the equations disclosed herein, a theoretical force, $F_{theor}$, can be estimated. This theoretical force is shown plotted alongside the actual force in FIG. 34. The results show that the failure point of the steel occurs after the natural force maximum. According to the VDA 238-100 standard, the test should be interrupted at once the bending angle yields $F_{max}$, which indicates that the tested steel did not comply with the requirements of the standard test.

Example 7—Bend Induced Hardening

Figure 36:
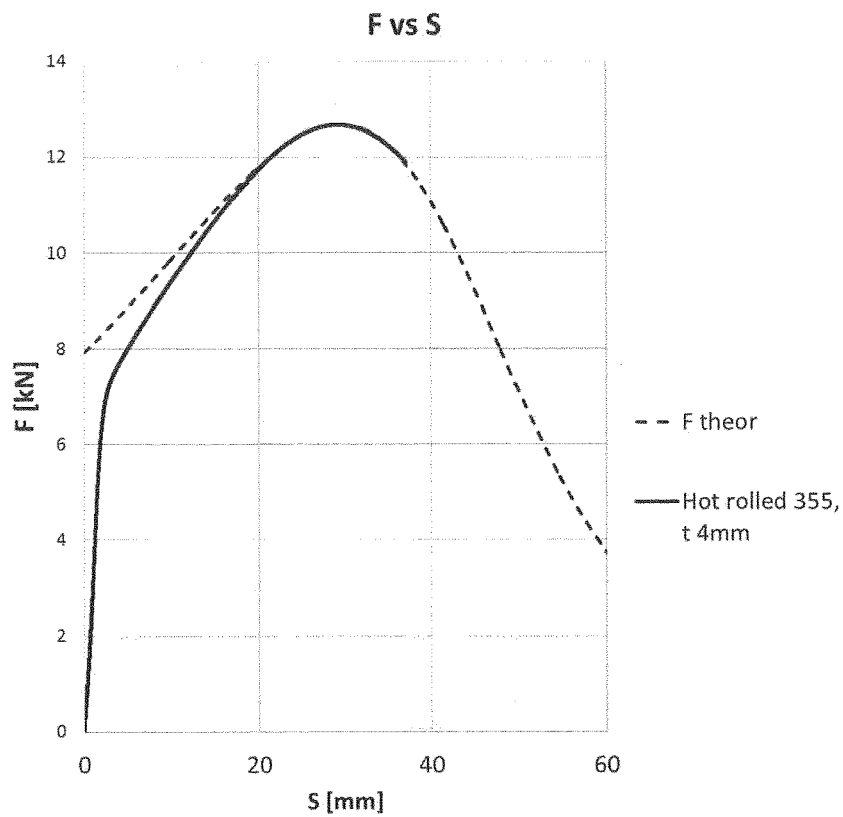
FIG. 36 shows the theoretical and measured force vs knife position for the steel bent in Example 7.

In the following example, a hot rolled steel with yield strength of 355 MPa and thickness of 4 mm was subjected to a bending test in line with the VDA 238-100 standard. FIG. 36 shows the plot of bending moment vs knife position, while FIG. 37 shows the plot of theoretical force vs bending angle.

Figure 37:
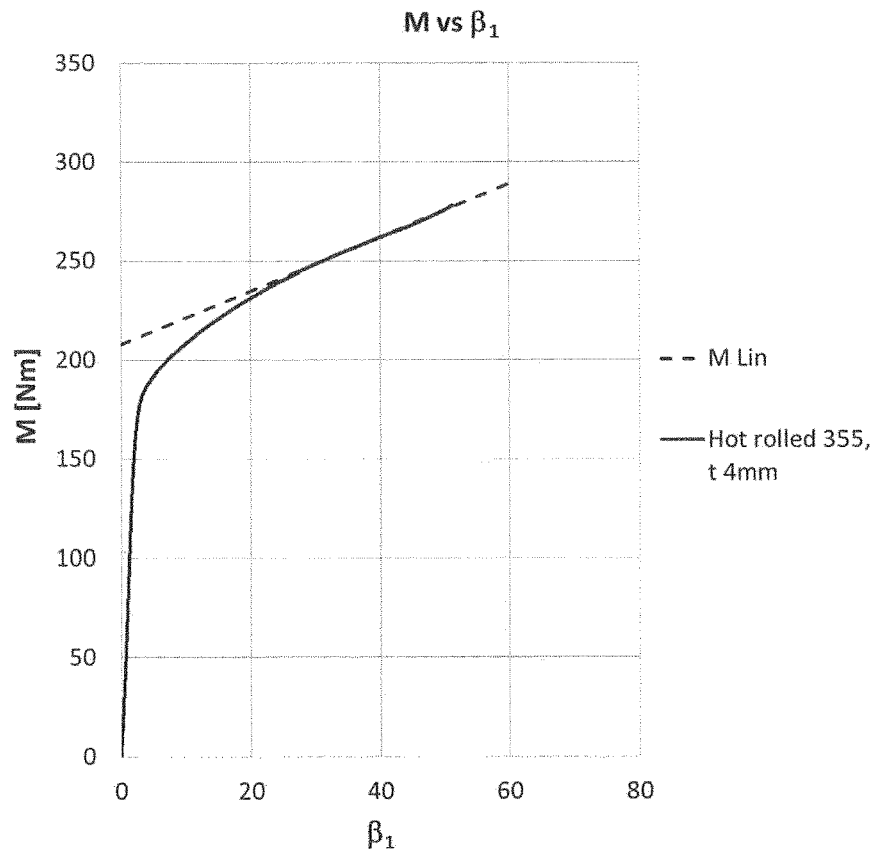
FIG. 37 shows the plot of bending moment vs bending angle from Example 7.

In FIG. 37, it can be seen that a constant moment is not obtained despite the high bending angles. This behaviour is due to hardening of the material at increased bending angles. Despite not being constant, the hardening gives rise to a linear relationship, and a linear regression can be carried out to provide a linear equation for the bending moment (dashed line).

These plots show how the methodology described herein may be used to provide further insight into the bending properties of materials beyond their maximum force, where plastic deformation or bend induced hardening may be occurring.

Example 8—Investigating Kinking Behaviour

Figure 38:
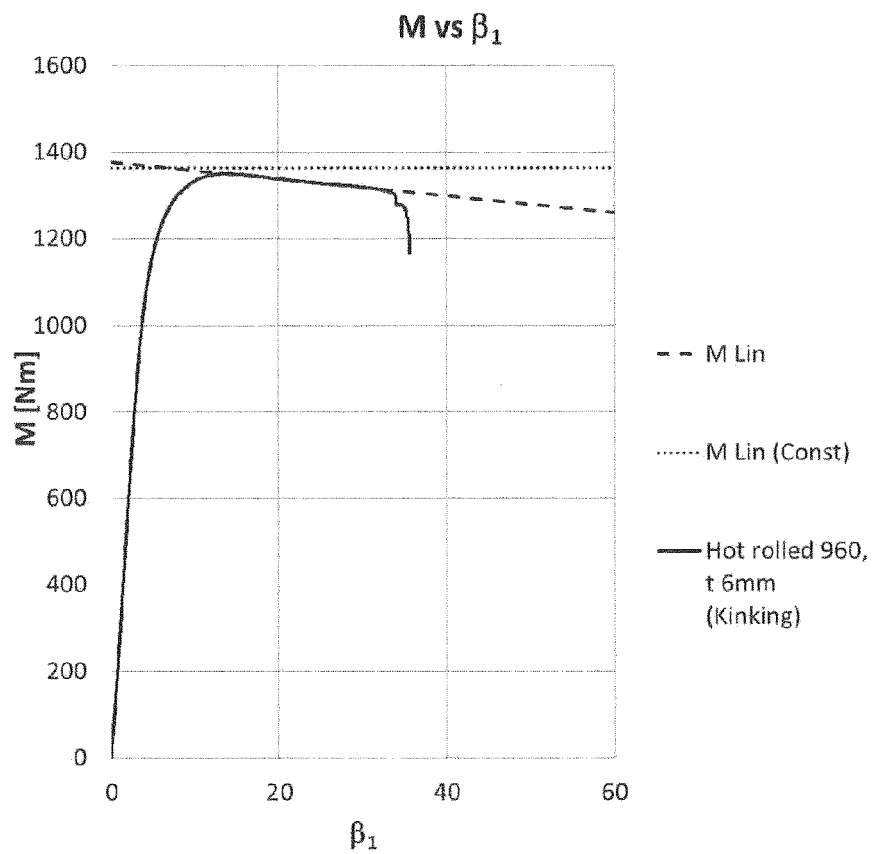
FIG. 38 shows the plot of bending moment vs bending angle from Example 8.

A hot-rolled 960 MPa steel (approximately 1050 MPa tensile strength) with a thickness of 6 mm was subjected to a bending test. The moment vs. bending angle plot is shown in FIG. 38. FIG. 38 shows a decreasing moment until a discontinuity occurs at failure. The moment is modelled using linear regression to provide a linear equation that this then used to calculate the force, shown plotted versus the knife position in FIG. 39.

Figure 39:
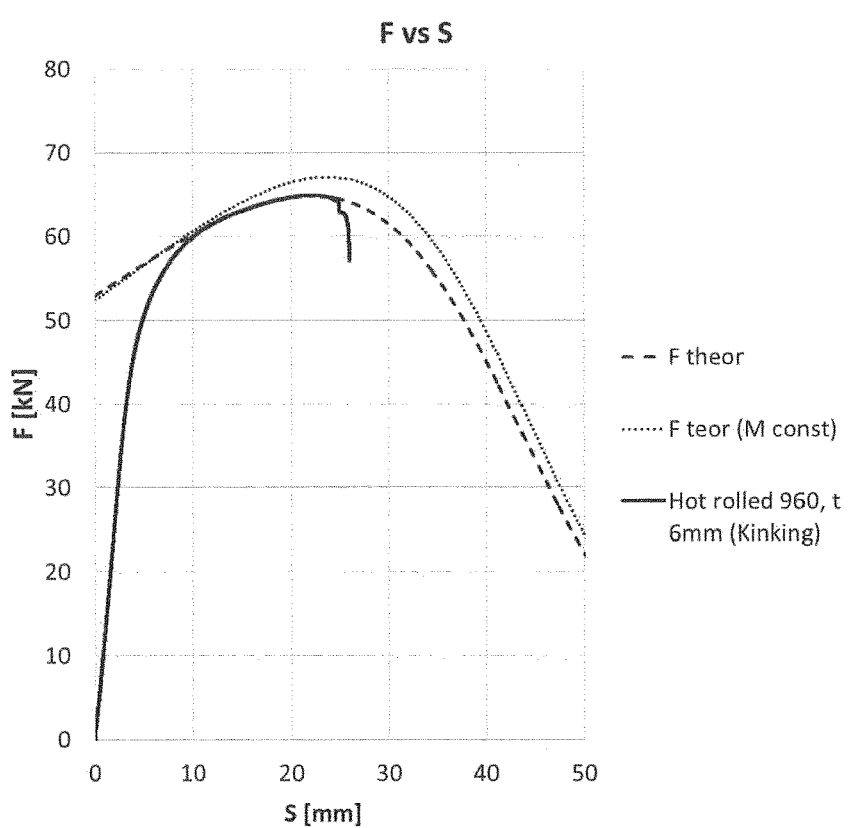
FIG. 39 shows the theoretical and measured force vs knife position for the steel bent in Example 8.

The methodology used to plot FIGS. 38 and 39 can therefore be used to investigate whether kinking (i.e. non-uniform curvature of the material) has occurred.

A further way to investigate kinking behaviour is by plotting the plain strain along the length of the bend for a constant bending angle. The area where kinking has occurred will be visible as a discontinuity in the bend, where strain increases stepwise as the length is traversed rather than smoothly.

Figure 40:
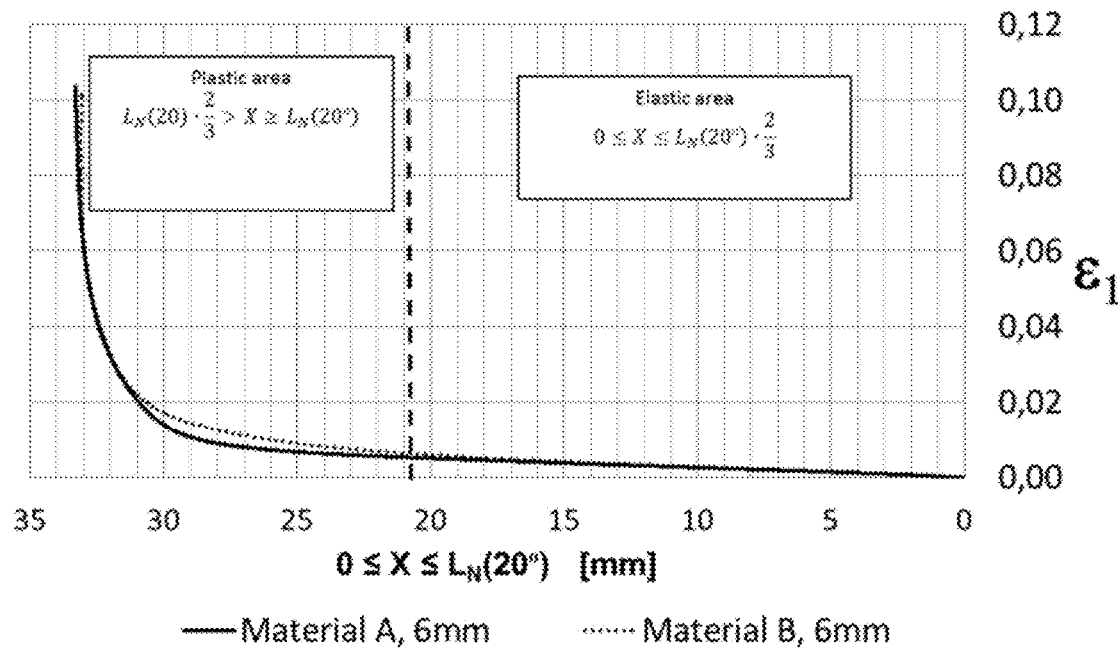
FIG. 40 shows the strain vs X-position for the 6 mm materials in Example 8.
Figure 41:
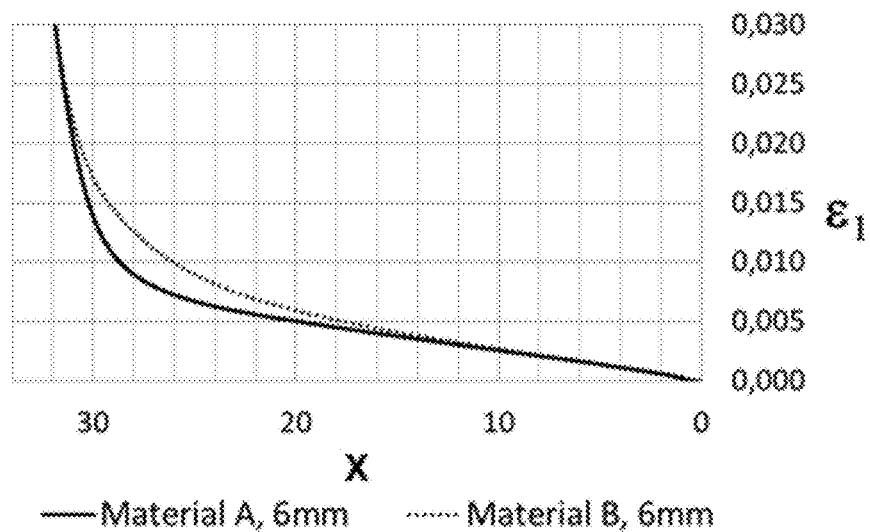
FIG. 41 shows the plot of FIG. 40 enlarged to show the kinking feature.
Figure 42:
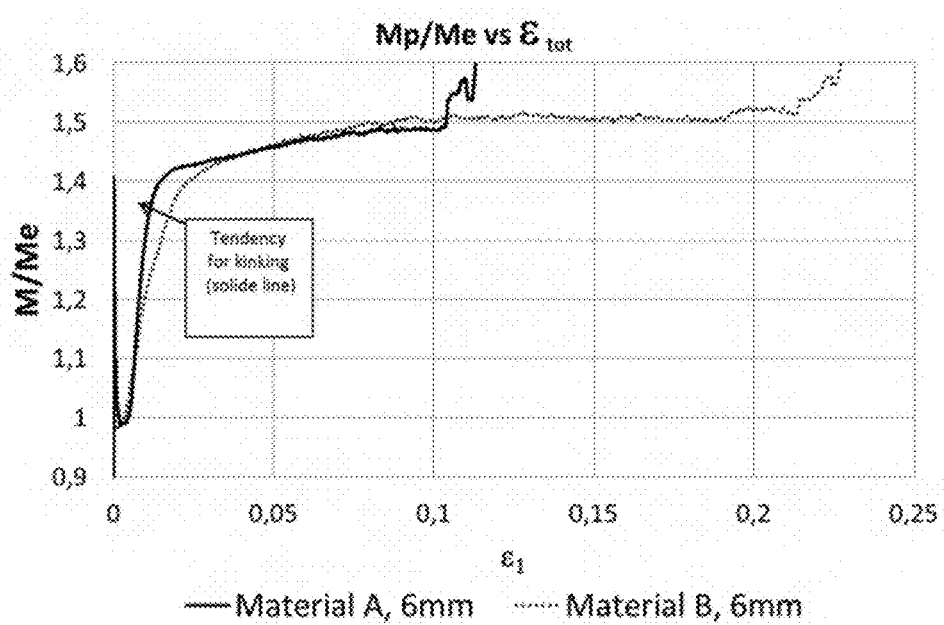
FIG. 42 shows $M/M_e$ vs strain for the 6 mm materials in Example 8.
Figure 43:
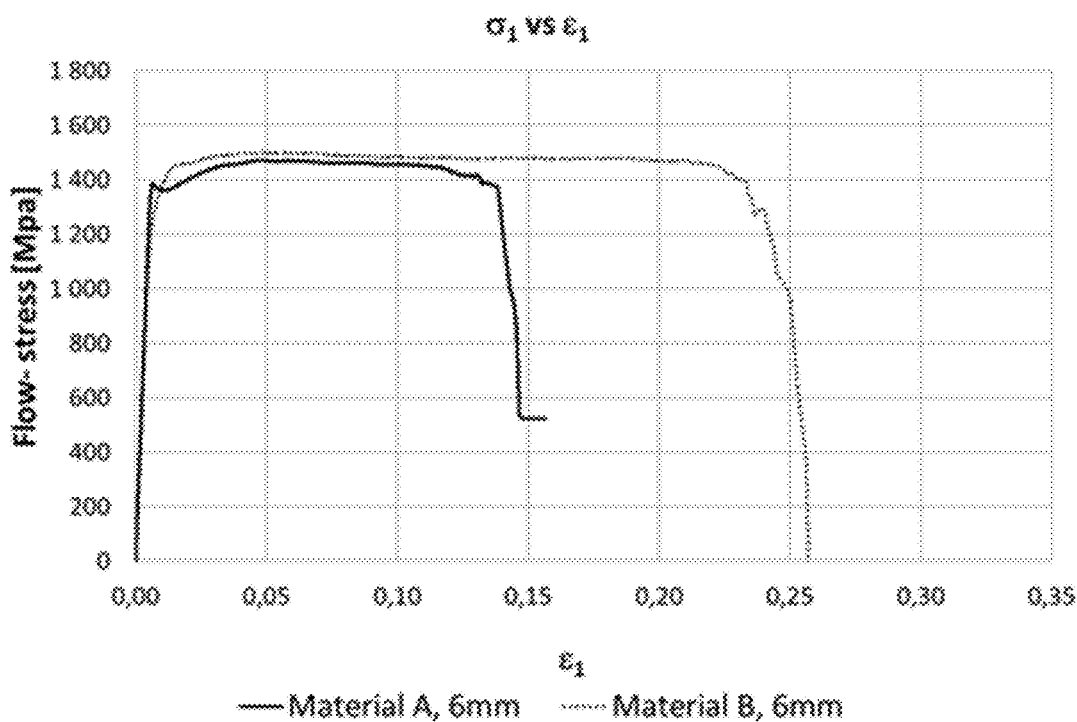
FIG. 43 shows the flow stress vs strain for the 6 mm materials in Example 8.
Figure 44:
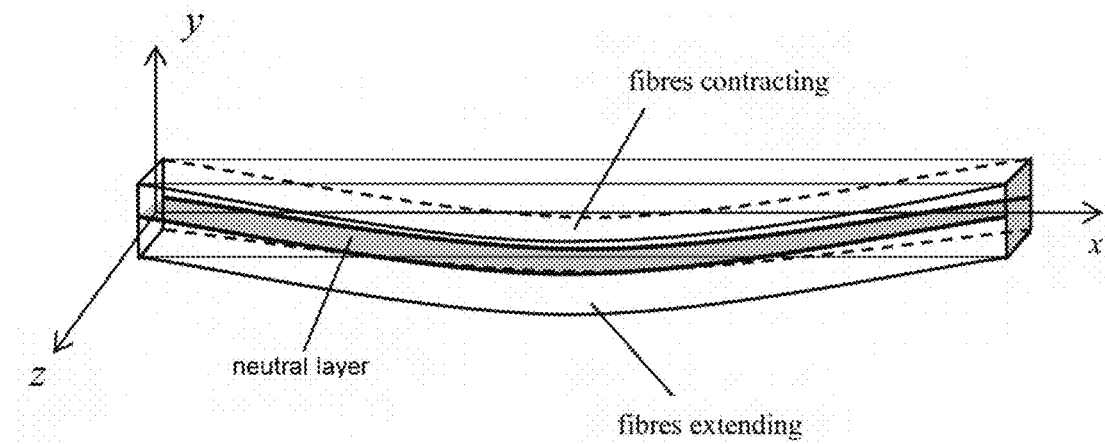
FIG. 44 shows a representation of the neutral layer, FIG. 45 photograph of the microbending apparatus used in Example 9.

To demonstrate this, two 6 mm steel sheets were subjected to a bending test. FIGS. 40 and 41 show the plot of plain strain vs. position, while FIGS. 42 and 43 show, respectively $M/M_e$ and the flow stress vs the plain strain. In FIGS. 40 and 41, the material that shows kinking tendencies (solid line) shows a marked increase in the strain when X is around 30.5 mm. This discontinuity in the curve is characteristic of the strain increasing significantly in a short distance, which arises due to the shearing deformations that give rise to the non-uniform curvature. This behaviour also leads to the plots in FIGS. 42 and 43 showing distinctly different profiles from the non-kinking material.

Example 9—Microbending

Figure 45:
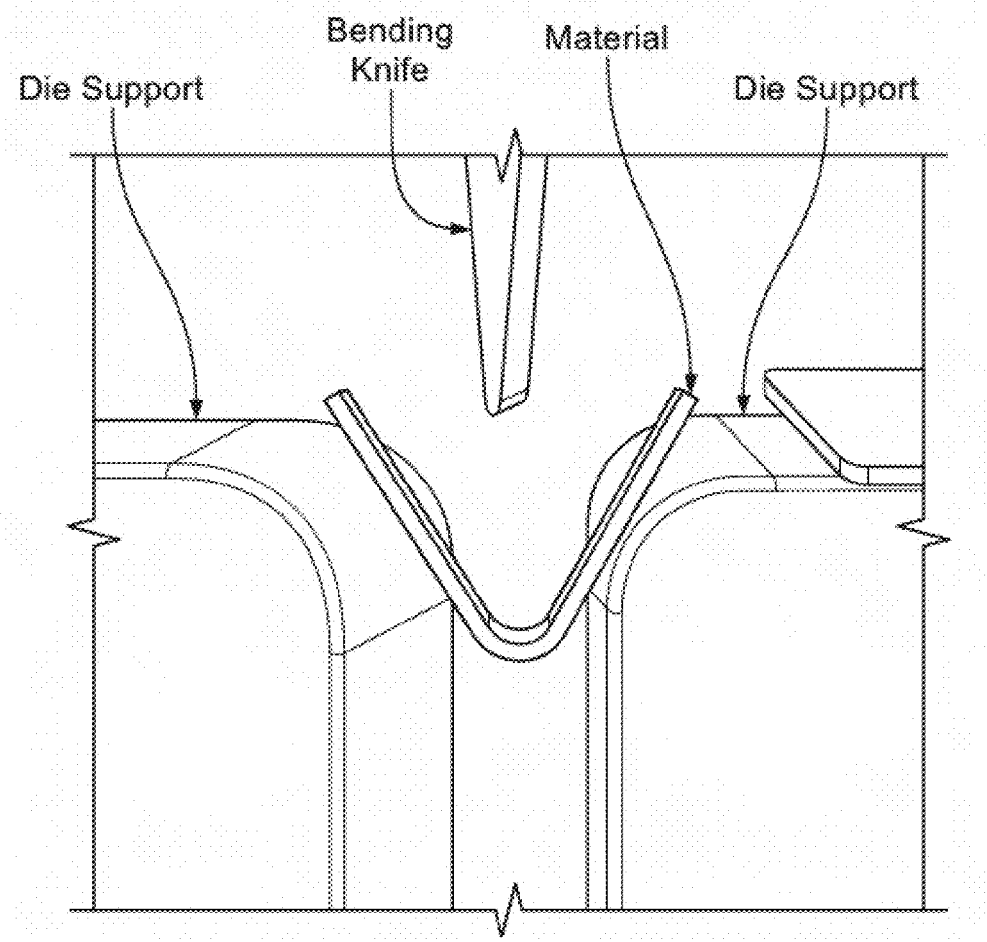

This example shows a small sample prepared from a Gleeble-test specimen. Gleeble specimens are typically too small to make a tensile test samples from, and can only be bent using a microbending apparatus. The bending apparatus used (shown in FIG. 45) was designed to fit the small dimensions of the samples. The dimensions of the bending apparatus were;

| Die-width [mm] | Knife-radius [mm] | Die-radius [mm] |
|---|---|---|
| 22 | 0.4 | 6 |

Figure 46:
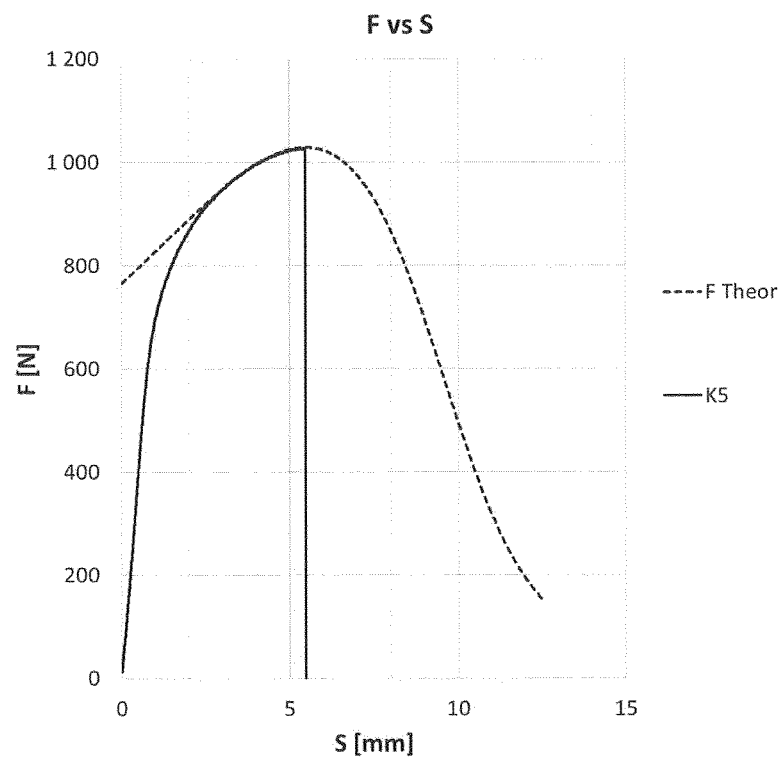
FIG. 46 shows a plot of force vs knife position for the material tested in Example 9.
Figure 47:
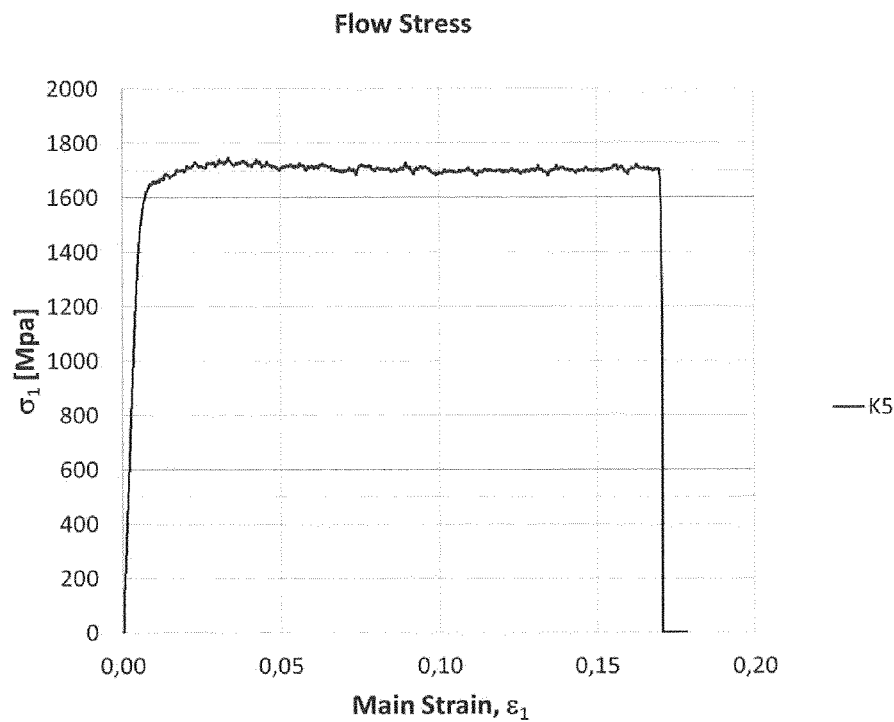
FIG. 47 shows a plot of stress vs strain for the material tested in Example 9.
Figure 48:
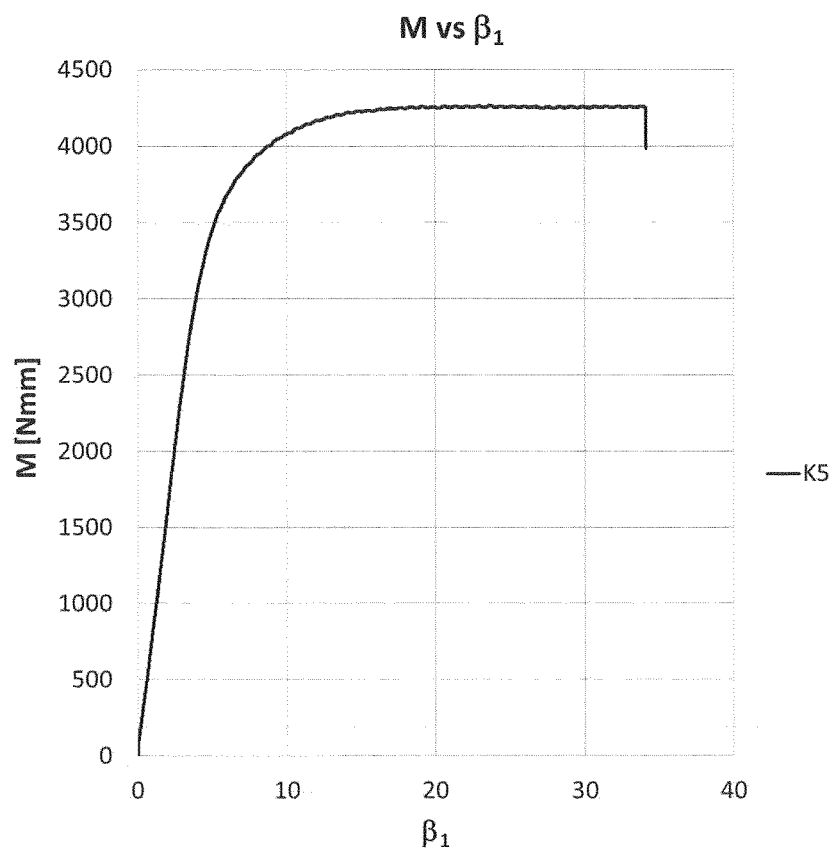
FIG. 48 shows a plot of the moment vs bending angle $\beta_1$ for the material tested in Example 9.

The samples tested had thicknesses from 1-1.5 mm and a width of 10 mm. To aid in bending, the friction was reduced by applying grease between sample and die. The results from the bending tests are shown in FIGS. 46-48. Even though the thickness to width ratio (t/B) was close to the limit where plain strain conditions can be assumed, the results were satisfying.

From the foregoing disclosure, it is evident that the new methodology disclosed herein provides the skilled person with a wide range of options for investigating the bending properties of a material. For ease of understanding, an overview of the steps needed to perform the calculations disclosed herein is provided below:

1) Performing a three point bending test, measuring the force, F, vs the stroke distance, S, by the knife. Friction between the sample and the support shall be minimized preventing consumption of extra energy not related to energy absorbed by the sample itself.

2) Measuring the following parameters relating to the test equipment; Die width, $2 \cdot L_0$, die radius, $R_d$, knife radius, $R_k$, sample length, B and sample thickness, t.

3) Calculate the energy, by making the integral; $U = \int F \cdot dS$ [5a]

4) Calculate the bending angle, $\beta_1$, using following formula:

$$\beta_1 = \operatorname{Sin}^{-1}\left(\frac{\left[L_0 \cdot Q + \sqrt{L_0^2 + (S-Q)^2 - Q^2} \cdot (S-Q)\right]}{[L_0^2 + (S-Q)^2]}\right) \cdot \frac{180}{\pi} \quad [0]$$

where; $Q = R_k + R_d + t$

Or alternatively by the integral;

$$\beta_1 = \int \frac{d\beta_1}{dS} dS = \int \frac{\cos^2 \beta_1}{L_e} dS \quad [27']$$

Where;

$$L_e = L_0 - (R_k + R_d + t) \cdot \sin\beta_1. \quad [28]$$

5) Calculate the moment, M, by the formula;

$$M = \frac{F \cdot L_m(\beta_1)}{2 \cdot \cos^2(\beta_1)} \quad [1]$$

Where; $L_m = L_0 - (R_k + R_d) \cdot \sin \beta_1$

6) Calculate the real bending angle, $\beta_2$,
   i.e. in accordance with the energy equilibrium:
   $\int F \cdot dS = \int 2M \cdot d\beta_2$, [5a]/[5b]

That is $$\beta_2 = \int \frac{L_e}{L_m} d\beta_1 = \beta_1 - \int \frac{t \cdot \sin\beta_1}{L_m(\beta_1)} d\beta_1 \qquad [84]$$

Verify calculated moment, M, and real bending angle, $\beta_2$, by calculating the energy; $\int 2M \cdot d\beta_2$ [5b], and compare it with U (should be equal).
7) The real bending angle consists of two parts; i.e. the shape angle, $\beta_S$, and the contact angle at the knife; $\beta_C$;
Energy, U, can be expressed in the following way, which allows the calculation of the two angles individually;

$$U = M \cdot (2\beta_2 - \beta_S) => \beta_S = 2\beta_2 - \frac{U}{M}$$

Hence; $\beta_S = \beta_2 - \beta_C$ [50]
8) The plain strain, $\varepsilon_1$, is calculated by following formula:

$$\varepsilon_1 = \frac{t}{2} \cdot \frac{1}{R} = \frac{t \cdot U}{M \cdot L_N(\beta_1, \beta_C)} \cdot \cos\beta_C \qquad [4a]/[4b]$$

Where;

$$L_N(\beta_1, \beta_C) = L_0 - R_d \cdot \sin\beta_1 - R_k \cdot \sin\beta_C \qquad [94]$$

9) Then the flow stress, $\sigma_1$, can be estimated by;

$$\sigma_1 = \frac{2}{B \cdot t^2 \cdot \varepsilon_1} \cdot \frac{d}{d\varepsilon_1}(M \cdot \varepsilon_1^2) \qquad [2]$$

10) The dimensionless moment, $$\frac{M(\beta_2)}{M_e(\beta_2)},$$

has following maximum range of interval;

$$1.0 \le \frac{M(\beta_2)}{M_e(\beta_2)} \le 1.5, \qquad [82]$$

from elastic state to fully plastified cross-section. Calculated as;

$$\frac{3}{\left(\left(\frac{dM}{d\beta_2} \big/ \frac{M}{\beta_2}\right) + 2\right)} \qquad [85a]$$

or alternatively:

$$\frac{M}{M_e} = \frac{3}{\left(\left(\frac{dM}{d\varepsilon_1} \big/ \frac{M}{\varepsilon_1}\right) + 2\right)} \qquad [85b]$$

11) Young modulus, E', for plain strain condition can easily be defined by;

$$E' = \text{Max}\left(\frac{M^2 L_m}{2 \cdot I \cdot U}\right) \qquad [13]$$

or alternatively checking the gradient between stress, $\sigma_1$, and the strain, $\varepsilon_1$, at elastic state.
12) Estimation of maximum load, $F_{Max}$, and the bending angel, $\beta_{F\ max}$, where it appears (considering more a less a constant steady state moment, $M_{max}$)

$$F_{Max} = \frac{4 \cdot M_{max}}{(R_d + R_k)} \cdot \sin\beta_{Fmax} \qquad [8a]$$

Where;

$$\beta_{Fmax} = \sin^{-1}\left[\frac{L_0 - \sqrt{L_0^2 - (R_d + R_k)^2}}{(R_d + R_k)}\right] \times \frac{180}{\pi} \qquad [7]$$

The approximate maximum bending moment, $M_{Max}$, can be estimated as;

$$M_{Max} = \frac{B \cdot t^2 \cdot \left(R_m \cdot \frac{2}{\sqrt{3}}\right)}{4} \qquad [9]$$

13) As the moment, M, is linearly distributed between the knife and the supports, the parameters set out above can then be plotted between these points at any stage of the bending procedure (i.e. $\beta_1^*$). The horizontal X-coordinates (starting at die support and ending at contact point $\beta_C$ is calculated by the expression:

$$X = \int_0^{M(\beta_2^*)} \frac{L_N(\beta_2^*)}{M(\beta_2^*)} dM \qquad [64]$$

Where $L_N(\beta_1^*)$ is the real moment-arm at the chosen point of bending, and $M(\beta_2^*)$ is the moment at that point.

Further modifications of the disclosure within the scope of the claims would be apparent to a skilled person. In particular, the methodology of the disclosure allows the skilled person to investigate the properties of materials such as steel during bending. By comparison to pre-determined threshold values, the skilled person is able to evaluate the suitability of materials such as steel for a particular use using the method of the present disclosure.

The invention claimed is:
1. A method of characterising a material that comprises the steps of:
 a. providing a sample of the material simply supported between two parallel die supports, said supports having the same edge shape;
 b. bending the sample by providing an external force, F, via a bending knife, said force acting in a plane perpendicular to the plane formed by the centres of the die supports and which intersects the material at the centre line between the die supports, said bending knife extending at least the entire length of the sample;

c. calculating a cross-section moment, M, of the material using the following equation [1]:

$$M = \frac{F \cdot L_m(\beta_1)}{2 \cdot \cos^2(\beta_1)} \quad [1]$$

where F is the applied bending force,
$L_m(\beta_1)$ is the moment arm, calculated according to the following equation:

$$L_m(\beta_1) = L_0 - (R_k + R_d) \cdot \sin(\beta_1)$$

wherein $\beta_1$ is calculated using the following equation [0]:

$$\beta_1 = \sin^{-1}([L_0 \cdot Q + \sqrt{L_0^2 + (S-Q)^2 - Q^2 \cdot (S-Q)}]/[L_0^2 + (S-Q)^2]) \cdot 180/\pi \quad [0]$$

where
$L_0$ is half the die width,
$R_d$ is the radius of the die edge,
$R_k$ is the radius of the knife,
$\beta_1$ is the bending angle,
$Q = R_k + R_d + t$,
t is the sample thickness, and
S is a vertical distance through which the bending knife has been displaced.

2. The method of claim 1, wherein the method comprises solving the energy equilibrium expression:

$$\int F ds = \int 2 M d\beta_2$$

where $$\beta_2 = \beta_1 - \int \frac{t \cdot \sin(\beta_1)}{L_m(\beta_1)} d\beta_1$$

where t is the thickness of the plate.

3. The method according to claim 1, characterized in that it comprises the step of calculating the flow stress, $\sigma_1$ using the following equation:

$$\sigma_1 = \frac{2}{B \cdot t^2 \cdot \varepsilon_1} \cdot \frac{d}{d\varepsilon_1}(M \cdot \varepsilon_1^2)$$

where the main strain, $\varepsilon_1$, is calculated from:

$$\varepsilon_1 = \beta_2 \cdot \frac{t}{L_m(\beta_1)}$$

where
B is the sample length,
t is the sample thickness and
$\beta_2$ is the true angle that said material is bent to during said bending test.

4. The method according to claim 1, characterized in that it comprises the step of calculating the flow stress, $\sigma_1$ using the following equation:

$$\sigma_1 = \frac{2}{B \cdot t^2 \cdot \varepsilon_1} \cdot \frac{d}{d\varepsilon_1}(M \cdot \varepsilon_1^2)$$

where the main strain, $\varepsilon_1$, is calculated from:

$$\varepsilon_1 = t \cdot \frac{U}{M \cdot L_N(\beta_1, \beta_C)} \cdot \cos(\beta_C)$$

where
B is the sample length,
t is the sample thickness
$\beta_2$ is the true angle that said material is bent to during said bending test,
$L_N(\beta_1, \beta_C)$ is the moment arm, calculated as:

$$L_N(\beta_1, \beta_C) = L_0 - R_d \cdot \sin \beta_1 - R_k \cdot \sin \beta_C$$

U is the energy, and
$\beta_C$ is the contact angle between the knife and the material.

5. The method according to claim 1, characterized in that it comprises the step of estimating the Young's modulus, E', of said material by plotting a graph of $\beta_2$ and said calculated cross-section moment, M and determining the gradient of the elastic part of the moment curve, whereby the gradient is $$\left(\frac{2 \cdot E' \cdot I}{L_m}\right)$$

where I is the moment of inertia and where E' is the Young's modulus in plain strain and is given by:

$$E' = \frac{E}{(1-v^2)}$$

where v is Poisson's ratio.

6. The method according to claim 1, characterized in that it comprises the step of estimating the Young's modulus in plain strain, E', of said material using the following formula:

$$E' = \text{Max}\left(\frac{M^2 L_m}{2 \cdot I \cdot U}\right)$$

where
I is the moment of inertia, and
U is the energy.

7. The method according to claim 1, characterized in that it comprises the step of using said cross-section moment, M of said material to estimate spring-back of said material using the following equations:

$$\Delta\beta_{tot} = \beta_{Cel} + \beta_{Sel} + \Delta\beta_{12}$$

$$\beta_{Cel} = \frac{M_L \cdot W_C}{E'I} = \frac{M_L \cdot \left(R_k + \frac{t}{2}\right) \cdot \beta_C}{E'I}$$

$$\beta_{Sel} = \frac{M_L \cdot W_m}{2E'I} = \frac{M_L}{2E'I} \cdot \frac{L_N}{\cos(\beta_1)}$$

-continued $$\Delta\beta_{12} = \int \frac{t \cdot \sin\beta_1}{L_m} d\beta_1$$

$$M_L = M \frac{L_m}{L_N}$$

the approximate length of the flange being tested is:

$$\frac{L_N}{\cos(\beta_1)}$$

and the length of material in contact with the knife is:

$$\left(R_k + \frac{t}{2}\right) \cdot \beta_C$$

where: A $\Delta\beta_{tot}$ is the total amount of spring-back, $\beta_{Sel}$ is the spring-back of the flange, $\beta_{Cel}$ is the spring-back related to the material in contact with the knife, $M_L$ is the reduced moment due to the limitation of curvature of the knife, $L_N$ is the moment arm, $L_S$ is the length of the flange, $L_e$ is the length of the material shaped by the knife, $R_k$ is the knife radius, and $\beta c$ is the contact angle between the material and the knife.

8. The method according to claim 1, characterized in that it comprises the step of using said cross-section moment, M of said material to estimate a friction coefficient, µ, of said material using the equation:

$$\mu = \left[\frac{M - M_{mtrl}}{M_{mtrl}}\right] \cdot \frac{1}{\tan\beta_1}$$

where $M_{mtrl}$ is the cross-section moment obtained using friction-free bending test equipment.

9. The method according to claim 1, characterized in that said calculated cross-section moment, M, or the calculated flow stress, $\sigma_1$ or the estimated Young's modulus, E', or the calculated plain strain, $\varepsilon_1$, is used to optimize a product comprising said material.

10. The method according to claim 1, wherein the sample of material is a plate.

11. The method according to claim 1, wherein the die supports are rollers.

12. The method according to claim 1, wherein the material is a metallic material.

13. The method according to claim 12, characterized in that said metallic material is hot-rolled metallic material.

14. The method according to claim 12, characterized in that said metallic material is a cold-rolled metallic material.

15. The method for characterizing a material according to claim 1, characterized in that it comprises the steps of carrying out a bending test according to the VDA 238-100 standard.

16. The method according to claim 1, characterized in that the method comprises calculating the ratio $M/M_e$, defined as either:

$$\frac{M}{M_e} = \frac{3}{\left(\left(\frac{dM}{d\beta_2}\bigg/\frac{M}{\beta_2}\right)+2\right)}$$

or $$\frac{M}{M_e} = \frac{3}{\left(\left(\frac{dM}{d\varepsilon_1}\bigg/\frac{M}{\varepsilon_1}\right)+2\right)^2}$$

17. The method of claim 16, wherein the ratio $M/M_e$ is calculated for at least two different materials, and the properties of a composite comprising those materials is calculated from the values of the individual materials.

18. A method for determining the conditions under which a material remains stable during bending, said method comprising the method of claim 16 and further characterised by determining the conditions under which the ratio $M/M_e$ remains below 1.5.

19. The method of claim 1, wherein the knife radius, $R_k$, is less than or equal to the thickness of the material, t.

20. The method of claim 1, wherein the knife radius, $R_k$, is 0.7 timed the thickness of the material, t, or less.

* * * * *